United States Patent [19]

Meece et al.

[11] 4,217,594

[45] Aug. 12, 1980

[54] METHOD AND APPARATUS FOR DETERMINING THE VELOCITY OF A LIQUID STREAM OF DROPLETS

[75] Inventors: Kermit A. Meece, Lexington, Ky.; Thomas S. Taylor, Atlanta, Ga.

[73] Assignee: International Business Machines Corporation, Armonk, N.Y.

[21] Appl. No.: 843,081

[22] Filed: Oct. 17, 1977

[51] Int. Cl.[2] .............................................. G01D 15/18

[52] U.S. Cl. ........................................ 346/75; 346/1.1

[58] Field of Search .......................... 346/75, 1, 140 R

[56] References Cited

U.S. PATENT DOCUMENTS

| | | | |
|---|---|---|---|
| 3,562,761 | 2/1971 | Stone et al. | 346/75 |
| 3,787,882 | 1/1974 | Filmore et al. | 346/75 |
| 3,907,429 | 9/1975 | Kuhn et al. | 346/75 X |
| 4,045,770 | 8/1977 | Arnold et al. | 346/75 |
| 4,146,901 | 3/1979 | Fowler | 346/75 X |
| 4,150,384 | 4/1979 | Meece | 346/75 |

*Primary Examiner*—George H. Miller, Jr.
*Attorney, Agent, or Firm*—Frank C. Leach, Jr.

[57] ABSTRACT

A pressurized ink jet stream is broken up into droplets spaced substantially uniform distances by application of a predetermined frequency to the stream. When the velocity of the stream is to be determined, a frequency perturbation is placed in the predetermined frequency to produce a gap in the stream of droplets at a selected distance from the perturbation application point. The presence of the gap is optically sensed at the selected distance by determining when the time period between adjacent droplets at the selected distance exceeds a predetermined period of time. The velocity of the stream is determined in accordance with the time that it takes from the perturbation of the gap until the gap is sensed at the selected distance because of the time period between adjacent droplets exceeding the predetermined period of time. After the velocity of the stream is determined, it is compared with a desired velocity, and corrections in the pressure of the stream are made in accordance with the difference between the determined velocity and the desired velocity and whether the determined velocity is larger or smaller than the desired velocity so that the velocity of the stream can be corrected to be within a predetermined range of the desired velocity.

21 Claims, 34 Drawing Figures

METHOD AND APPARATUS FOR DETERMINING THE VELOCITY OF A LIQUID STREAM OF DROPLETS

In an ink jet printing system, it is desired that the droplets be produced at a desired frequency with a desired wavelength so that the droplets in flight are spaced from each other a desired distance whereby the drop generator is in an acceptable operating range and droplets of the proper diameter are produced. The wavelength is directly proportional to the velocity of the stream and inversely proportional to the frequency at which the stream is produced.

If the velocity changes with the frequency remaining constant, then the wavelength, which is the space between the droplets, changes. As a result, the aforesaid necessary conditions for acceptable printing will not be met.

The velocity of the ink stream can change while the frequency remains constant because of a change in temperature of the ink. This is because the viscosity of the ink is inversely proportional to the temperature of the ink. Thus, if the temperature increases, the viscosity of the stream decreases so that the velocity of the stream increases. Therefore, in a pressurized ink stream in which the ink pressure is used to control the velocity with the frequency being dependent upon perturbations placed on the pressurized ink, compensation for the change in the velocity of the ink because of a change in temperature must be obtained through changing the pressure of the ink.

Accordingly, to obtain the conditions for acceptable printing, it is necessary that the velocity of the ink stream be determined at various intervals of time such as at the end of each page of printing, for example. It also is desired that the determination of the velocity of the ink stream not require any synchronization with the production of the droplets.

The present invention enables the determination of the velocity of a pressurized ink stream at any desired time without any synchronization with the production of the droplets. The present invention accomplishes this by creating a perturbation in the stream which results in a gap in the stream at a selected distance from the nozzle from which the ink stream is directed. The time for the perturbation in the stream to travel the selected distance where it is detected as a gap is used to determine the velocity of the ink stream.

After the velocity of the ink stream has been determined, the velocity of the stream is changed, if necessary, to obtain the desired velocity. Thus, control of both the velocity and the wavelength of an ink jet stream is obtained by the present invention.

It is necessary that the velocity be determined whenever no printing is to be accomplished by the ink droplets. This is because the gap produced in the stream of droplets might result in the desired ink pattern not being obtained.

An object of this invention is to provide a method and apparatus for determining the velocity of a liquid stream of droplets.

Another object of this invention is to provide a method and apparatus for optically sensing a gap in a liquid stream of droplets.

A further object of this invention is to provide a method and apparatus for controlling the velocity of a liquid stream of droplets.

The foregoing and other objects, features, and advantages of the invention will be apparent from the following more particular description of a preferred embodiment of the invention as illustrated in the accompanying drawings.

Figure 1:
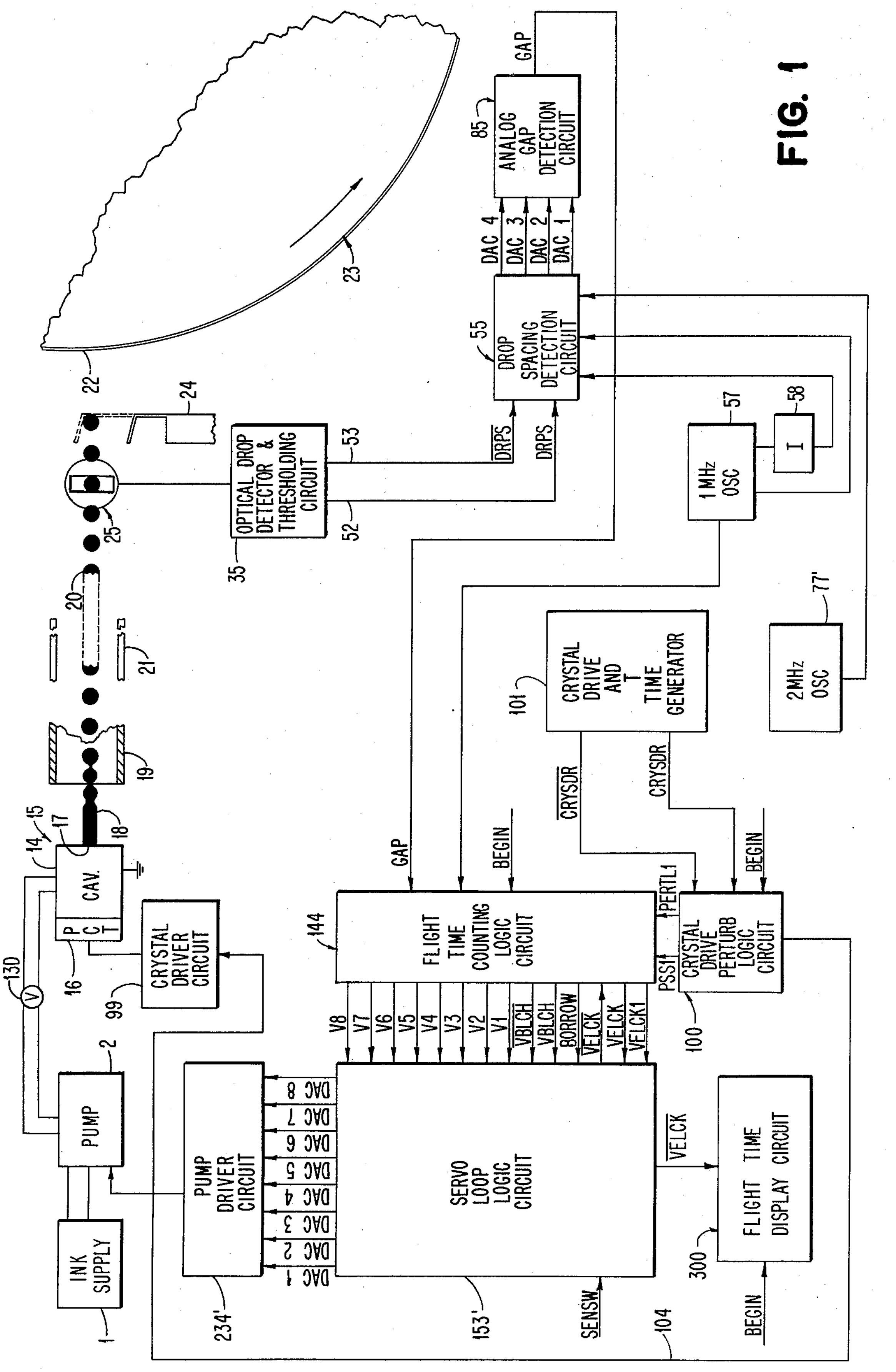
FIG. 1 is a schematic block diagram of the apparatus of the present invention for determining the velocity of a liquid stream of droplets.
Figure 2:
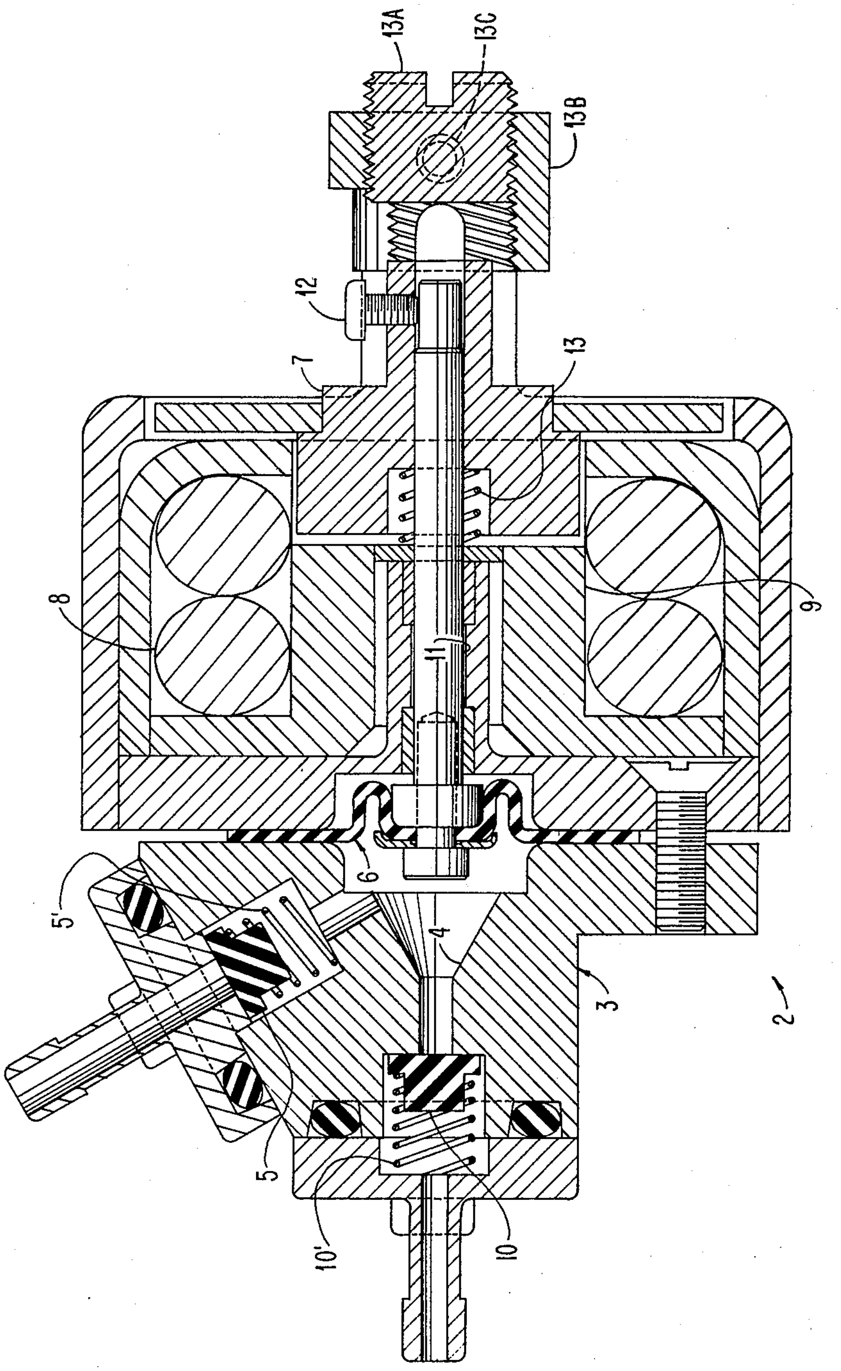
FIG. 2 is a sectional view of a pump used to supply ink under pressure from which the droplets are formed.

Referring to the drawings and particularly FIG. 1, there is shown a reservoir 1 of ink supplied to a pump 2. As shown in FIG. 2, the pump 2 includes a housing 3 having a cavity 4 formed therein. Ink is supplied from the reservoir 1 to the cavity 4 through an inlet valve 5, which is resiliently biased to its closed position by a spring 5' and is preferably formed of rubber.

The pump 2 includes a diaphragm or bellows 6, which has a portion forming a flexible wall of the cavity 4. The bellows 6 is connected to a plunger 7 of a solenoid having a coil 8 and a stator 9.

Accordingly, when a voltage is applied to the solenoid coil 8, the plunger 7 is moved to the left (as viewed in FIG. 2) to cause the bellows 6 to push ink from the cavity 4 through an outlet valve 10, which is resiliently biased to its closed position by a spring 10' and is preferably formed of rubber.

A shaft 11 connects the bellows 6 to the plunger 7. The shaft 11 is fixed to the bellows 6 by a rivet, for example, and to the solenoid plunger 7 by a set screw 12.

When the voltage is removed from the solenoid coil 8, a spring 13 returns the plunger 7 to the right until the end of the shaft 11 engages an adjustable stop 13A, which is adjustably mounted in a support 13B and retained in its adjusted position by a set screw 13C. The support 13B is fixed to a carrier on which the pump 2 is mounted.

When the solenoid plunger 7 is moved by a voltage being applied to the solenoid coil 8 to move the bellows 6, the ink is supplied under pressure from the cavity 4 through the outlet valve 10 and a valve 13D (see FIG. 1), which is used to obtain starting and stopping of the flow of ink from the pump 2, to an ink cavity 14 in an ink jet head 15. The ink jet head 15, which also is mounted on the carrier, includes a piezoelectric crystal transducer 16, which applies a predetermined frequency to the pressurized ink within the ink cavity 14.

The magnitude of the voltage applied to the solenoid coil 8 determines the pump pressure of the pump 2 as the solenoid coil 8 receives the voltage repetitively for constant periods of time. Thus, increasing the voltage of the solenoid coil 8 results in an increase in the pressure of the ink supplied from the pump 2 to the cavity 14. Therefore, the pressure of the ink supplied from the pump 2 determines the velocity at which the ink stream flows from the ink jet head 15 through a nozzle 17 (one shown). It should be understood that the ink jet head 15 may have a plurality of the nozzles 17.

An ink jet stream 18 flows from the nozzle 17 through a charge electrode 19. The stream 18 breaks up into droplets 20 at a predetermined break-off point, which is within the charge electrode 19. Thus, each of the droplets 20 can be charged to a desired magnitude or have no charge. When determining the velocity of the ink jet stream 18, no charge is applied to the droplets 20.

The droplets 20 move along a predetermined path from the charge electrode 19 to pass through deflection plates 21. If there is no charge on one of the droplets 20, the path of the non-charged droplet 20 is not altered as it passes through the deflection plates 21 so that the non-charged droplet 20 strikes a recording surface 22 such as paper, for example, on a drum 23. If the droplet 20 has been charged, the deflection plates 21 deflect the charged droplet 20 so that it will not strike the recording surface 22 but be deposited in a gutter 24.

The gutter 24, which is movable, is disposed between the deflection plates 21 and the drum 23. When the velocity of the stream 18 is to be determined, the movable gutter 24 is moved by a cam (not shown) to a position in which it will prevent any of the droplets 20 from striking the recording surface 22. The cam moves the gutter 24 to this position when the carrier, which supports the reservoir 1, the pump 2, the ink jet head 15, the charge electrode 19, and the deflection plates 21, is in a home position.

When the movable gutter 24 is moved to the position in which it prevents the droplets 20 from striking the recording surface 22, it is disposed so that the non-charged droplets 20 will have passed an optical drop sensor or detector 25. The optical drop sensor 25 also is mounted on the carrier.

Figure 3:
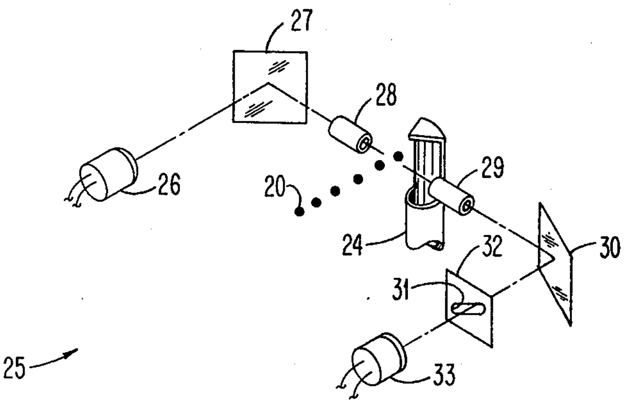
FIG. 3 is a schematic perspective view of an optical drop sensor used to detect the presence of a gap between droplets of the ink stream.

As shown in FIG. 3, the optical drop sensor 25 includes a light source such as an incandescent bulb 26 supplying light by a mirror 27 and a lens 28 across the path of the droplets 20 to a lens 29. The light from the lens 29 is reflected by a mirror 30 through an aperture 31 in a plate 32 to a phototransistor 33. One suitable example of the phototransistor 33 is sold by Texas Instruments as model TIL604.

The width of the aperture 31, transformed to the plane containing the path of the droplets 20, is substantially the same as the diameter of each of the droplets 20 of the ink stream 18 while the length of the aperture 31 is several times larger than the diameter of each of the droplets 20 so that the light from the incandescent bulb 26 will be partially prevented from reaching the phototransistor 33 whenever one of the droplets 20 is directly aligned between the lenses 28 and 29. During passage of each of the droplets 20 past the lenses 28 and 29, varying blockage of the light occurs from the time that the droplet 20 first enters the light path between the lenses 28 and 29 until it completely clears the light path between the lenses 28 and 29.

Thus, the optical drop sensor or detector 25 senses when the droplet 20 passes a predetermined position, which is defined by the light path between the lenses 28 and 29, at a selected distance from the nozzle 17. Therefore, the time between each of the adjacent droplets 20 of the stream 18 can be ascertained through the quantity of light sensed by the phototransistor 33 at any time.

Figure 4:
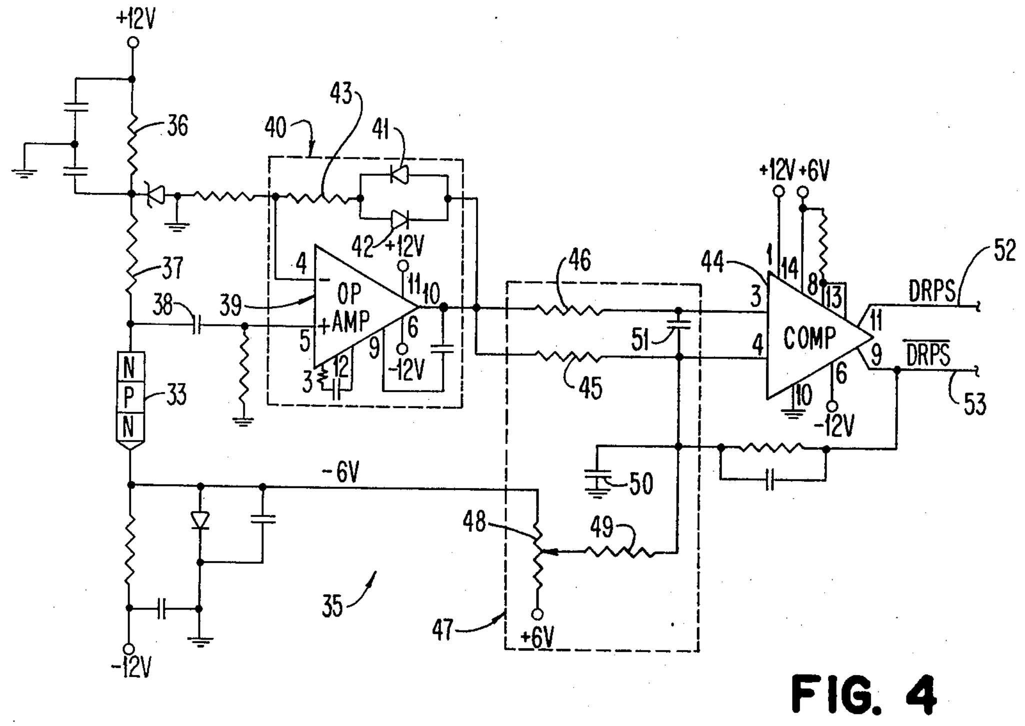
FIG. 4 is a diagram of an optical drop detector and thresholding circuit used in detecting the gap between the droplets.

The phototransistor 33 is part of an optical drop detector and thresholding circuit 35 as shown in FIG. 4. The collector of the phototransistor 33 is connected through resistors 36 and 37 to a source of voltage, which is +12 volts.

The collector of the phototransistor 33 also is connected through a capacitor 38 as an input to a positive input (pin 5) of an operational amplifier 39. One suitable example of the operational amplifier 39 is sold by Fairchild Camera and Instrument Corporation as model 709.

The operational amplifier 39 is part of a log amplifier circuit 40, which also includes a pair of diodes 41 and 42 and a resistor 43. The diodes 41 and 42 enable a gain of a small signal to be relatively large so that the small signal is amplified sufficiently to be recognized by a comparator 44 and a gain of a large signal to be such that it will not saturate the amplifier 39. The diodes 41 and 42 and the resistor 43 form a feedback circuit to feed back the output of the operational amplifier 39 to a negative input (pin 4) of the operational amplifier 39.

Figure 5:
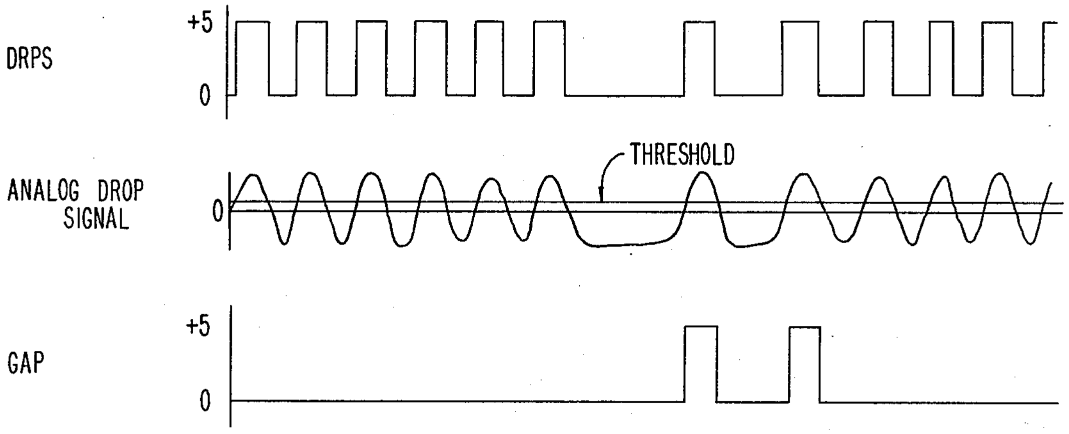
FIG. 5 is a timing diagram showing the relationship of a signal produced by the droplets passing the optical drop sensor and the signal produced from the circuit of FIG. 4 as a result of the signal produced by the droplets passing the optical drop sensor.

Thus, the log amplifier circuit 40 logarithmically amplifies the input supplied to the operational amplifier 39 through the capacitor 38. The output of the operational amplifier 39 is an analog drop signal, which is substantially sinusoidal as long as the droplets 20 pass the optical drop sensor 25 at the desired time periods in which the spacing between the droplets 20 is the same as their diameters. For example, the diameter of the droplets 20 could be 3 mils with the centers of the droplets 20 being 6 mils apart whereby the droplets 20 are 3 mils from each other. The analog drop signal for such an example is shown in FIG. 5.

The output of the operational amplifier 39 to the comparator 44 is supplied through resistors 45 and 46 to each of two inputs of the comparator 44. One suitable example of the comparator 44 is sold by Signetics as model 527.

The resistors 45 and 46 form a portion of a thresholding circuit 47. The thresholding circuit 47 also includes a potentiometer 48, which has +6 volts connected to one side and −6 volts connected to its other side, a resistor 49, and a capacitor 50.

The potentiometer 48, the resistor 49, and the capacitor 50 cooperate to set the thresholding level for the comparator 44. The resistor 45 compensates for drift of the output of the operational amplifier 39 through moving the threshold level up and down to compensate for this drift by the capacitor 50 being charged through the resistor 45 when the output of the operational amplifier 39 drifts high and the capacitor 50 discharging when the output of the operational amplifier 39 drifts low.

A capacitor 51 is disposed between the resistors 45 and 46 to prevent noise. The capacitor 51 and the resistor 46 are part of the thresholding circuit 47 but they do not set the threshold level.

When the analog drop signal from the operational amplifier 39 passes the threshold level, which is produced by the thresholding circuit 47, the comparator 44 produces a different output on each of a pair of lines 52 and 53. When the threshold level is exceeded by the analog drop signal from the operational amplifier 39 rising, the output of the comparator 44 results in the line 52 having a logical one while the line 53 has a logical zero. When the threshold level ceases to be exceeded because of the analog drop signal falling, the output of the comparator 44 causes the line 53 to be at a logical one and the line 52 to be a logical zero.

Thus, as shown in FIG. 5, the line 52 produces a high drop present signal, DRPS, from the time that the threshold level is exceeded by the analog drop signal until the threshold level is not exceeded by the analog drop signal. The DRPS signal is supplied to a drop spacing detection circuit 55 (see FIG. 1).

In addition to the DRPS signal, the drop spacing detection circuit 55 also receives a $\overline{\text{DRPS}}$ signal from the line 53. The $\overline{\text{DRPS}}$ signal is of the same magnitude as the DRPS signal but is inverse thereto.

The drop spacing detection circuit 55 also receives a CLK1M signal from an oscillator 57, which provides a frequency of 1 MHz. A $\overline{\text{CLK1M}}$ signal is supplied to the drop spacing detection circuit 55 from the oscillator 57 through an inverter 58. The $\overline{\text{CLK1M}}$ signal is an inverse signal to the CLK1M signal but of the same magnitude.

Figure 6:
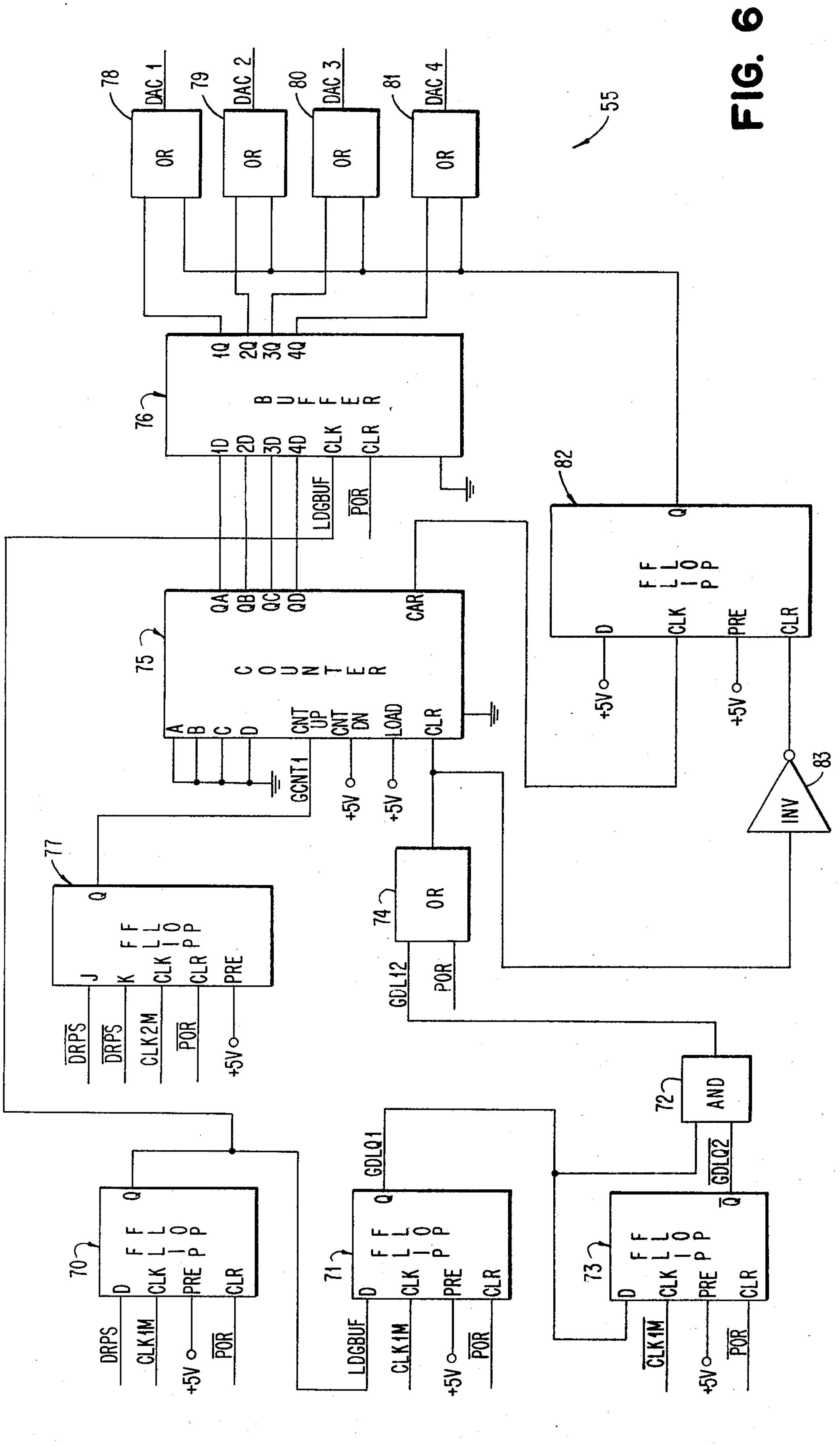
FIG. 6 is a schematic block diagram of a drop spacing detection circuit.

As shown in FIG. 6, the DRPS signal is supplied to D input of a flip-flop 70 of the drop spacing detection circuit 55. The flip-flop 70 is preferably a dual D-type positive-edge-triggered flip-flop with preset and clear sold as model SN7474 by Texas Instruments. The flip-flop 70 has its CLK input connected to the output of the oscillator 57 (see FIG. 1) to receive the CLK1M signal having a frequency of 1 MHz. The flip-flop 70 (see FIG. 6) has its PRE input connected to +5 volts.

The flip-flop 70 has its CLR input receive a $\overline{\text{POR}}$ signal, which goes low only when the power is turned on and for only a very short period of time. When this occurs, the flip-flop 70 has its Q output go low.

The flip-flop 70 has its Q output supply a load gap buffer signal, LDGBUF, to D input of a flip-flop 71, which is the same as the flip-flop 70 and has the same inputs to its CLK, PRE, and CLR inputs as the flip-flop 70. The LDGBUF signal goes up the first time that the CLK1M signal, which is received at the CLK input of the flip-flop 70, goes up after the DRPS signal at the D input of the flip-flop 70 has gone up. This timing relation is shown in FIG. 7.

When the Q output of the flip-flop 70 goes high so that the D input of the flip-flop 71 is high, the flip-flop 71 has the signal, GDLQ1, at its Q output go high when the next of the positive going CLK1M signals is supplied to the CLK input of the flip-flop 71. This timing relation is shown in FIG. 7.

The Q output of the flip-flop 71 supplies a GDLQ1 signal as one input to an AND gate 72 (see FIG. 6) and to D input of a flip-flop 73, which is the same as the flip-flop 70. The other input to the AND gate 72 is a $\overline{\text{GDLQ2}}$ signal supplied from $\overline{\text{Q}}$ output of the flip-flop 73. At the time that the Q output (GDLQ1) of the flip-flop 71 goes high, the $\overline{\text{Q}}$ output ($\overline{\text{GDLQ2}}$) of the flip-flop 73 also is high so that both inputs to the AND gate 72 are high. Therefore, as shown in FIG. 7, the output of the AND gate 72 has its GDL12 signal go high.

Figure 7:
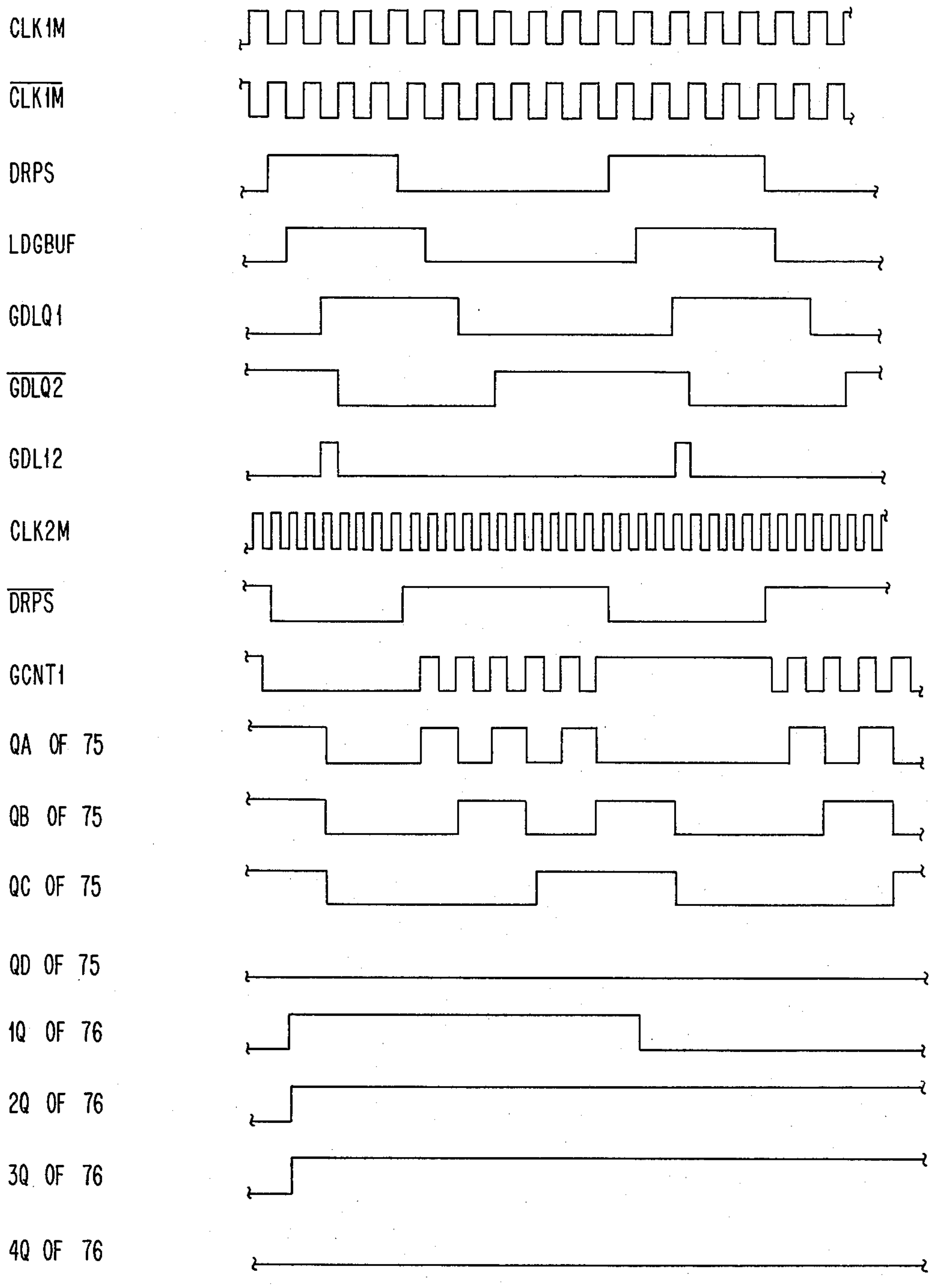
FIG. 7 is a timing diagram showing the relationship of various signals produced by the circuit of FIG. 6.

This output of the AND gate 72 stays high for only a short period of time as shown in FIG. 7 because the $\overline{\text{Q}}$ output ($\overline{\text{GDLQ2}}$) of the flip-flop 73 (see FIG. 6) goes low the first time that the $\overline{\text{CLK1M}}$ signal goes high after the Q output of the flip-flop 71 has gone up. The $\overline{\text{CLK1M}}$ signal is supplied to CLK input of the flip-flop 73, which has its PRE input receiving +5 volts. As previously mentioned, the $\overline{\text{CLK1M}}$ signal is an inverse signal to the CLK1M signal and is generated from the oscillator 57 (see FIG. 1) through the inverter 58. Thus, the output of the AND gate 72 (see FIG. 6) is up for only one-half of a cycle of the oscillator 57 (see FIG. 1).

The GDL12 signal from the output of the AND gate 72 (see FIG. 6) is supplied as one input to an OR gate 74, which has its output supplied to CLR input of a counter 75. The counter 75 is preferably a synchronous 4-bit up/down counter sold as model SN74193 by Texas Instruments. The counter 75 is employed to count only in the up direction through having each of its CNT DN and LOAD inputs connected to +5 volts. The counter 75 has its A, B, C, and D inputs grounded.

The OR gate 74 has a POR signal as its other input. The POR signal goes up only when the power is turned on and stays up for only a short period of time so that this provides a positive signal from the OR gate 74 whenever the power is initially turned on to clear the counter 75.

As shown in the timing diagram of FIG. 7, the GDL12 signal, which is the output of the AND gate 72 and is used to clear the counter 75 except when the power is turned on, occurs when the second of the CLK1M signals goes up after the DRPS signal has gone up to indicate the presence of one of the droplets 20 being sensed by the optical sensor or detector 25. This delay in clearing the counter 75 enables the count within the counter 75 to be transferred to a buffer 76. One suitable example of the buffer 76 is a hex/quadruple D-type flip-flop with clear sold as model SN74175 by Texas Instruments.

The counter 75 counts only when the DRPS signal is down and the $\overline{\text{DRPS}}$ signal is up so as to count the time when there is a gap at the optical drop sensor detector 25. Thus, when the DRPS signal goes up so that the counter 75 ceases to count, the time delay through the use of the flip-flops 71 and 73 enables the transfer of the count from the counter 75 to the buffer 76.

The counter 75 has its CNT UP input connected to Q output of a flip-flop 77, which is preferably a dual JK flip-flop with preset and clear sold as model SN7476 by Texas Instruments. The flip-flop 77 has each of its J and K inputs receive the $\overline{\text{DRPS}}$ signal. The flip-flop 77 has a CLK2M signal supplied to its CLK input. The CLK2M signal is generated by a 2 MHz oscillator 77' (see FIG. 1). The flip-flop 77 (see FIG. 6) has its CLR input connected to receive the $\overline{\text{POR}}$ signal and its PRE input connected to +5 volts.

Accordingly, the Q output of the flip-flop 77 changes state each time that the CLK2M signal to the CLK input of the flip-flop 77 goes down. As shown in the timing diagram of FIG. 7, this causes a GCNT1 signal from the Q output of the flip-flop 77 to have a 1 MHz frequency. The first time that the Q output of the flip-flop 77 goes high is when the CLK2M signal initially goes down after the $\overline{\text{DRPS}}$ signal has gone up.

Therefore, as long as the $\overline{\text{DRPS}}$ signal is up because of the optical drop sensor or detector 25 not sensing one of the droplets 20, the flip-flop 77 produces output pulses on its Q output as the GCNT1 signal for supply to the CNT UP input of the counter 75. Each of these output pulses at the Q output of the flip-flop 77 causes the counter 75 to count one.

The counter 75 has QA, QB, QC, and QD outputs with the QA output representing the count of one, the QB output representing the count of two, the QC output representing the count of four, and the QD output representing the count of eight. The counter 75 also has a CAR output, which goes high at the count of sixteen when each of the QA, QB, QC, and QD outputs goes to binary zero.

As shown in the timing diagram of FIG. 7, the counter 75 is at the count of six with both the QB and QC outputs of the counter 75 being up at the time that the $\overline{\text{DRPS}}$ signal goes down because of the threshold level, which is produced by the thresholding circuit 47 (see FIG. 4) being crossed by the analog drop signal from the operational amplifier 39 rising as shown in FIG. 5 because of the presence of one of the droplets 20 (see FIG. 1) being sensed by the optical drop sensor or detector 25.

The count in the counter 75 (see FIG. 6) is transferred to the buffer 76 at the time that the LDGBUF signal, which is from the Q output of the flip-flop 70, goes up. As shown in FIG. 7, this occurs at the start of the first positive pulse of the CLK1M signal to the CLK input of the flip-flop 70 from the 1 MHz oscillator 57 (see FIG. 1) after the DRPS signal has gone up. As previously mentioned, the counter 75 (see FIG. 6) is not cleared for two more counts because of the flip-flops 71 and 73 and the AND gate 72.

The buffer 76 has its 1D input connected to the QA output of the counter 75, its 2D input connected to the QB output of the counter 75, its 3D input connected to the QC output of the counter 75, and its 4D input connected to the QD output of the counter 75. Thus, when the LDGBUF signal from the Q output of the flip-flop 70 goes high, all of the signals at the 1D, 2D, 3D, and 4D inputs of the buffer 76 are transferred to corresponding 1Q, 2Q, 3Q, and 4Q outputs of the buffer 76. Therefore, the 1Q output of the buffer 76 represents a count of one from the counter 75, the 2Q output of the buffer 76 represents a count of two from the counter 75, the 3Q output of the buffer 76 represents a count of four from the counter 75, and the 4Q output of the buffer 76 represents a count of eight from the counter 75.

The 1Q output of the buffer 76 is one of two inputs to an OR gate 78, the 2Q output of the buffer 76 is one of two inputs to an OR gate 79, the 3Q output of the buffer 76 is one of two inputs to an OR gate 80, and the 4Q output of the buffer 76 is one of two inputs to an OR gate 81. Each of the OR gates 78–81 has a Q output of a flip-flop 82, which is the same as the flip-flop 70, as its other input.

The flip-flop 82 has each of its D and PRE inputs connected to +5 volts. The flip-flop 82 has its CLK input connected to the CAR output of the counter 75. As previously mentioned, the CAR output of the counter 75 goes high when the counter 75 has counted to a count of sixteen. Thus, the Q output of the flip-flop 82 is high whenever the counter 75 has counted to a count of sixteen. This insures that the outputs of all of the OR gates 78–81 will be high when the counter 75 has counted to a count of sixteen.

The flip-flop 82 is cleared at the same time that the counter 75 is cleared. This is because the output of the OR gate 74 is connected through an inverter 83 to CLR input of the flip-flop 82. Thus, when the inverter 83 provides a low to the CLR input of the flip-flop 82, the Q output of the flip-flop 82 goes low.

The output of the OR gate 78 is a DAC 1 signal, the output of the OR gate 79 is a DAC 2 signal, the output of the OR gate 80 is a DAC 3 signal, and the output of the OR gate 81 is a DAC 4 signal. These outputs are supplied to an analog gap detection circuit 85 (see FIG. 1).

Figure 8:
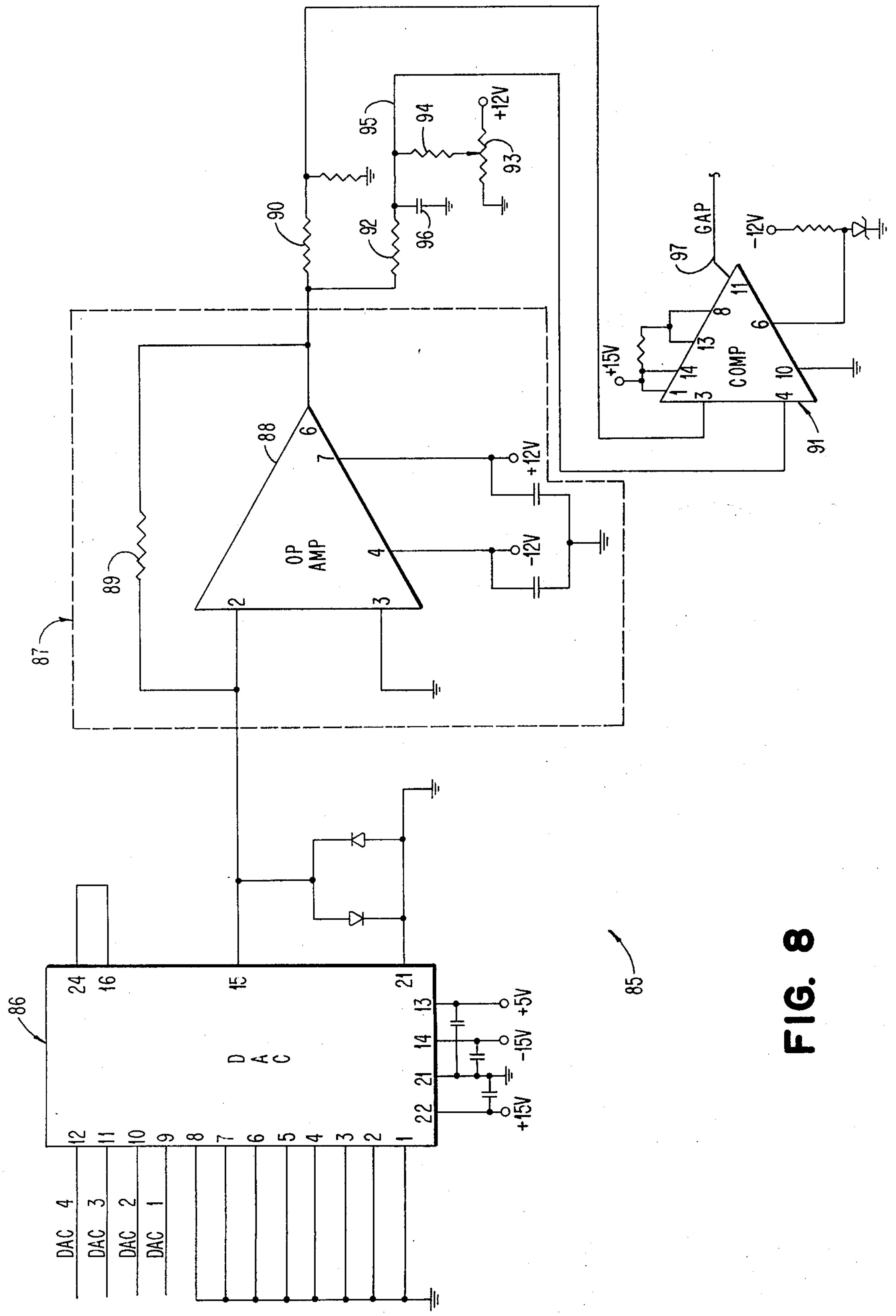
FIG. 8 is a schematic block diagram of an analog gap detection circuit.

As shown in FIG. 8, the analog gap detection circuit 85 includes a digital to analog converter (DAC) 86, to which each of the outputs from the OR gates 78–81 is connected. The output of the DAC 86 is an analog signal proportional to the count supplied by the OR gates 78–81. This current output is proportional to the count with its maximum being when all four of the OR gates 78–81 supply high inputs to the DAC 86. One suitable example of the DAC 86 is a D/A converter sold as model DAC-80, CBI-I by Burr Brown Research Corporation, Tucson, Ariz.

The output of the DAC 86 is connected to a current to voltage converter 87 of the analog gap detection circuit 85. The voltage output of the current to voltage converter 87 is a specific magnitude for each count. The current to voltage converter 87 includes an operational amplifier 88 and a feedback resistor 89. One suitable example of the operational amplifier 88 is an operational amplifier sold as model LM318N by National Semiconductor.

The output of the converter 87 is supplied through a resistor 90 to a first input of a comparator 91 and a resistor 92 to a second input of the comparator 91. One suitable example of the comparator 91 is sold by Signetics as model 527.

A potentiometer 93 is connected through a resistor 94 to a line 95, which leads from the resistor 92 to the second input of the comparator 91, to provide a threshold voltage. A capacitor 96 also is connected to the line 95 and forms an averaging circuit with the resistor 92.

The magnitudes of the resistance of the resistor 92 and the capacitance of the capacitor 96 are selected so that the averaging circuit averages about ninety-three drop times. The threshold potentiometer 93 supplies a voltage of a magnitude from zero to a few times the voltage per count supplied from the current to voltage converter 87.

Thus, when the sum of the voltages from the averaging circuit and the threshold potentiometer 93 is exceeded by the voltage from the converter 87, the comparator 91 provides a high on its output line 97. This is when the gap count by the counter 75 exceeds the average count from the prior ninety-three drop times that the counter 75 has counted for time between the droplets 20. The output on the line 97 is a GAP signal.

The time constant of the resistor 92 and the capacitor 96 is such that voltage from the converter 87 reaches the first input of the comparator 91 prior to the voltage from the converter 87 reaching the second input of the comparator 91. This time delay enables the comparator 91 to produce a high on the line 97 when the gap count by the counter 75 exceeds the sum of the average count and the count necessary to exceed the threshold voltage.

The transducer 16 (see FIG. 1) is driven from a crystal driver circuit 99 to vibrate at the desired frequency. The crystal driver circuit 99 receives an input from a crystal drive perturb logic circuit 100.

A CRYSDR signal is supplied to the crystal drive perturb logic circuit 100 from a crystal drive and T time generator 101 at a frequency of 100 KHz as more particularly shown and described in the copending patent application of Kermit A. Meece for "Method And Apparatus For Determining The Time Of Formation Of Droplets Of A Pressurized Conductive Liquid Stream And Synchronizing Charging Of Droplets Therewith," Ser. No. 843082, filed Oct. 17, 1977 now U.S. Pat. No. 4,150,384, and assigned to the same assigned as the assignee of this application. The crystal drive perturb logic circuit 100 also receives a $\overline{\text{CRYSDR}}$ signal from the crystal drive and T time generator 101 as more particularly shown and described in the aforesaid Meece application. The $\overline{\text{CRYSDR}}$ signal is of the same magnitude as the CRYSDR signal, which is up 60% of a cycle and down 40% of the cycle, but is inverse thereto.

Figure 9:
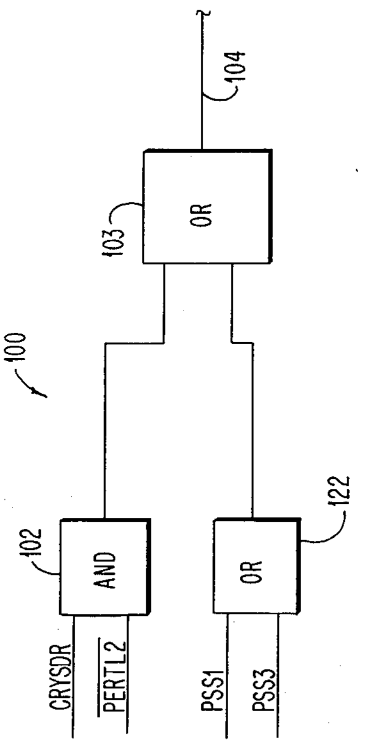
FIG. 9 is a schematic block diagram of a portion of the logic of the crystal drive perturb logic circuit.

The CRYSDR signal is supplied as one input to an AND gate 102 (see FIG. 9), which has a $\overline{\text{PERTL2}}$ signal as its other input. The $\overline{\text{PERTL2}}$ signal is always up during normal drive of the transducer 16. The $\overline{\text{PERTL2}}$ signal goes down only when the frequency to the transducer 16 is perturbed to produce the gap between the droplets 20.

Accordingly, the output of the AND gate 102 is the same as the CRYSDR signal of 100 KHz frequency during normal production of the droplets 20. This output from the AND gate 102 is supplied through an OR gate 103, which has its output line 104 connected to the crystal driver circuit 99 (see FIG. 1). The crystal driver circuit 99 drives the transducer 16. Thus, the piezoelectric crystal transducer 16 is vibrated at the frequency of 100 KHz during normal production of the droplets 20.

When the frequency from the crystal driver circuit 99 is to be perturbed to produce the gap between the droplets 20, a button 105 (see FIG. 10) is activated to connect a line 106 to a ground line 107 and to remove a line 108 from connection to the ground line 107. The line 106 is connected as one input to a NAND gate 109. The other input to the NAND gate 109 is the output of a NAND gate 110. The NAND gate 110 has the line 108 as one of its inputs and the output of the NAND gate 109 as its other input.

The line 106 is connected to +5 volts through a resistor 111. The line 108 is connected to +5 volts through a resistor 112.

Accordingly, when the button 105 is activated to connect the line 106 to the ground line 107, the input on the line 106 goes low whereby the output of the NAND gate 109 supplies a high B pulse. This B pulse remains high as long as the button 105 is activated.

The B pulse is supplied to D input of a latch 116. One suitable example of the latch 116 is a dual D-type positive-edge-triggered flip-flop with preset and clear sold as model SN7474 by Texas Instruments. The latch 116 has the $\overline{\text{CRYSDR}}$ signal supplied to its CLK input so that its Q output goes up the first time that the $\overline{\text{CRYSDR}}$ signal goes up after the B pulse has gone up.

The Q output of the latch 116 is connected to D input of a latch 117, which is the same as the latch 116, and to one of two inputs to an AND gate 118. The other input to the AND gate 118 is connected to $\overline{Q}$ output of the latch 117.

Each of the latches 116 and 117 has its CLR input connected to the $\overline{\text{POR}}$ signal. Thus, the latches 116 and 117 are cleared only for a short time when the power is turned on as the $\overline{\text{POR}}$ signal goes down at this time. Each of the latches 116 and 117 has its PRE input connected to +5 volts.

At the time that the Q output of the latch 116 goes up, both of the inputs to the AND gate 118 are high so that a BEGIN signal on its output is high. Therefore, the BEGIN signal goes high at the time that the Q output of the latch 116 goes up due to the $\overline{\text{CRYSDR}}$ signal going up after the B pulse has gone high (See the timing diagram of FIG. 11.).

Since the latch 117 has the $\overline{\text{CRYSDR}}$ signal supplied to its CLK input, this causes the Q output of the latch 117 to go high the next time that the $\overline{\text{CRYSDR}}$ signal goes up after the BEGIN signal has gone up. At this time, the $\overline{Q}$ output of the latch 117 goes low whereby the output of the AND gate 118 goes low so that the BEGIN signal goes low as shown in the timing diagram of FIG. 11.

The Q output of the latch 117 is supplied as one input to an OR gate 119. The other input to the OR gate 119 is the $\overline{Q}$ output of the latch 116.

The output of the OR gate 119 provides a $\overline{\text{BEGIN}}$ signal, which is of the opposite polarity to the BEGIN signal but of the same magnitude. Thus, the $\overline{\text{BEGIN}}$ signal falls at the same time that the BEGIN signal goes up since the $\overline{Q}$ output of the latch 116 goes low when the Q output of the latch 116 goes up and the Q output of the latch 117 is low at this time. The $\overline{\text{BEGIN}}$ signal goes high at the same time that the BEGIN signal goes low because the Q output of the latch 117 goes high at this time to cause the output of the OR gate 119 to be high while the $\overline{Q}$ output of the latch 117 has gone low to cause the output of the AND gate 118 to go low.

The BEGIN signal from the output of the AND gate 118 is supplied to CLK input of a latch 120 (see FIG. 12A), which is the same as the latch 116, of the crystal drive perturb logic circuit 100. The latch 120 has each of its D and PRE inputs connected to +5 volts. With the D input of the latch 120 at +5 volts, the latch 120 has its Q output go high as soon as the BEGIN signal goes up.

The latch 120 has a BEGIN L signal, which is supplied to D input of a latch 121, at its Q output. The latch 121, which is the same as the latch 116, receives the $\overline{\text{CRYSDR}}$ signal at its CLK input so that its Q output goes high the first time that the $\overline{\text{CRYSDR}}$ signal goes up after the BEGIN L signal, which is received at the D input of the latch 121, has gone up.

The Q output of the latch 121 supplies a PERTL2 signal while $\overline{Q}$ output of the latch 121 provides a $\overline{\text{PERTL2}}$ signal. Thus, the PERTL2 signal goes up at the same time that the BEGIN signal goes down as shown in the timing diagram of FIG. 11. This is the first time that the $\overline{\text{CRYSDR}}$ signal goes up after the BEGIN L signal has gone up.

The second input to the AND gate 102 (see FIG. 9) is the $\overline{\text{PERTL2}}$ signal. Thus, with the $\overline{\text{PERTL2}}$ signal going down the first time that the $\overline{\text{CRYSDR}}$ signal goes up after the BEGIN L signal has gone up, the AND gate 102 will not transmit the CRYSDR signal as its output to the OR gate 103 when the CRYSDR signal next goes up. Thus, the output on the line 104 of the OR gate 103 will not be the CRYSDR signal of 100 KHz frequency. Instead, the OR gate 103 will have an input from an OR gate 122 as the signal supplied to the crystal driver circuit 99 (see FIG. 1) over the line 104.

A latch 123 (see FIG. 12B), which is the same as the latches 120 and 121, has its CLK input connected to the Q output of the latch 121 to receive the PERTL2 signal. Thus, when the Q output of the latch 121 goes up, the latch 123, which has each of its D and PRE inputs connected to +5 volts, has its Q output, which supplies a PERTL1 signal, go up because its D input is at +5 volts. Therefore, as shown in the timing diagram of FIG. 11, the PERTL1 and the PERTL2 signals go up at the same time.

The PERTL1 signal from the Q output of the latch 123 (see FIG. 12B) is supplied as one input to an AND gate 125. The AND gate 125 has the CRYSDR signal from the generator 101 (see FIG. 1) as its other input. The AND gate 125 (see FIG. 12B) supplies a PFSS1 signal as its output, and this goes high the next time that the CRYSDR signal goes high after the PERTL1 signal has gone up as shown in the timing diagram of FIG. 11.

A single shot 126 (see FIG. 12B) has its B input connected to the output of the AND gate 125 and its A1 and A2 inputs grounded. One suitable example of the single shot 126 is a monostable multivibrator sold as model SN74121 by Texas Instruments.

When the output of the AND gate 125 goes high, the single shot 126 produces a positive $\overline{\text{PSS1}}$ signal at its $\overline{Q}$ output and a negative PSS1 signal at its Q output. The length of time that the PSS1 signal at the Q output remains up is set by a potentiometer 127, which is connected to pins 11 and 14 of the single shot 126, and a capacitor 128, which is connected to pins 10 and 11 of the single shot 126.

The PSS1 signal is supplied as one input to the OR gate 122 (see FIG. 9) and then through the OR gate 103 and the line 104 to the crystal driver circuit 99 (see FIG. 1). Thus, the width of the positive PSS1 signal is supplied to form an A time period of the perturbed crystal drive as shown in FIG. 11.

A single shot 129 (see FIG. 12B), which is the same as the single shot 126, has its B input connected to the output of the AND gate 125 and its A1 and A2 inputs grounded. The single shot 129 provides a $\overline{\text{PSS2}}$ signal at its $\overline{Q}$ output with the time period of the low $\overline{\text{PSS2}}$ signal being set by a potentiometer 130 and a capacitor 131, which are connected to the single shot 129 in the same manner as the potentiometer 127 and the capacitor 128 are connected to the single shot 126.

Figure 11:
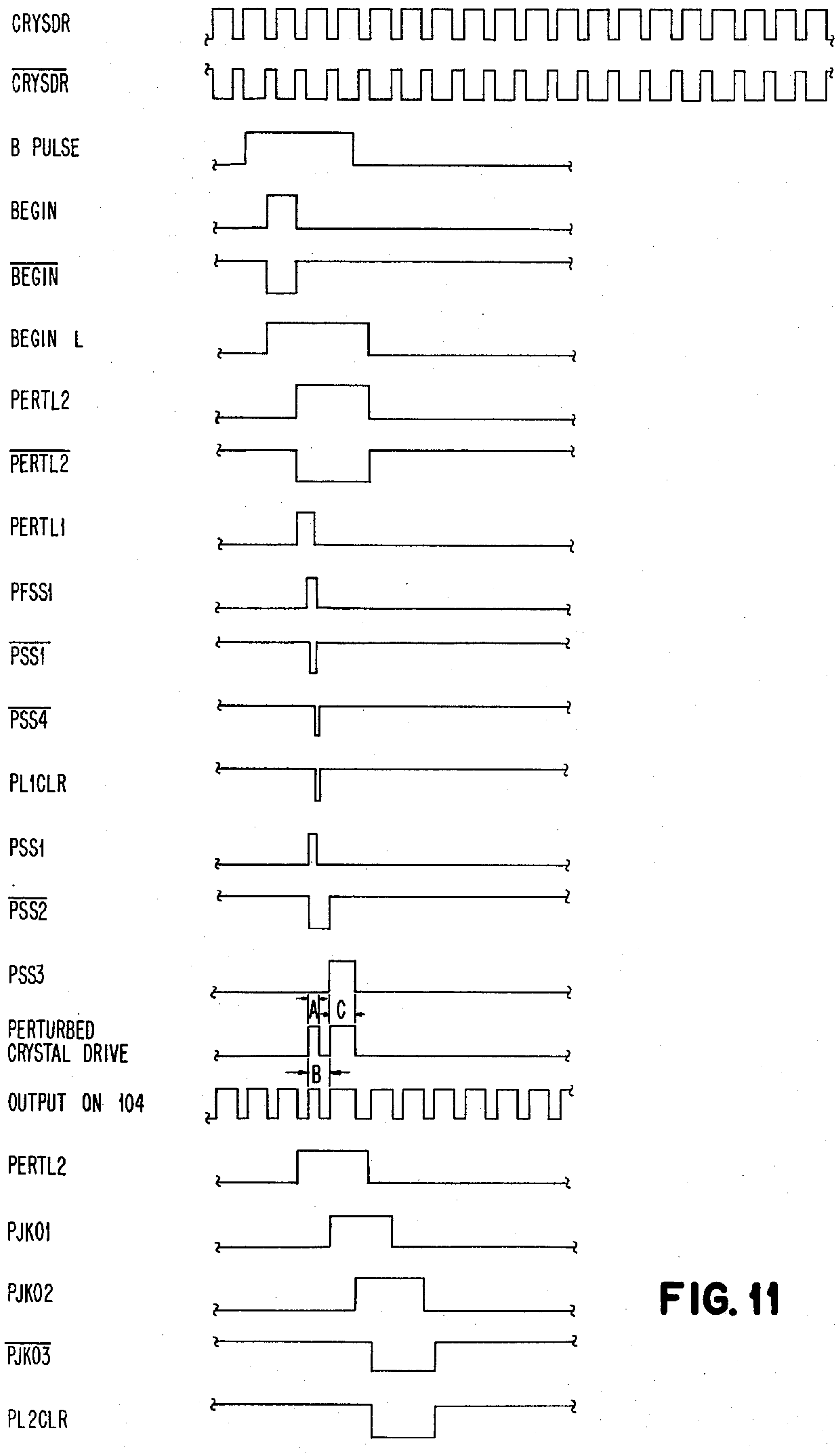
FIG. 11 is a timing diagram showing the relationship of various signals produced by the crystal drive perturb logic circuit.

The $\overline{\text{PSS2}}$ signal determines a B time period of the perturbed crystal drive as shown in FIG. 11. This includes the A time period plus the time when there is no pulse being supplied from the OR gate 103 (see FIG. 9) to the crystal driver circuit 99 (see FIG. 1) due to the output of the OR gate 103 being low.

A single shot 132 (see FIG. 12B), which is the same as the single shots 126 and 129, has the $\overline{\text{PSS2}}$ signal from the $\overline{Q}$ output of the single shot 129 supplied to its B input. The single shot 132, which has its A1 and A2 inputs grounded, has a potentiometer 133 and a capacitor 134 connected thereto in the same manner as the potentiometer 127 and the capacitor 128 are connected to the single shot 126 to control the length of time that its Q output provides a positive PSS3 signal.

The width of the positive PSS3 signal forms a C time period of the perturbed crystal drive as shown in FIG. 11. The PSS3 signal from the Q output of the single shot 132 (see FIG. 12B) is supplied as the second input to the OR gate 122 (see FIG. 9). As an example, the A time period can be 2 microseconds, the B time period 6.7 microseconds, and the C time period 8 microseconds.

It should be understood that each of the A, B, and C time periods is dependent upon the thickness of the piezoelectric crystal transducer 16, the shape of the ink cavity 14, and the force of the spring acting on the piezoelectric crystal transducer 16. The frequency of the CRYSDR signal and the length of time that the CRYSDR signal is up and down during each cycle also are dependent on these same factors.

A single shot 135 (see FIG. 12B), which is the same as the single shots 126, 129, and 132, has the $\overline{\text{PSS1}}$ signal from the $\overline{Q}$ output of the single shot 126 supplied to its B input. The single shot 135, which has its A1 and A2 inputs grounded, has a resistor 136 and a capacitor 137 connected thereto in the same manner as the potentiometer 127 and the capacitor 128 are connected to the single shot 126. The resistor 136 and the capacitor 137 set the length of time that a low $\overline{\text{PSS4}}$ signal is supplied at $\overline{Q}$ output of the single shot 135.

The $\overline{\text{PSS4}}$ signal is supplied as one input to an AND gate 138. The $\overline{\text{POR}}$ signal is the other input to the AND gate 138.

The AND gate 138 has a PL1 CLR signal as its output. With the $\overline{\text{POR}}$ signal always being high except when the power is off and for a short period of time after the power is applied, the PL1CLR signal is the same as the $\overline{\text{PSS4}}$ signal after the reset sequence so that it goes low when the $\overline{PSS4}$ signal goes down. Of course, during the power on reset time, the PL1CLR signal also goes down since the $\overline{POR}$ signal is low at this time.

The PL1CLR signal is supplied to CLR input of the latch 123 to clear it when the PL1CLR signal goes down. This causes the PERTL1 signal to go down as shown in the timing diagram of FIG. 11.

The clearing of the latch 123 occurs prior to the clearing of the latches 120 and 121. The latches 120 and 121 are cleared by the supply of a PL2CLR signal to CLR input of each of the latches 120 and 121. When this occurs, the BEGIN L signal and the PERTL2 signal go down as shown in the timing diagram of FIG. 11.

Figure 13:
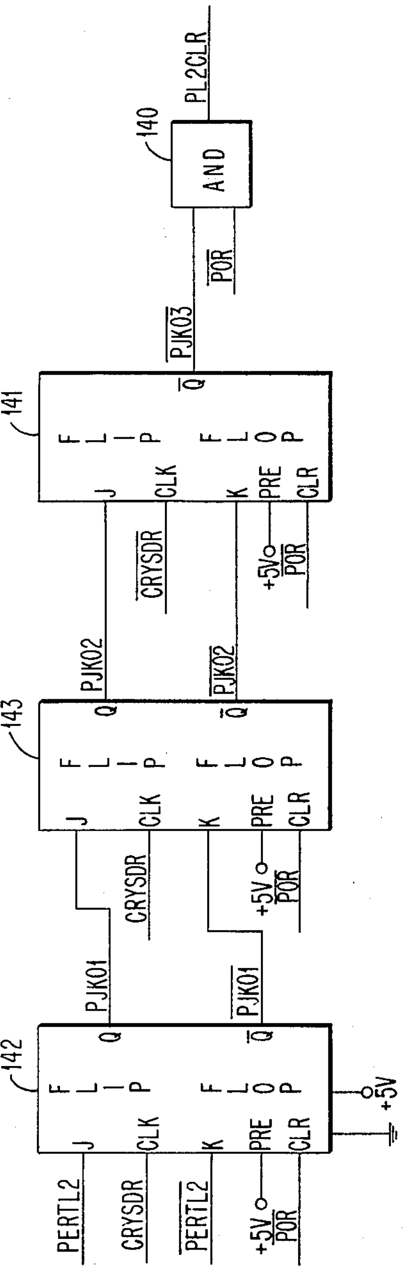
FIG. 13 is a schematic block diagram of a further portion of the crystal drive perturb logic circuit.

The PL2CLR signal is the output of an AND gate 140 (see FIG. 13). The PL2CLR signal goes down whenever either of the two inputs to the AND gate 140 is low.

One of the inputs to the AND gate 140 is the $\overline{POR}$ signal, and this is low only during the power on reset time. Thus, this causes clearing of the latches 120 and 121 when the power is turned on.

The other input to the AND gate 140 is a $\overline{PJKO3}$ signal from $\overline{Q}$ output of a flip-flop 141. One suitable example of the flip-flop 141 is a dual J-K flip-flop with preset and clear sold as model SN7476 by Texas Instruments.

Figures 12A, 12B:
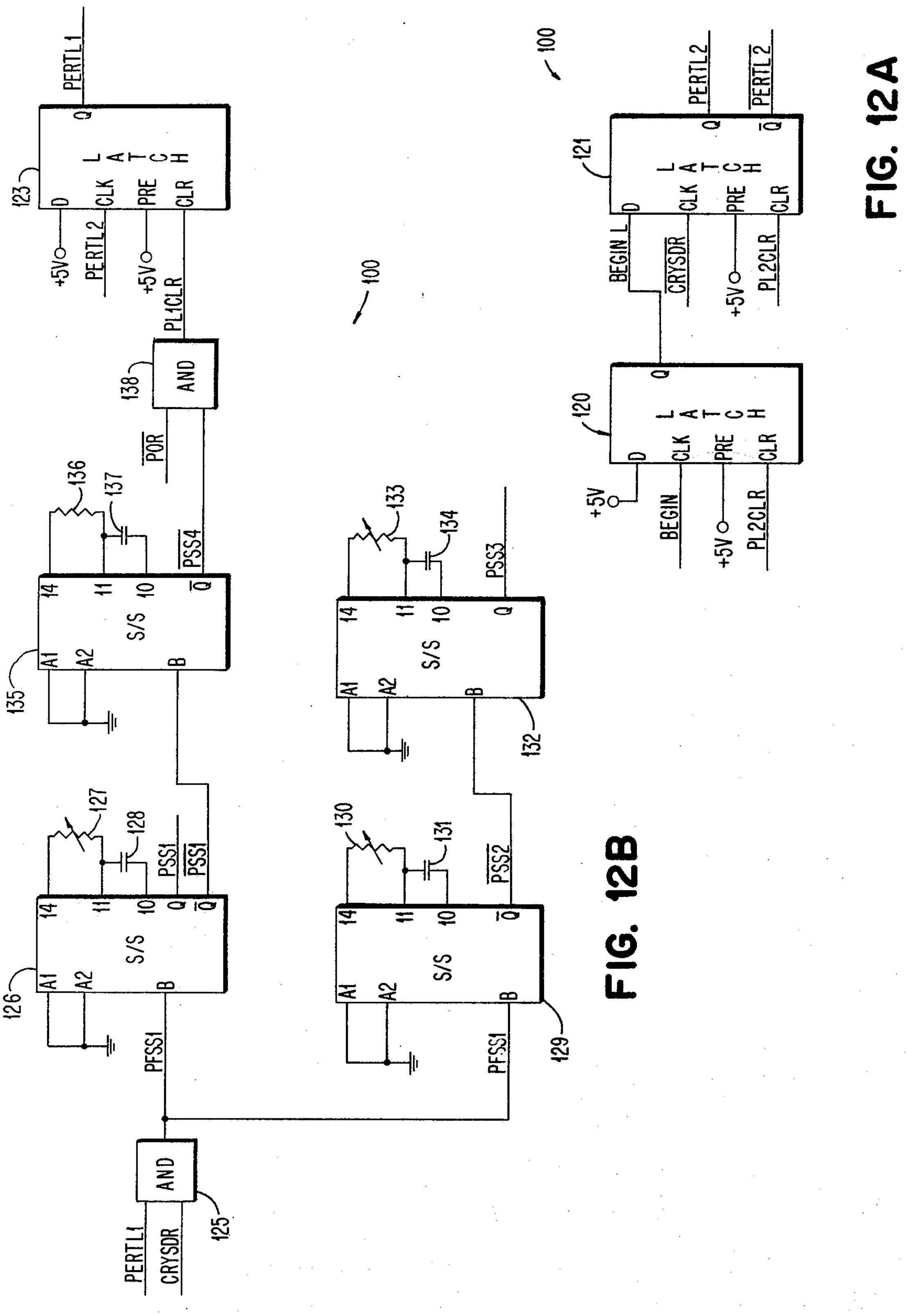
FIGS. 12A and 12B are schematic block diagrams of other portions of the crystal drive perturb logic circuit.

The $\overline{Q}$ output of the flip-flop 141 is controlled in accordance with the PERTL2 and the $\overline{PERTL2}$ signals, which are supplied to J and K inputs, respectively, of a flip-flop 142, from the Q and $\overline{Q}$ outputs, respectively, of the latch 121 (see FIG. 12A). The flip-flop 142 (see FIG. 13) is the same as the flip-flop 141.

The flip-flop 142 has its CLK input receive the CRYSDR signal of 100 KHz frequency from the crystal drive and T time generator 101 (see FIG. 1). When the CRYSDR signal goes down after the high PERTL2 signal is received at the J input of the flip-flop 142 (see FIG. 13), the Q output of the flip-flop 142 goes high and the $\overline{Q}$ output of the flip-flop 142 goes low.

A flip-flop 143, which is the same as the flip-flops 141 and 142, has its J input connected to the Q output of the flip-flop 142 and its K input connected to the $\overline{Q}$ output of the flip-flop 142. The Q output of the flip-flop 142 provides a PJKO1 signal while the $\overline{Q}$ output of the flip-flop 142 provides a $\overline{PJKO1}$ signal.

The flip-flop 143 has its CLK input receive the CRYSDR signal so that the high (the PJKO1 signal from the Q output of the flip-flop 142) at the J input of the flip-flop 143 is transferred to its Q output while the low (the $\overline{PJKO1}$ signal from the $\overline{Q}$ output of the flip-flop 142) at the K input of the flip-flop 143 is transferred to its $\overline{Q}$ output. As shown in the timing diagram of FIG. 11, a PJKO2 signal from the Q output of the flip-flop 143 goes up the next time that the CRYSDR signal goes down after the high PJKO1 signal was received at the J input of the flip-flop 143.

The flip-flop 141 has its J input connected to the Q output of the flip-flop 143 and its K input connected to the $\overline{Q}$ output of the flip-flop 143. The Q output of the flip-flop 143 provides a PJKO2 signal, which goes high one cycle of the CRYSDR signal (see FIG. 11) later than the PJKO1 signal.

The flip-flop 141 (see FIG. 13) has its CLK input receive the $\overline{CRYSDR}$ signal. As a result, the $\overline{Q}$ output of the flip-flop 141 provides a low $\overline{PJKO3}$ signal to the AND gate 140 one-half cycle later than when the PJKO2 and $\overline{PJKO2}$ signals are transferred from the flip-flop 143 to the flip-flop 141 as shown in the timing diagram of FIG. 11. Thus, the latches 120 and 121 (see FIG. 12A) are cleared by the low PL2CLR signal two and one-half cycles of the CRYSDR signal later than when the PERTL2 signal from the Q output of the latch 121 went high.

When the PL2CLR signal from the AND gate 140 (see FIG. 13) goes low to clear the latches 120 and 121 (see FIG. 12A), the PERTL2 signal falls as shown in the timing diagram of FIG. 11. As a result, the Q and $\overline{Q}$ outputs of the flip-flop 142 (see FIG. 13) change state the next time that the CRYSDR signal goes down after being up. Thus, as shown in the timing diagram of FIG. 11, the PJKO1 signal goes down one-half cycle of the CRYSDR signal after the PERTL2 signal goes down.

The PJKO2 signal, which is at the Q output of the flip-flop 143 (see FIG. 13), goes down one cycle of the $\overline{CRYSDR}$ signal later than the PJKO1 signal. Then, the $\overline{PJKO3}$ signal on the $\overline{Q}$ output of the flip-flop 141 goes up one-half cycle after the PJKO2 signal went down as shown in the timing diagram of FIG. 11. The PL2CLR signal ceases to be low at the same time that the $\overline{PJKO3}$ signal goes up.

It should be understood that the perturbed crystal drive ceases when the PSS3 signal from the Q output of the single shot 132 (see FIG. 12B) goes down. Thereafter, the CRYSDR signal, which is supplied through the AND gate 102 (see FIG. 9) and the OR gate 103 to the line 104, again controls the crystal driver circuit 99 since the $\overline{PERTL2}$ signal, which is the other input to the AND gate 102, goes up the next time that the CRYSDR signal goes up after the PSS3 signal goes low.

Figure 14:
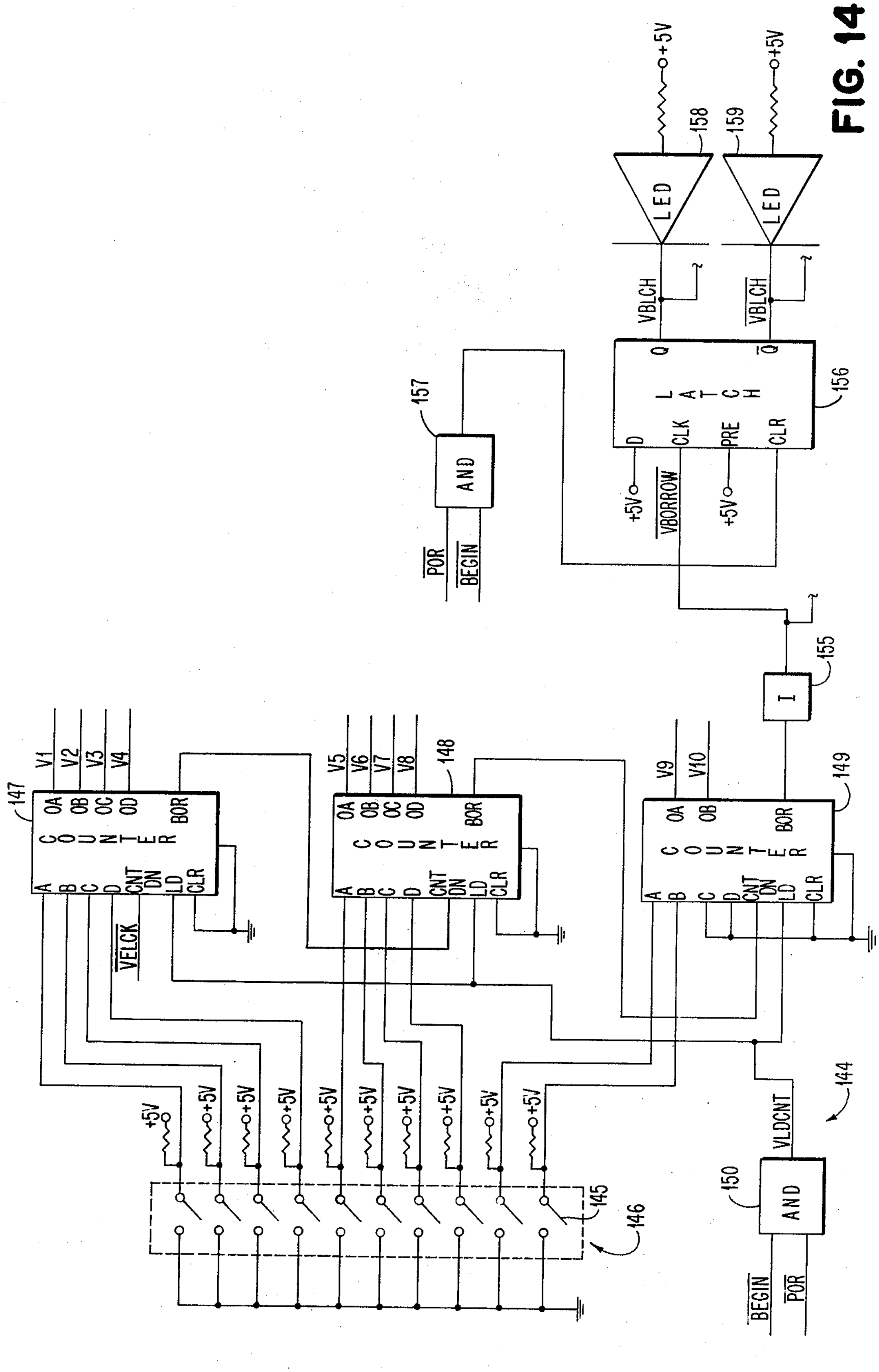
FIG. 14 is a schematic block diagram of a portion of a flight time counting logic circuit.

A flight time counting logic circuit 144 (see FIG. 1) includes manual switches 145 (see FIG. 14) of a velocity control switch 146. The switches 145 are selectively set to provide the desired flight time for one of the droplets 20 (see FIG. 1) from the time that perturbation of the stream 18 occurs to produce the gap between the droplets 20 until the gap is sensed at the optical drop sensor 25. As shown in FIG. 14, four of the manual switches 145 are connected to A, B, C, and D inputs of a counter 147 of the flight time counting logic circuit 144 with these representing the least significant bits, four other of the switches 145 are connected to inputs A, B, C, and D of a counter 148 of the flight time counting logic circuit 144 with these representing the next four bits, and the final two of the switches 145 are connected to A and B inputs of a counter 149 of the flight time counting logic circuit 144 with the B input receiving the most significant bit.

When one of the manual switches 145 is closed, a binary zero is supplied to the input of the counter of the counters 147–149 to which it is connected. When one of the manual switches 145 is open, a binary one is supplied to the input of the counter of the counters 147–149 to which it is connected.

Each of the counters 147–149 is preferably the same as the counter 75 but each is arranged to count down rather than to count up as the counter 75. The counters 147–149 are connected to each other to comprise a ten bit flight time counter.

Each of the counters 147–149 is loaded by a VLDCNT signal being supplied to its LD input. The VLDCNT signal is the output of an AND gate 150, which has the $\overline{POR}$ and $\overline{BEGIN}$ signals as its inputs. As shown in the timing diagram of FIG. 15, the VLDCNT signal goes down at the time that the $\overline{BEGIN}$ signal from the OR gate 119 (see FIG. 10) goes down. The $\overline{POR}$ signal is always up except during the power on reset time. Accordingly, the counters 147–149 (see FIG. 14) are loaded prior to the transducer 16 (see FIG. 1) being perturbed.

The down count of the counters 147–149 (see FIG. 14) begins with the supply of a $\overline{VELCK}$ signal to CNT DN input of the counter 147. As shown in the timing diagram of FIG. 15, this occurs when the PSS1 signal from the Q output of the single shot 126 (see FIG. 12B) goes up, and this is when the initial perturbation of the transducer 16 (see FIG. 1) occurs. Thus, counting by the counters 147–149 (see FIG. 14) starts when the perturbation of the transducer 16 (see FIG. 1) to cause a gap to occur begins.

Figure 15:
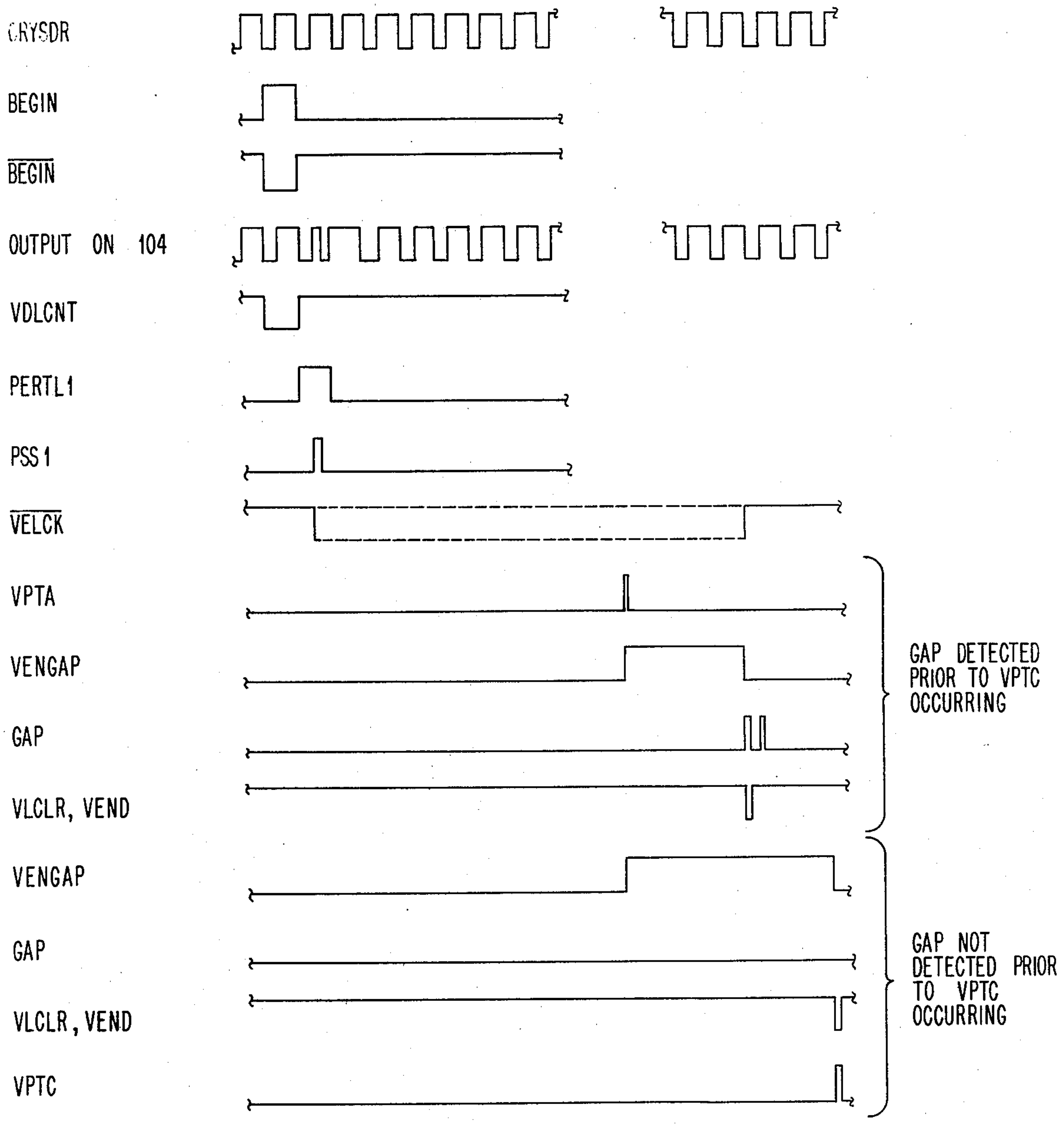
FIG. 15 is a timing diagram showing the relationship of various signals produced by the flight time counting logic circuit.

The PSS1 signal is supplied from the Q output of the single shot 126 (see FIG. 12B) to CLK input of a latch 151 (see FIG. 16), which is the same as the latch 116, of the flight time counting logic circuit 144. The latch 151 has its D input receive the PERTL1 signal from the Q output of the latch 123 (see FIG. 12B), and the PERTL1 signal is high prior to the PSS1 signal going high as shown in FIG. 15. Therefore, when the PSS1 signal goes high, the latch 151 (see FIG. 16) has its Q output, which is one of two inputs to an AND gate 152, go high. The other input to the AND gate 152 is the CLK1M signal from the 1 MHz oscillator 57 (see FIG. 1). Thus, the output of the AND gate 152 (see FIG. 16) is the frequency of the CLK1M signal of 1 MHz and is VELCK1.

The VELCK1 signal from the AND gate 152 is supplied as one input to a NOR gate 153 (see FIG. 17) of a servo loop logic circuit 153'. The NOR gate 153 supplies a $\overline{VELCK}$ signal as its output. The $\overline{VELCK}$ signal is the inversion of the frequency of the CLK1M signal of 1 MHz when a SDN1 signal, which is the other input to the NOR gate 153, is low. The SDN1 signal is the output of an AND gate 154 and goes up only at the end of an entire cycle in which it is determined that the gap occurs after the counter 149 (see FIG. 14) has produced a negative output at its BOR output. When the SDN1 signal goes up, the VELCK1 signal is no longer being produced.

When the $\overline{VELCK}$ signal is supplied to the CNT DN input of the counter 147, the counter 147 starts to count down. When the counter 147 has counted down sixteen counts whereby its OA, OB, OC, and OD outputs are all binary zeros, the counter 147 produces a negative pulse at its BOR output, which is supplied to CNT DN input of the counter 148 whereby the counter 148 counts down one. Thus, each negative pulse from the BOR output of the counter 147 causes a count down of one by the counter 148.

When the counter 148 has counted down sixteen counts whereby it has counted down a total of one hundred and twenty eight so that each of its OA, OB, OC, and OD outputs is at a binary zero, its BOR output has a negative pulse thereon. This negative pulse is supplied from the BOR output of the counter 148 to CNT DN input of the counter 149 to cause it to count down one.

While the counters 147–149 are capable of counting down from ten hundred and twenty three to zero, the manual switches 145 of the velocity control switch 146 are selectively set so that the down count is less than ten hundred and twenty three. When the counters 147–149 have been down counted to zero so that the OA, OB, OC, and OD outputs of each of the counters 147 and 148 is at a binary zero and the counter 149 has its OA and OB outputs at a binary zero, the counter 149 has the negative pulse at its BOR output.

Thus, when the negative pulse occurs at the BOR output of the counter 149, the droplet 20 (see FIG. 1) should have traveled the desired distance from its production until it was sensed at the optical drop sensor 25 if it had the desired velocity.

The BOR output of the counter 149 (see FIG. 14) is connected to an inverter 155, which has a $\overline{VBORROW}$ signal as its output. The output of the inverter 155 is connected to CLK input of a latch 156, which is the same as the latch 116. The latch 156 has its CLR input connected to the output of an AND gate 157.

The AND gate 157 has the $\overline{POR}$ and $\overline{BEGIN}$ signals as its two inputs. The $\overline{POR}$ signal is always up except for a short period of time after the power is initially turned on. The $\overline{BEGIN}$ signal from the OR gate 119 (see FIG. 10) goes down only when the BEGIN signal goes up. Therefore, the latch 156 (see FIG. 14) is cleared only when the $\overline{BEGIN}$ signal goes down to start another cycle in which the velocity of the droplets 20 is to be determined.

The latch 156 has each of its D and PRE inputs connected to +5 volts. Accordingly, when the counter 149 has a negative pulse at its BOR output, the latch 156 has its $\overline{Q}$ output ($\overline{VBLCH}$) go high to turn off an LED 158 connected thereto while its Q output (VBLCH) goes low to turn on an LED 159 connected thereto. The illumination of the LED 159 indicates that the velocity is low in comparison with the desired velocity, and the illumination of the LED 158 indicates that the velocity is high in comparison with the desired velocity.

If the $\overline{VELCK}$ signal from the NOR gate 153 (see FIG. 17) is stopped prior to the BOR output of the counter 149 (see FIG. 14) going negative, this indicates that the velocity of the droplets 20 (see FIG. 14) is above the desired velocity. Therefore, because the BOR output of the counter 149 (see FIG. 14) does not have a negative pulse, the Q output of the latch 156 stays low to cause the LED 158 to be illuminated while the $\overline{Q}$ output remains high to cause the LED 159 to be turned off. Thus, the illumination of the LED 158 indicates that the velocity of the droplets 20 is greater than the desired velocity.

Figure 18:
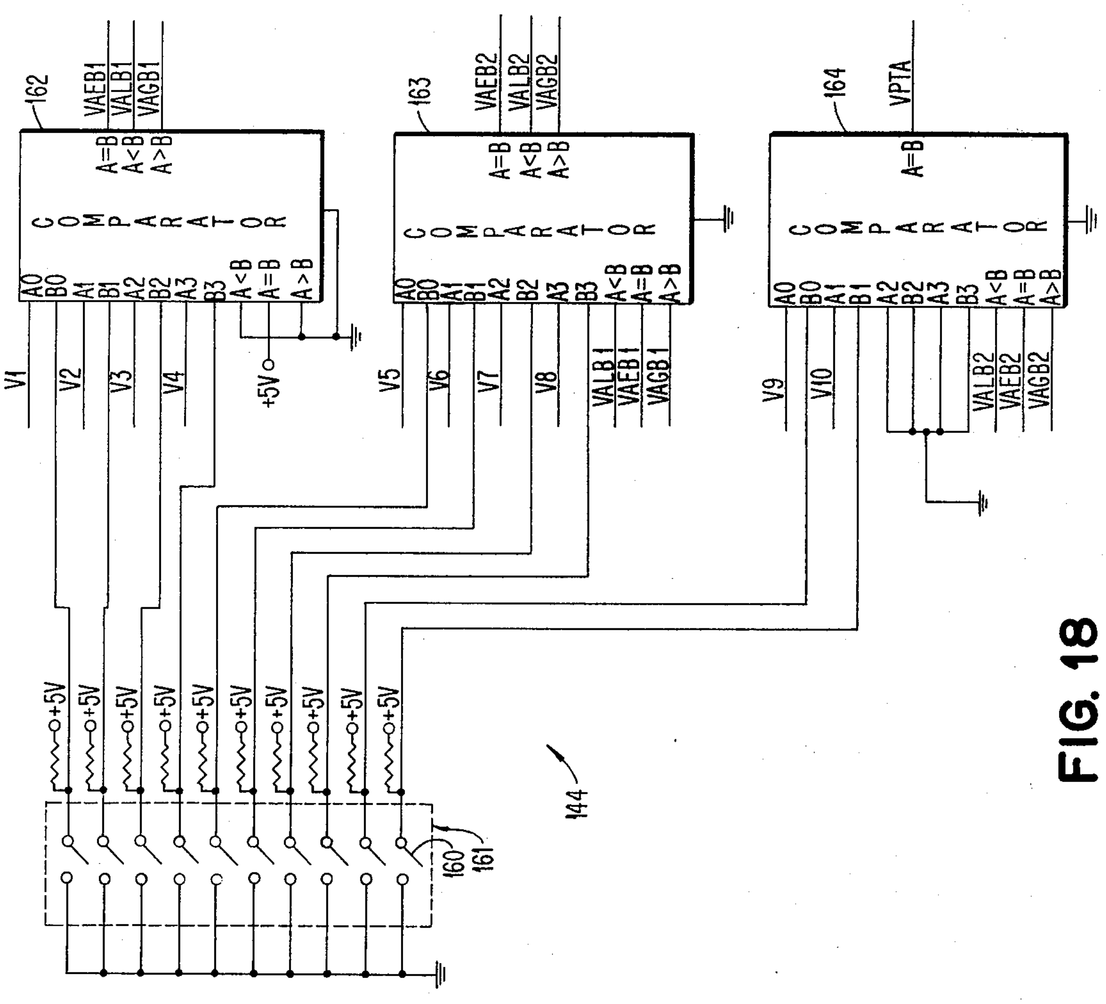
FIG. 18 is a schematic block diagram of another portion of the flight time counting logic circuit.

In order to insure against noise being interpreted as the GAP signal from the comparator 91 (see FIG. 8), it is desired to preset a droplet flight time in which the GAP signal cannot be effective. This is accomplished by selectively setting manual switches 160 (see FIG. 18) of a first preset flight time switch 161 of the flight time counting logic circuit 144 in accordance with a desired flight time of the droplet 20 in which the GAP signal cannot be effective.

Four of the switches 160 are connected to B0, B1, B2, and B3 inputs of a comparator 162, four of the switches 160 are connected to B0, B1, B2, and B3 inputs of a comparator 163, and two of the switches 160 are connected to B0 and B1 inputs of a comparator 164. Each of the comparators 162–164 is preferably a 4-bit magnitude comparator sold by Texas Instruments as model SN7485.

When one of the manual switches 160 is open, a binary one is supplied to the input of the comparator of the comparators 162–164 to which it is connected. When one of the switches 160 is closed, a binary zero is supplied to the input of the comparator of the comparators 162–164 to which it is connected.

Each of the comparators 162–164 also has A0, A1, A2, and A3 inputs. The A0, A1, A2, and A3 inputs of the comparator 162 are connected to the OA, OB, OC, and OD outputs, respectively, of the counter 147 (see FIG. 14). Each of these outputs varies between a binary one and a binary zero as the counter 147 is counted down.

The inputs A0, A1, A2, and A3 of the comparator 163 (see FIG. 18) are connected to the outputs OA, OB, OC and OD, respectively, of the counter 148 (see FIG. 14). Each of these outputs also changes between a binary one and a binary zero as the counter 148 is counted down.

The comparator 164 (see FIG. 18) has its A0 and A1 inputs connected to the OA and OB outputs of the counter 149 (see FIG. 14). Each of the outputs OA and OB of the counter 149 changes between a binary one and a binary zero as the counter 149 is counted down.

When the inputs to the comparator 164 (see FIG. 18) from the switches 160 and the counter 149 (see FIG. 14) are equal, the comparator 164 provides a high VPTA signal as its output. The VPTA signal is supplied to D input of a latch 165 (see FIG. 19), which is the same as the latch 116. When the next positive pulse occurs at CLK input of the latch 165, the positive signal at the D input of the latch 165 is transferred to its Q output. The CLK input of the latch 165 is connected to the output of an inverter 165′ (see FIG. 17), which supplies a VELCK signal as its output with this being the inverse of the $\overline{\text{VELCK}}$ signal from the NOR gate 153.

A latch 166 (see FIG. 19), which is the same as the latch 165, has its CLK input connected to the Q output of the latch 165. The latch 166 has each of its D and PRE inputs connected to +5 volts. Therefore, when the latch 166 has a high at its CLK input, its Q output goes up to provide a VENGAP signal. The VENGAP signal is supplied as one input to an AND gate 167 with the other input being the GAP signal from the comparator 91 (see FIG. 8).

Therefore, no output can be obtained from the AND gate 167 (see FIG. 19) until the Q output of the latch 166 goes up to indicate that a sufficient time period has elapsed so that the signal from the comparator 91 is not noise but is the GAP signal due to the gap having been sensed at the optical drop sensor 25 (see FIG. 3).

The output of the AND gate 167 (see FIG. 19) is one input to a NOR gate 168. Thus, when the output of the AND gate 167 is high due to the high GAP signal being supplied from the comparator 91 (see FIG. 8) with the VENGAP signal being up, the NOR gate 168 (see FIG. 19) supplies a low VEND signal as its output.

The output of the NOR gate 168 is one input to an AND gate 169. The other input to the AND gate 169 is the $\overline{\text{POR}}$ signal, which is high except for a short period of time after the power is initially turned on.

Accordingly, when the GAP signal goes up, a VLCLR signal, which is the output of the AND gate 169, goes down. The VLCLR signal is supplied to CLR input of the latch 151 (see FIG. 16). This results in the Q output of the latch 151 going low whereby the AND gate 152 no longer passes the CLK1M signals from the 1 MHz oscillator 57 (see FIG. 1) since the input to the AND gate 152 (see FIG. 16) from the Q output of the latch 151 is low.

The VLCLR signal from the AND gate 169 (see FIG. 19) also is supplied to CLR input of the latch 166. Therefore, the VENGAP signal from the latch 166 goes down when the VLCLR signal from the AND gate 169 goes low.

If the gap in the stream 18 (see FIG. 1) of the droplets 20 is not sensed after a maximum predetermined period of time, this indicates that there is a failure in some component of the ink supply system such as the pump 2, the valve 13D, the nozzle 17 being clogged, or the transducer 16 being bad, for example, and it is necessary to stop the counting after this maximum predetermined period of time. Accordingly, a 10-bit comparator (see FIG. 20), which comprises comparators 171, 172, and 173, is employed as part of the flight time counting logic circuit 144. Each of the comparators 171–173 is the same as the comparators 162–164.

Figure 20:
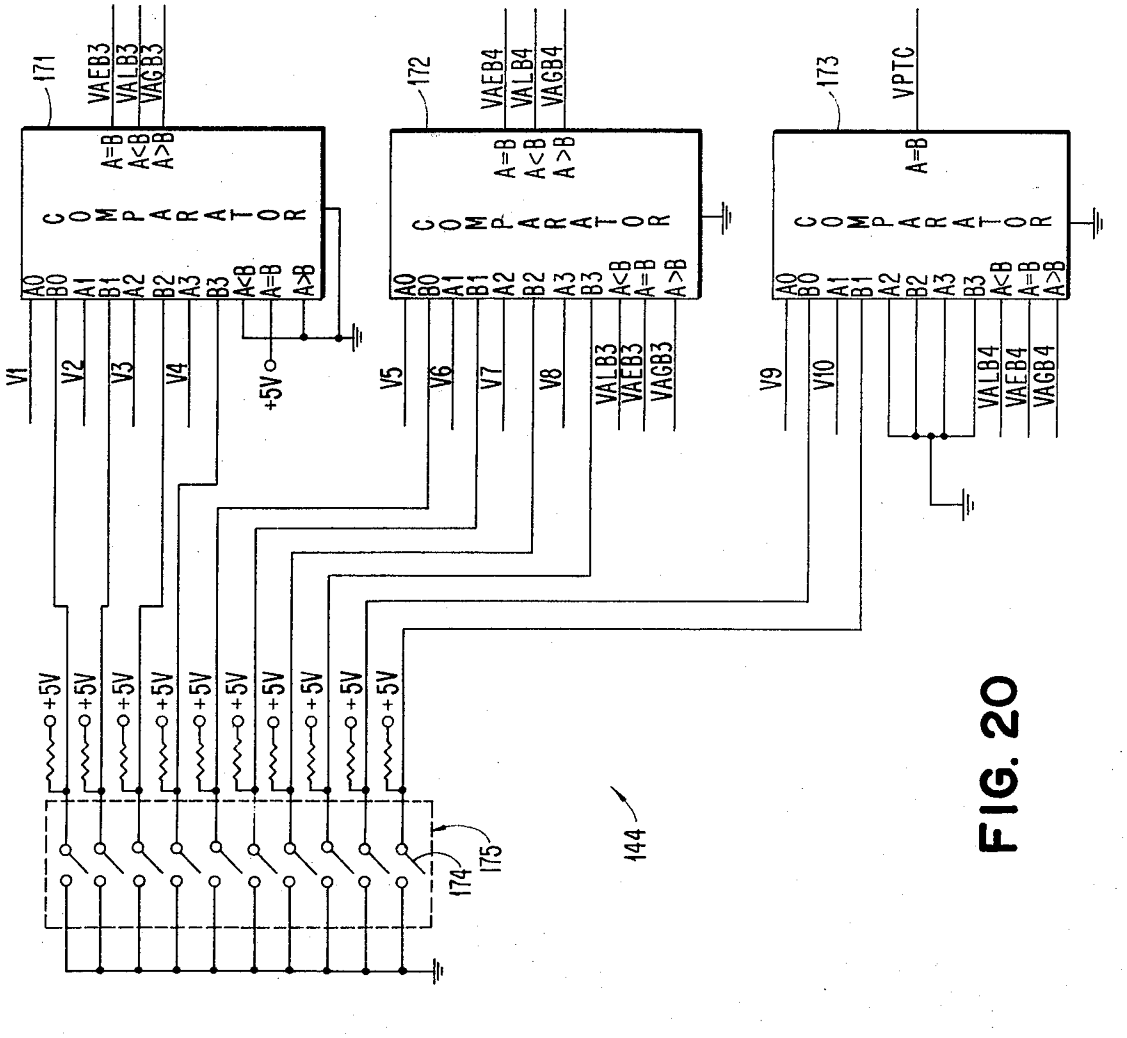
FIG. 20 is a schematic block diagram of still another portion of the flight time counting logic circuit.

The time at which it is desired to stop counting of the gap flight time is set through selectively setting manual switches 174 of a second preset flight time switch 175. As shown in FIG. 20, four of the manual switches 174 are connected to B0, B1, B2, and B3 inputs of the comparator 171, four of the switches 174 are connected to B0, B1, B2, and B3 inputs of the comparator 172, and two of the switches 174 are connected to B0 and B1 inputs of the comparator 173.

The comparator 171 has its A0, A1, A2, and A3 inputs connected to the OA, OB, OC, and OD outputs, respectively, of the counter 147 (see FIG. 14). The comparator 172 (see FIG. 20) has its A0, A1, A2, and A3 inputs connected to the OA, OB, OC, and OD outputs, respectively of the counter 148 (see FIG. 14). The comparator 173 (see FIG. 20) has its A0 and A1 inputs connected to the OA and OB outputs, respectively, of the counter 149 (see FIG. 14).

When the time has elapsed for which the manual switches 174 (see FIG. 20) of the switch 175 have been set by the counters 147–149 (see FIG. 14) counting down, the comparator 173 produces a high VPTC signal as its output. This high VPTC signal is applied as a second input to the NOR gate 168 (see FIG. 19). Thus, when this high VPTC signal occurs and there has not been a high signal from the AND gate 167 because the GAP signal has not gone up, then the AND gate 169 supplies the low VLCLR signal to CLR input of the latch 151 (see FIG. 16) so that the AND gate 152 no longer passes the CLK1M signals of 1 MHz. This relation is shown in the timing diagram of FIG. 15.

Therefore, the VLCLR signal from the AND gate 169 (see FIG. 19) goes low whenever the VEND signal from the output of the NOR gate 168 goes low. This occurs either when there is a high from the AND gate 167 to indicate that the GAP signal has been received after the desired first preset flight time, which has been set by the switches 160 (see FIG. 18) of the switch 161, has elapsed or that the VPTC signal has gone up prior to the output from the AND gate 167 (see FIG. 19) going up. Thus, the VEND signal from the NOR gate 168 goes low when either the GAP signal has been produced by the optical drop sensor 25 (see FIG. 3) sensing the absence of the droplet 20 after the first preset flight time has elapsed or the second preset flight time, which has been set by the switches 174 (see FIG. 20) of the switch 175, has elapsed before the GAP signal is produced. In either instance, it is desired to prevent further counting by the counters 147–149 (see FIG. 14). It also is desired to determine the velocity of the droplet 20 relative to the desired velocity.

Accordingly, the VEND signal from the NOR gate 168 (see FIG. 19) is not only supplied as an input to the AND gate 169 but also is supplied to an inverter 180

(see FIG. 17), which supplies a $\overline{VEND}$ signal to CLK input of a latch 181, which is the same as the latch 116. The latch 181 has each of its D and PRE inputs connected to +5 volts.

Therefore, when the VEND signal from the NOR gate 168 (see FIG. 19) goes low, the $\overline{VEND}$ signal is high at the CLK input of the latch 181 (see FIG. 17) whereby the latch 181 has its Q output go high. The Q output of the latch 181 is one input to an AND gate 182, which has its output (VENDEN) connected as one input to an AND gate 183. The other input to the AND gate 182 is from a manual switch (not shown), which is closed to supply a high SENSW signal to the AND gate 182 whenever it is desired to complete a servo loop to the pump 2.

The other input to the AND gate 183 is the CLK1M signal from the 1 MHz oscillator 57 (see FIG. 1). Accordingly, the AND gate 183 (see FIG. 17) has a VDNCNT signal as its output and it is at the 1 MHz frequency from the time that the CLK1M signal goes up after the VEND signal is produced from the output of the NOR gate 168 (see FIG. 19). This is shown in the timing diagram of FIG. 21.

The VDNCNT signal is supplied to A input of a servo sequence counter 185 (see FIG. 17) and to CLK input of each of latches 186 and 187, which are the same as the latch 116. One suitable example of the counter 185 is a 4-bit binary counter sold as model SN7493A by Texas Instruments.

The counter 185 has VDNC1, VDNC2, VDNC3, and VDNC4 signals on its OA, OB, OC, and OD outputs, respectively. The servo sequence counter 185 counts only to a count of ten at which time it is cleared when a SCLRVDN signal, which is supplied to its RO2 input, goes high. The counter 185 has its B input connected to its OA output and its RO1 input receiving the $\overline{POR}$ signal. Thus, the counter 185 also is cleared when the $\overline{POR}$ signal goes high during power on reset time.

The OA output of the counter 185 is connected to an inverter 190, which has a $\overline{VDNC1}$ signal as its output. The counter 185 has its OB output connected to an inverter 191, which has a $\overline{VDNC2}$ signal as its output. The OC output of the counter 185 is connected to an inverter 192, which has a $\overline{VDNC3}$ signal as its output. The counter 185 has its OD output connected to an inverter 193, which has a $\overline{VDNC4}$ signal as its output.

Figure 22:
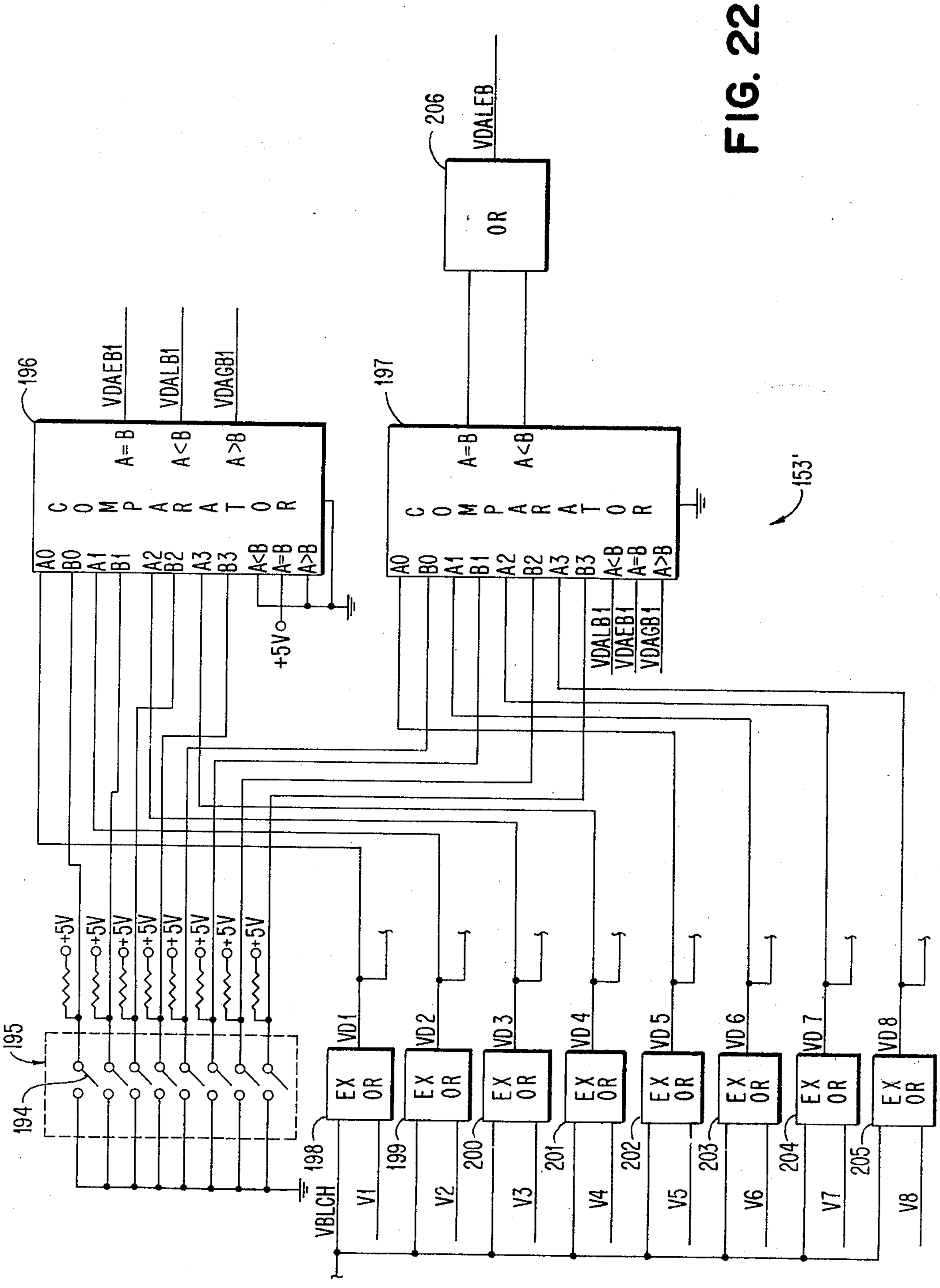
FIG. 22 is a schematic block diagram of a portion of the servo loop logic circuit.

Since it is not always possible to obtain the exact velocity desired, an acceptable velocity difference on each side of the desired velocity is set by selectively opening and closing manual switches 194 (see FIG. 22) of a velocity check switch 195 of the servo loop logic circuit 153'. Four of the eight switches 194 are connected to B0, B1, B2, and B3 inputs of a comparator 196, which is the same as the comparator 162. The other four of the switches 194 are connected to B0, B1, B2, and B3 inputs of a comparator 197, which is the same as the comparator 162.

When one of the manual switches 194 is closed, a binary zero is supplied to the input of the comparator 196 or 197 to which it is connected. When one of the manual switches 194 is open, a binary one is supplied to the input of the comparator 196 or 197 to which it is connected.

The comparator 196 has its A0, A1, A2, and A3 inputs connected to outputs of EXCLUSIVE OR gates 198, 199, 200, and 201, respectively. The comparator 197 has its A0, A1, A2, and A3 inputs connected to outputs of EXCLUSIVE OR gates 202, 203, 204, and 205, respectively. One suitable example of the EXCLUSIVE OR gates 198–205 is sold as model SN7486 by Texas Instruments.

Each of the EXCLUSIVE OR gates 198–205 has the VBLCH signal, which is from the Q output of the latch 156 (see FIG. 14), as one of its inputs. The EXCLUSIVE OR gate 198 (see FIG. 22) has the OA output (V1) ofthe counter 147 (see FIG. 14) as its other input. The other input to the EXCLUSIVE OR gate 199 (see FIG. 22) is the OB output (V2) of the counter 147 (see FIG. 14). The EXCLUSIVE OR gate 200 (see FIG. 22) has the OC output (V3) of the counter 147 (see FIG. 14) as its other input. The other input to the EXCLUSIVE OR gate 201 (see FIG. 22) is the OD output (V4) of the counter 147 (see FIG. 14).

The EXCLUSIVE OR gate 202 (see FIG. 22) has the OA output (V5) of the counter 148 (see FIG. 14) as its other input. The other input to the EXCLUSIVE OR gate 203 (see FIG. 22) is the OB output (V6) of the counter 148 (see FIG. 14). The EXCLUSIVE OR gate 204 (see FIG. 22) has the OC output (V7) of the counter 148 (see FIG. 14) as its other input. The other input to the EXCLUSIVE OR gate 205 (see FIG. 22) is the OD output (V8) of the counter 148 (see FIG. 14).

When the VBLCH signal is high because the velocity is less than the desired velocity, the output of any of the EXCLUSIVE OR gates 198–205 (see FIG. 22) is the opposite of its other input from the counter 147 or 148 (see FIG. 14). When the VBLCH is low because the velocity is greater than the desired velocity, then each of the EXCLUSIVE OR gate 198–205 (see FIG. 22) has the same signal on its output as the input from the counter 147 or 148 (see FIG. 14). Accordingly, the combined outputs of the EXCLUSIVE OR gates 198–205 (see FIG. 22) indicate the absolute difference between the desired flight time and the actual flight time.

Figure 16:
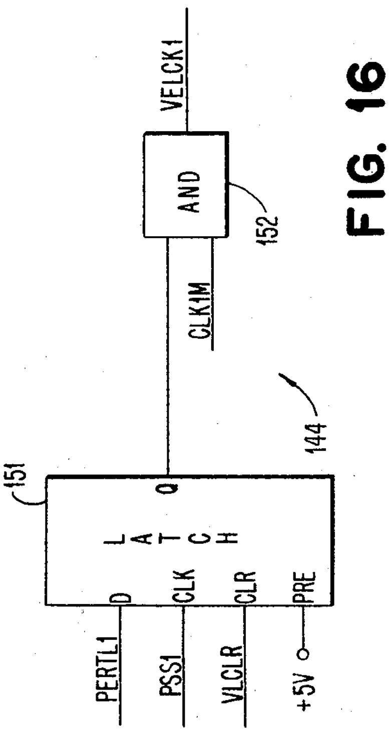
FIG. 16 is a schematic block diagram of another portion of the flight time counting logic circuit.

The counters 147–149 (see FIG. 14) stop counting when the VELCK1 signal ceases to be produced from the AND gate 152 (see FIG. 16). This occurs when the low VLCLR signal is supplied to the CLR input of the latch 151 from the AND gate 169 (see FIG. 19) because of the high GAP signal being produced from the comparator 91 (see FIG. 8) or the high VPTC signal being produced from the comparator 173 (see FIG. 20) because of the second preset flight time having elapsed. Therefore, the count in the counters 147–149 (see FIG. 14) is the difference between the desired velocity and the actual velocity.

Accordingly, the EXCLUSIVE OR gates 198–205 (see FIG. 22) supply this difference to the comparators 196 and 197. When this difference is acceptable, the comparator 197 supplies a positive pulse from either its A=B output or from its A<B output. These two outputs of the comparator 197 are supplied as inputs to an OR gate 206.

The OR gate 206 produces a high VDALEB signal as its output when either of its inputs is high. When the VDALEB signal is up, this indicates that the velocity of the droplets 20 is within the acceptable velocity difference from the desired velocity.

Figure 23:
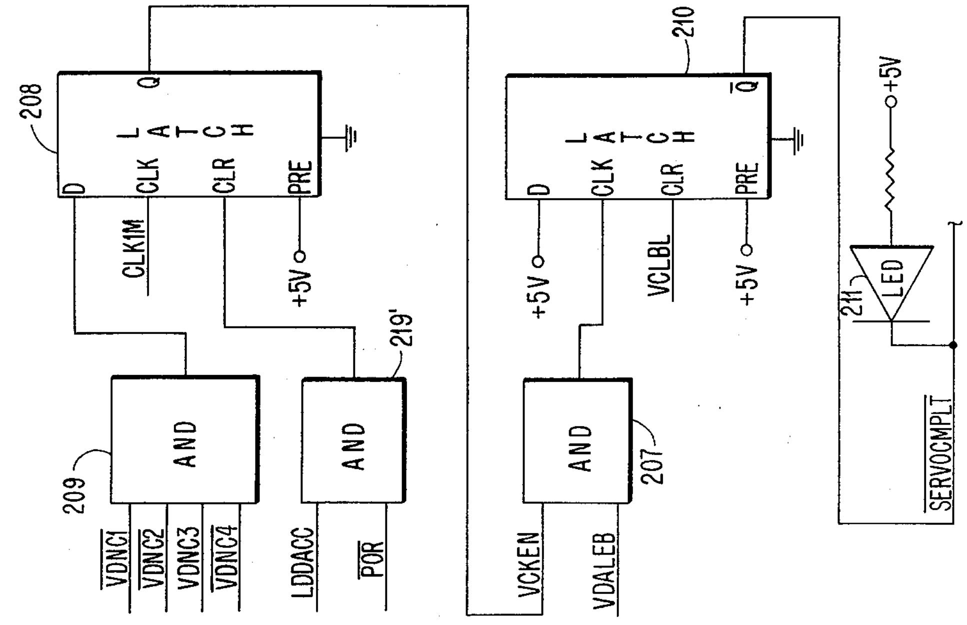
FIG. 23 is a schematic block diagram of a further portion of the servo loop logic circuit.

The VDALEB signal from the OR gate 206 is supplied as one input to an AND gate 207 (see FIG. 23) of the servo loop logic circuit 153' (see FIG. 1). The other input to the AND gate 207 (see FIG. 23) is from Q output of a latch 208, which is the same as the latch 116. When the servo sequence counter 185 (see FIG. 17) has counted to four, the Q output of the latch 208 (see FIG. 23) goes high.

The latch 208 has its D input connected to the output of an AND gate 209. The AND gate 209 provides a high to the D input of the latch 208 at the count of four of the servo sequence counter 185 (see FIG. 17) because the inputs to the AND gate 209 (see FIG. 23) are the $\overline{VDNC1}$, the $\overline{VDNC2}$, the VDNC3, and the $\overline{VDNC4}$ signals. The VDNC3 signal represents the count of four at the servo sequence counter 185 (see FIG. 17). Accordingly, when the VDNC3 signal is up and the $\overline{VDNC1}$, $\overline{VDNC2}$, and $\overline{VDNC4}$ signals are up, the AND gate 209 (see FIG. 23) provides a high to the D input of the latch 208.

The latch 208 has its CLK input receiving the 1 MHz CLK1M signal. Thus, the latch 208 has the high at its D input transferred to its Q output (VCKEN) on the next up transition of the CLK1M signal.

If the VDALEB signal from the output of the OR gate 206 (see FIG. 22) is high, then the AND gate 207 (see FIG. 23) provides a high at CLK input of a latch 210, which is the same as the latch 116, when the servo sequence counter 185 (see FIG. 17) is at a count of four. The latch 210 (see FIG. 23) has each of its D and PRE inputs connected to +5 volts. Thus, when the CLK input of the latch 210 receives a positive going signal, the latch 210 has its $\overline{Q}$ output go low.

The $\overline{Q}$ output of the latch 210 is connected to an LED 211. When the $\overline{Q}$ output of the latch 210 is low to indicate that the velocity is within the acceptable range, the LED 211 is illuminated. This indicates to the operator that no further servo cycles are necessary.

Figure 24:
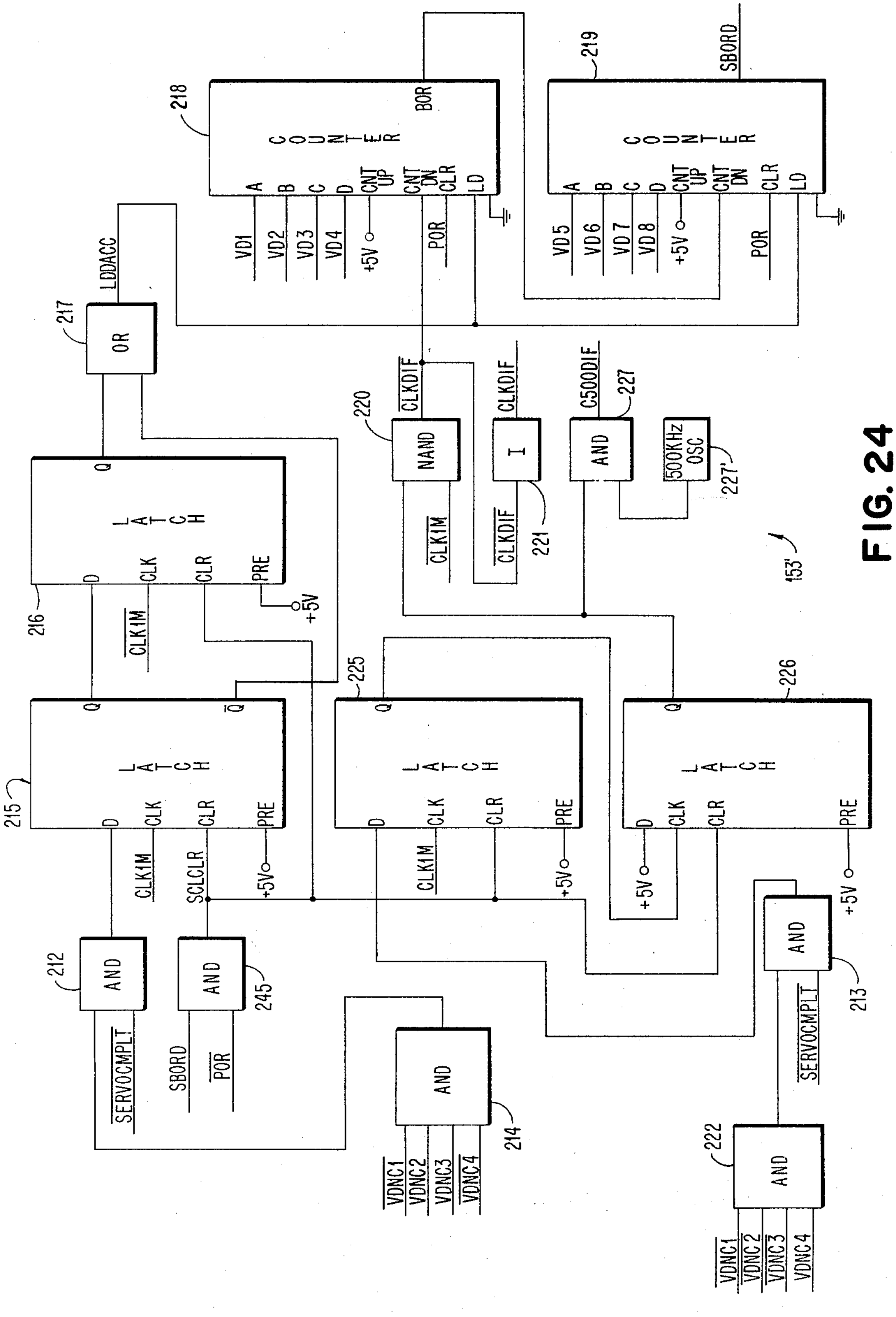
FIG. 24 is a schematic block diagram of another portion of the servo loop logic circuit.

The $\overline{Q}$ output of the latch 210 provides a $\overline{SERVOCMPLT}$ signal as one input to an AND gate 212 (see FIG. 24) and as one input to an AND gate 213. If the velocity of the droplets 20 (see FIG. 1) is not within the acceptable difference, then the $\overline{SERVOCMPLT}$ signal from the $\overline{Q}$ output of the latch 210 (see FIG. 23) is high.

Accordingly, when the servo sequence counter 185 (see FIG. 17) reaches a count of six, the AND gate 212 (see FIG. 24) produces a high as its output. This is because an AND gate 214 has the $\overline{VDNC1}$, VDNC2, VDNC3, and $\overline{VDNC4}$ signals as its inputs. Since the VDNC2 and the VDNC3 signals represent a count of six when these two signals are up and the $\overline{VDNC1}$ and $\overline{VDNC4}$ signals are up, the AND gate 214 provides a high to the AND gate 212 when the servo sequence counter 185 (see FIG. 17) is at a count of six.

Thus, the AND gate 212 (see FIG. 24) supplies a high to D input of a latch 215, which is the same as the latch 116. The latch 215, which has its PRE input connected to +5 volts, has its CLK input receiving the CLK1M signal of 1 MHz frequency so that the latch 215 has its Q output go up when the CLK1M signal goes up.

A latch 216, which is the same as the latch 116, has its D input connected to the Q output of the latch 215. Thus, when the Q output of the latch 215 goes up, the D input of the latch 216 goes up.

The latch 216 has its CLK input receive the $\overline{CLK1M}$ signal. Therefore, a positive going signal is received at the CLK input of the latch 216 one-half cycle of the 1 MHz frequency after a positive going signal was received at the CLK input of the latch 215.

The latch 215 has its $\overline{Q}$ output connected as one input to an OR gate 217. The other input to the OR gate 217 is Q output of the latch 216.

Accordingly, the output of the OR gate 217 is low between the time that the $\overline{Q}$ output of the latch 215 goes low and the time when the Q output of the latch 216 goes high. The output of the OR gate 217 is identified as LDDACC signal, which is down for only one-half cycle of the 1 MHz frequency.

Each of counters 218 and 219 has its LD input connected to the output of the OR gate 217. Thus, when the LDDACC signal goes low, each of the counters 218 and 219 has inputs loaded thereinto. The counters 218 and 219 are the same as the counters 147–149.

The LDDACC signal from the output of the OR gate 217 also is supplied as an input to an AND gate 219' (see FIG. 23), which has its output connected to CLR input of the latch 208. The other input to the AND gate 219' is the $\overline{POR}$ signal, which is high except during the power on sequence.

Thus, a low is supplied from the output of the AND gate 219' to the CLR input of the latch 208 when the LDDACC signal goes down. This causes the Q output of the latch 208 to go down so that the VCKEN signal from the Q output of the latch 208 remains up only from the count of four of the servo sequence counter 185 (see FIG. 17) to the count of six as shown in the timing diagram of FIG. 21.

This does not affect the $\overline{Q}$ output of the latch 210 (see FIG. 23) because there is no further positive going signal to the CLK input of the latch 210 from the AND gate 207. Thus, the latch 210 can change state only at the count of four of the counter 185 (see FIG. 17).

The counter 218 (see FIG. 24) has its A, B, C, and D inputs connected to the outputs of the EXCLUSIVE OR gates 193, 199, 200, and 201 (see FIG. 22), respectively. The counter 219 (see FIG. 24) has its A, B, C, and D inputs connected to the outputs of the EXCLUSIVE OR gates 202, 203, 204, and 205 (see FIG. 22), respectively.

The counter 218 (see FIG. 24) has its CNT DN input connected to the output of a NAND gate 220. The counter 219 has its CNT DN input connected to BOR output of the counter 218. Each of the counters 218 and 219 has its CNT UP input connected to +5 volts.

The NAND gate 220 produces a $\overline{CLKDIF}$ signal as its output for supply to the CNT DN input of the counter 218 and to an inverter 221. The output of the inverter 221 is a CLKDIF signal.

The NAND gate 220 produces the $\overline{CLKDIF}$ signal as its output when the servo sequence counter 185 (see FIG. 17) is at the count of eight. Thus, the counters 218 and 219 (see FIG. 24) begin to count down at the count of eight of the servo sequence counter 185 (see FIG. 17).

An AND gate 222 (see FIG. 24) has the $\overline{VDNC1}$, $\overline{VDNC2}$, $\overline{VDNC3}$, and VDNC4 signals as its inputs. Therefore, when the servo sequence counter 185 (see FIG. 17) has counted to a count of eight, all of the inputs to the AND gate 222 (see FIG. 24) are high so that its output is high.

The output of the AND gate 222 is supplied as one input to the AND gate 213. As previously mentioned, the other input to the AND gate 213 is the $\overline{SERVOCMPLT}$ signal from the latch 210 (see FIG. 23). The $\overline{SERVOCMPLT}$ signal is up only when the velocity of the droplets 20 (see FIG. 1) is not within the acceptable velocity difference from the desired velocity. Therefore, if the velocity of the droplets 20 is within the acceptable velocity difference, the AND gate 213 (see FIG. 24) will not have a high as its output. However, when the velocity of the droplets 20 is not within the acceptable velocity difference, the AND gate 213 has a high when the servo sequence counter 185 (see FIG. 17) is at a count of eight.

The output of the AND gate 213 (see FIG. 24) is supplied to D input of a latch 225. The latch 225 has its Q output connected to CLK input of a latch 226. The latches 225 and 226 are the same as the latch 116.

The high at the D input of the latch 225 is transferred to the Q output of the latch 225 when the CLK1M signal, which is supplied to CLK input of the latch 225, of 1 MHz frequency goes positive. With the latch 226 having its D input connected to +5 volts as well as its PRE input, the latch 226 has its Q output go up when the Q output of the latch 225 goes up. Thus, the Q output of the latch 226 remains high even after the servo sequence counter 185 (see FIG. 17) is not at the count of eight.

The Q output of the latch 226 (see FIG. 24) is one of the two inputs to the NAND gate 220, which has its output connected to the CNT DN input of the counter 218 as previously mentioned. Therefore, when the Q output of the latch 226 goes high, the NAND gate 220 supplies the inverse of the $\overline{\text{CLK1M}}$ signal as the $\overline{\text{CLKDIF}}$ signal to the CNT DN input of the counter 218. The inverse of the $\overline{\text{CLK1M}}$ signal is the CLK1M signal. Thus, the counters 218 and 219 count down at the frequency of the 1 MHz. oscillator 57 (see FIG. 1).

The Q output of the latch 226 (see FIG. 24) also is supplied as one input to an AND gate 227. The other input to the AND gate 227 is the output of a 500 KHz oscillator 227'. Thus, the output of the AND gate 227 is at the same frequency as the input from the 500 KHz oscillator 227'.

The output of the AND gate 227 is a C500DIF signal, which is supplied as one of two inputs to a NAND gate 228 (see FIG. 25A) and one of two inputs to a NAND gate 229. The other input to the NAND gate 228 is the VBLCH signal from the Q output of the latch 156 (see FIG. 14). The other input to the NAND gate 229 (see FIG. 25A) is the $\overline{\text{VBLCH}}$ signal from the $\overline{\text{Q}}$ output of the latch 156 (see FIG. 14).

The output of the NAND gate 228 (see FIG. 25A) is supplied to CNT UP input of a counter 230 while the output of the NAND gate 229 is supplied to CNT DN input of the counter 230. Thus, when the velocity of the droplets 20 is higher than the desired velocity, the $\overline{\text{VBLCH}}$ signal is up so that the counter 230 is counted down by the output of the NAND gate 229 and at one-half of the rate at which the counters 218 and 219 (see FIG. 24) are counted down. If the velocity of the droplets 20 is less than the desired velocity, then the VBLCH signal is up and the output of the NAND gate 228 (see FIG. 25A) causes the counter 230 to count up at one-half of the rate at which the counters 218 and 219 (see FIG. 24) are counted down.

The counter 230 (see FIG. 25A) has its CAR output connected to CNT UP input of a counter 231 and its BOR output connected to a CNT DN input of the counter 231. Thus, the counters 230 and 231, which are the same as the counters 147–149 (see FIG. 14), are connected to each other so that they comprise a ten bit counter capable of counting in either direction.

The counter 230 (see FIG. 25A) has its A, B, C, and D inputs connected to four manual switches 232 of a pump DAC switch 233. The counter 231 has its A, B, C, and D inputs connected to the four other manual switches 232 of the switch 233.

The manual switches 232 are selectively set to produce a count, which should cause the pressure of the pump 2 (see FIG. 1) to produce the desired velocity of the droplets 20. Thus, the manual switches 232 (see FIG. 25A) are selectively opened or closed to produce the desired count.

When one of the manual switches 232 is closed, a binary zero is supplied to the input of the counter 230 or 231 to which it is connected. When one of the manual switches 232 is open, a binary one is supplied to the input of the counter 230 or 231 to which it is connected.

The counter 230 has its OA, OB, OC, and OD outputs connected to input pins 8, 7, 6, and 5, respectively, of a pump digital to analog converter (DAC) 234 (see FIG. 26) of a pump driver circuit 234' (see FIG. 1) for the pump 2. One suitable example of the DAC 234 is a D/A converter sold as model DAC-80, CBI-V by Burr-Brown Research Corporation.

Figure 25A:
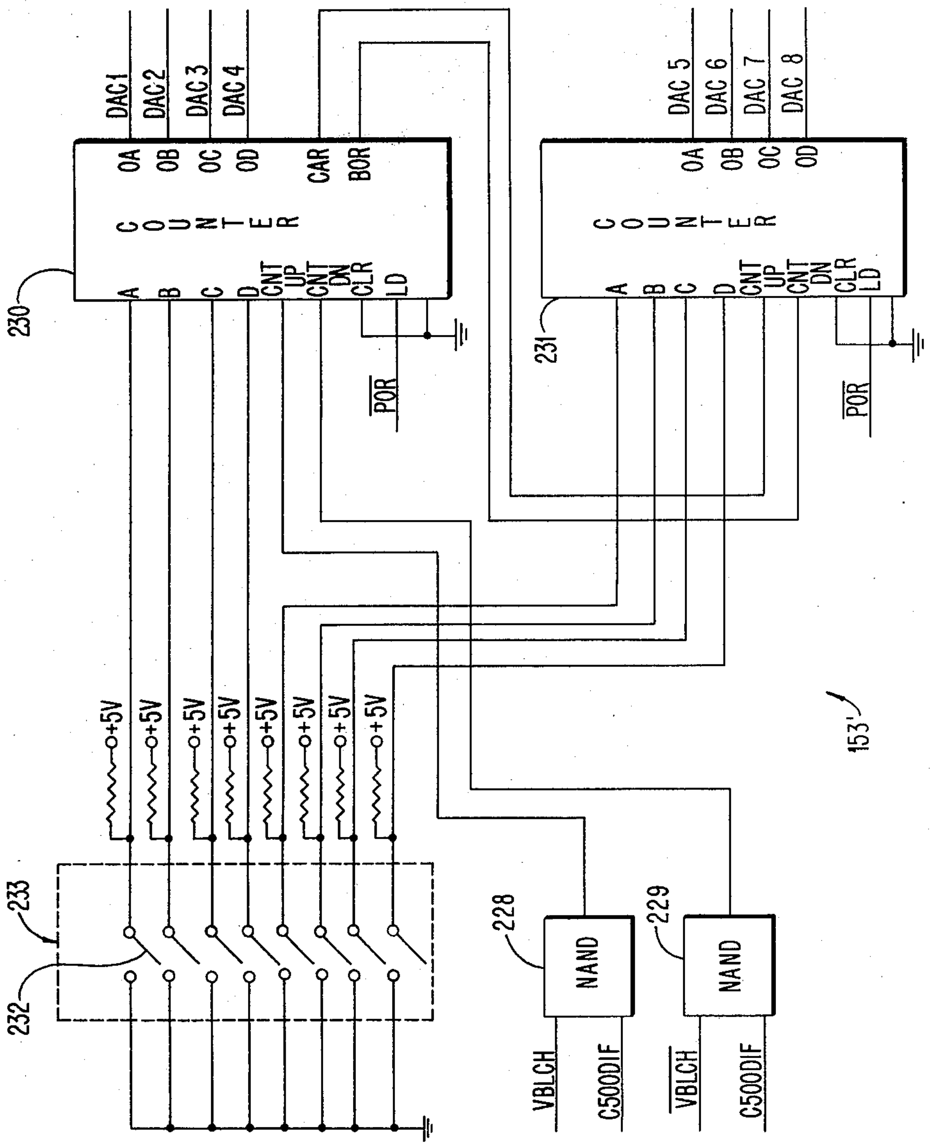
FIGS. 25A and 25B are schematic block diagrams of still further portions of the servo loop logic circuit.
Figure 26:
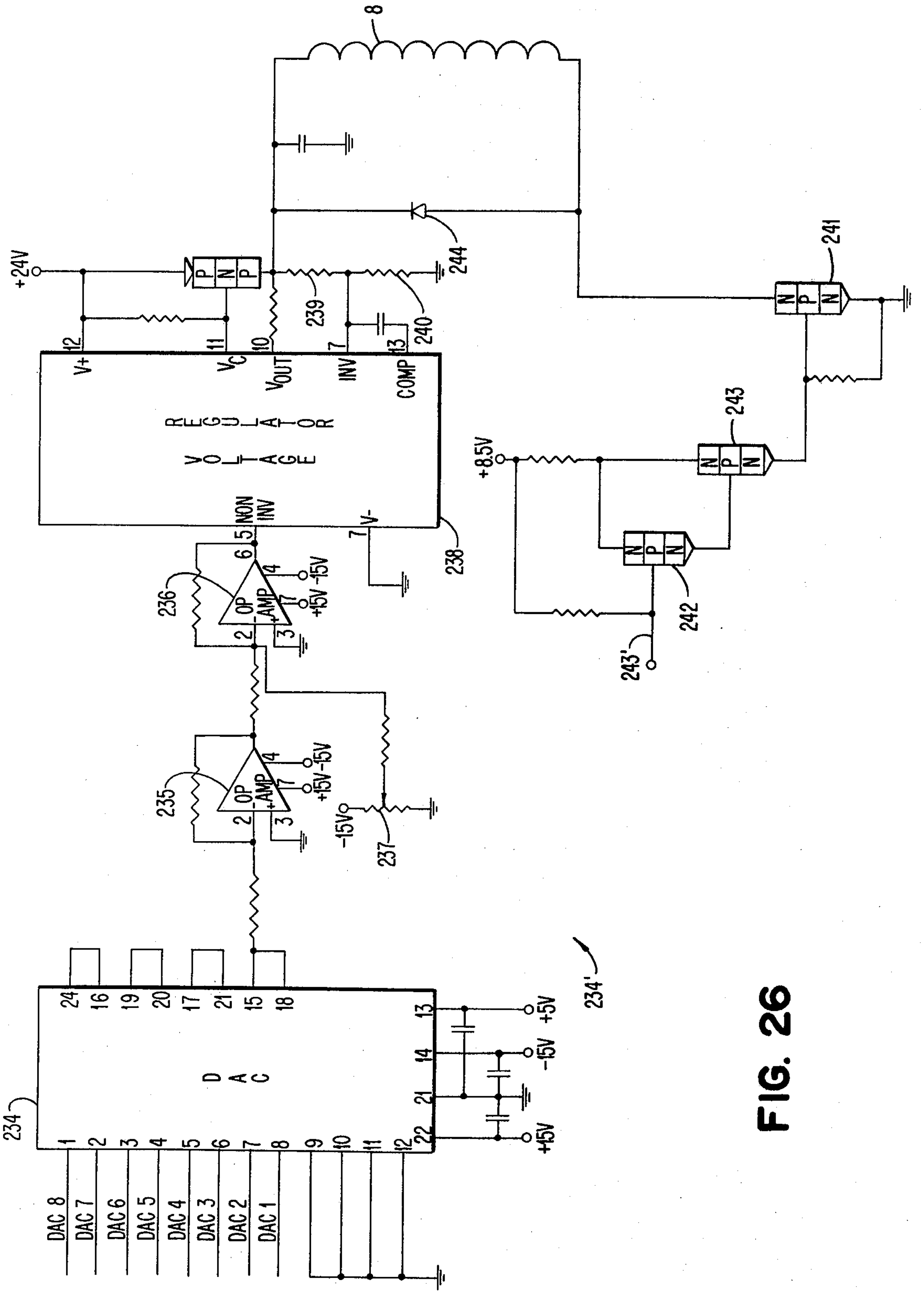
FIG. 26 is a schematic diagram of a circuit for controlling the operation of the pump.

The counter 231 (see FIG. 25A) has its OA, OB, OC, and OD outputs connected to input pins 4, 3, 2, and 1, respectively, of the DAC 234 (see FIG. 26). The input pin 1 of the DAC 234 receives the most significant bit. Thus, the outputs from the counters 230 (see FIG. 25A) and 231 determine the pressure of the pump 2 (see FIG. 2) through controlling the output of the DAC 234 (see FIG. 26).

The DAC 234 has its output connected to an operational amplifier 235, which is connected as an inverter having a gain of one. The output of the operational amplifier 235 is connected to the negative input of an operational amplifier 236, which sums the outputs of the operational amplifier 235 and a potentiometer 237. The sum of the inputs from the operational amplifier 235 and the potentiometer 237 is inverted by the operational amplifier 236 and supplied to a voltage regulator 238. One suitable example of the operational amplifiers 235 and 236 is sold as model uA 741 by Signetics. One suitable example of the voltage regulator 238 is sold as model uA 723 by Signetics.

The voltage regulator 238 is connected to provide its output as a gain of three of its input from the operational amplifier 236. This is accomplished through a resistor 239 having its resistance twice the resistance of a resistor 240. The voltage regulator 238 supplies its output to one end of the solenoid coil 8, which has its other end connected through an NPN transistor 241 to ground.

Current can flow through the solenoid coil 8 from the voltage regulator 238 to cause pumping of ink from the cavity 4 (see FIG. 2) of the pump 2 only when the NPN transistor 241 (see FIG. 26) is turned on. The NPN transistor 241 is turned on only when NPN transistors 242 and 243, which are connected as a Darlington pair, are turned on. The transistors 242 and 243 are turned on only when a high is supplied from a pump logic circuit over a line 243'. The length of the time that the input to the base of the NPN transistor 242 is up and down is controlled by the pump logic circuit so that each high is the same length of time and each low is the same length of time but substantially larger than the length of time for the high. As an example, the input signal to the base of the transistor 242 is up 1.8 microseconds and then is down for 16.67 microseconds before it goes up again for 1.8 microseconds.

When the transistor 241 is turned off, transient current decays through a diode 244, which is connected across the solenoid coil 8. Thus, the solenoid coil 8 has the current therethrough controlled by the voltage output of the DAC 234 to control the pressure of the ink pumped out of the cavity 4 (see FIG. 2) of the pump 2 each time that a high signal is supplied to the base of the transistor 242 (see FIG. 26).

When the counters 230 and 231 (see FIG. 25A) count up because of the velocity of the droplets 20 being too low, this increase in the count causes the DAC 234 (see FIG. 26) to increase the pressure of the pump 2 (see FIG. 2). When the velocity of the droplets 20 is too high, the counters 230 and 231 (see FIG. 25A) count down so that the DAC 234 (see FIG. 26) reduces the pressure of the pump 2 (see FIG. 2).

The counters 230 and 231 (see FIG. 25A) continue to count up or down until the Q output of the latch 226 (see FIG. 24) goes down. This occurs when a SCLCR signal from an AND gate 245 goes high since it is supplied to CLR input of the latch 226. The AND gate 245 has a SBORD signal from BOR output of the counter 219 supplied as one of two inputs with the $\overline{POR}$ signal as its other input. Thus, when the BOR output of the counter 219 goes down because the counters 218 and 219 have down counted to zero, the SCLCLR signal goes down because the $\overline{POR}$ signal is always up except during the power on sequence.

When the SCLCLR signal, which is supplied to the CLR input of the latch 226 (see FIG. 24), goes down so that the Q output of the latch 226 goes down, the AND gate 227 ceases to supply the C500DIF signal as an input to the NAND gates 228 and 229 (see FIG. 25A). This stops the supply of counting signals to the counter 230 whereby the counters 230 and 231 stop counting.

Therefore, when the counters 218 and 219 (see FIG. 24), which are counting the difference of the actual velocity of the droplets 20 from the desired velocity of the droplets 20, have been counted to zero, counting by the counters 230 and 231 (see FIG. 25A) is stopped with the pump DAC 234 (see FIG. 26) having its input changed in accordance wwith the count of the counters 230 and 231 (see FIG. 25A) and the direction of the count. Thus, the pump DAC 234 (see FIG. 26) has its output voltage changed in accordance with the difference of the velocity of the droplets 20 from their desired velocity and in accordance with the direction in which the velocity needs to be corrected.

The SCLCLR signal from the output of the AND gate 245 (see FIG. 24) also is supplied to CLR input of each of the latches 215, 216, and 225. This clears each of these latches 215, 216, and 225 at the same time that the latch 226 is cleared.

Figure 25B:
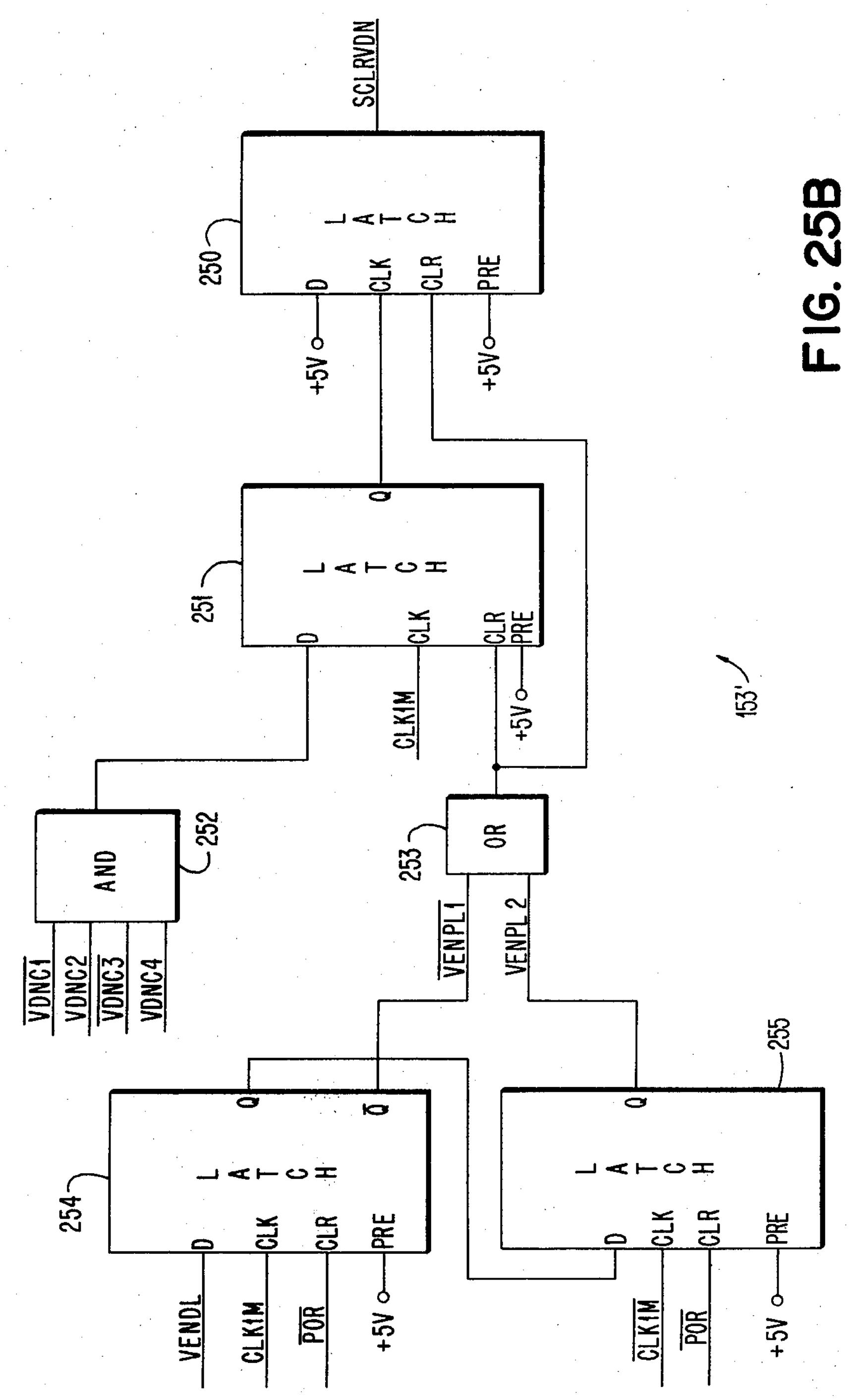

While the counters 218 and 219 continue to count down until the SBORD signal at the BOR output of the counter 219 goes down and the counters 230 and 231 (see FIG. 25A) continue to count either up or down until the SBORD signal at the BOR output of the counter 219 (see FIG. 24) goes down, the servo sequence counter 185 (see FIG. 17) is stopped at the count of ten through supplying a high SCLRVDN signal to RO2 input of the counter 185 from Q output of a latch 250 (see FIG. 25B), which has each of its D and PRE inputs connected to +5 volts. The latch 250 has its CLK input connected to Q output of a latch 251. Each of the latches 250 and 251 is the same as the latch 116.

The latch 251 has its D input connected to the output of an AND gate 252. The AND gate 252 has the $\overline{VDNC1}$, VDNC2, $\overline{VDNC3}$, and VDNC4 signals as its inputs. Each of these signals is high when the servo sequence counter 185 (see FIG. 17) is at the count of ten so that a high is supplied to the D input of the latch 251 (see FIG. 25B) at the time that the counter 185 (see FIG. 17) is at the count of ten.

The latch 251 (see FIG. 25B) has its CLK input receive the CLK1M signal of 1 MHz. Thus, the high at the D input of the latch 251 is transferred to the Q output of the latch 251 on the next positive going CLK1M signal.

When the Q output of the latch 251 goes up, this causes the high at the D input of the latch 250 to be transferred to the Q output of the latch 250 whereby the SCLRVDN signal goes high. When this occurs, the outputs of the counter 185 (see FIG. 17) go to zero.

When the outputs of the counter 185 go to zero, the output of the AND gate 252 (see FIG. 25B) goes low and is transferred to the Q output of the latch 251 on the next of the positive going pulses of the CLK1M signal. However, this does not affect the Q output of the latch 250 since it remains high because there is no further positive going signal to the CLK input of the latch 250. Thus, the SCLRVDN signal at the Q output of the latch 250 remains up.

Each of the latches 250 and 251 has its CLR input connected to the output of an OR gate 253. When the output of the OR gate 253 goes down, each of the latches 250 and 251 is cleared. The OR gate 253 has a $\overline{VENPL1}$ signal, which is supplied from $\overline{Q}$ output of a latch 254, and a VENPL2 signal, which is supplied from Q output of a latch 255, as its inputs. Thus, when these two inputs are low, the OR gate 253 is low so that the latches 250 and 251 are cleared.

The latch 254, which is the same as the latch 116, has its D input connected to the Q output of the latch 181 (see FIG. 17) to receive the VENDL signal therefrom. As previously mentioned, the VENDL signal goes up when the VEND signal, which is the output of the NOR gate 168 (see FIG. 19), goes down. This is because the $\overline{VEND}$ signal, which is of the same magnitude as the VEND signal but is inverse thereto, goes up at the time that the VEND signal goes down because of the high GAP signal being supplied from the comparator 91 (see FIG. 8) to the NOR gate 168 (see FIG. 19) after the first preset flight time has expired.

The latch 254 (see FIG. 25B) has the high at its D input transferred to its Q output when the CLK1M signal, which is supplied at CLK input of the latch 254, goes up after the D input has gone high. The latch 254 has its $\overline{Q}$ output, which supplies the $\overline{VENPL1}$ signal to the OR gate 253, go down at the time that the Q output of the latch 254 goes up.

When the $\overline{Q}$ output of the latch 254 goes down, the latch 255, which is the same as the latch 116, has its Q output, which supplies the VENPL2 signal, down. Thus, both of the inputs to the OR gate 253 are low at this time so that the output of the OR gate 253 goes low to clear the latches 250 and 251.

The Q output of the latch 254 is connected to D input of the latch 255. The latch 255 has its CLK input receiving the $\overline{CLK1M}$ signal so that the high at the D input of the latch 255 is transferred to the Q output of the latch 255 one-half of a cycle of the 1 MHz oscillator 57 (see FIG. 1) after the Q output of the latch 254 (see FIG. 25B) has gone up. Thus, when the Q output of the latch 255 goes high, the OR gate 253 again has a high as its output to end the low signal to the CLR input of the latches 250 and 251 so that the latches 250 and 251 are cleared shortly after the GAP signal from the comparator 91 (see FIG. 8) goes up.

Whenever the counter 149 (see FIG. 14) produces a negative pulse at its BOR output, it is desired to count down the counters 147–149 for one additional count after the high GAP signal is produced from the comparator 91 (see FIG. 8). Thus, the $\overline{VELCK}$ signal to the CNT DN input of the counter 147 (see FIG. 14) is produced for one additional count when the high GAP signal is produced from the comparator 91 (see FIG. 8) after the BOR output of the counter 149 (see FIG. 14) produces the negative pulse.

This additional down count by the counter 147 is necessary because each of the OA, OB, OC, and OD outputs of the counter 147 goes to a binary one after the BOR output of the counter 149 goes negative. Thus, when each of the OA, OB, OC, and OD outputs of the counter 147 is a binary one, the output of each of the EXCLUSIVE OR gates 198 (see FIG. 22), 199, 200, and 201 is a binary zero whereas the output of the EXCLUSIVE OR gate 198 should be high to indicate the first negative count, which occurs when the BOR output of the counter 149 goes negative.

Therefore, to avoid losing this single count from the counter 147 when the counters 147–149 continue counting down after the BOR output of the counter 149 produces the negative pulse, it is necessary to provide an additional low pulse from the NOR gate 153 (see FIG. 17) after the high GAP signal has been produced from the comparator 91 (see FIG. 8). This is accomplished at this time because the production of the high GAP signal from the comparator 91 stops the production of the VELCK1 signal, which is the other input to the NOR gate 153 (see FIG. 17), from the AND gate 152 (see FIG. 16).

Accordingly, the additional down count for the counter 147 (see FIG. 14) is obtained when the AND gate 154 (see FIG. 17) produces a high SDN1 signal as its output to the other input of the NOR gate 153. When the SDN1 signal from the AND gate 154 is high, the output of the NOR gate 153 is low so that the $\overline{VELCK}$ signal again goes down to cause the counter 147 (see FIG. 14) to count down one more. This compensates for the loss of the one count from the OA, OB, OC, and OD outputs of the counter 147 when the BOR output of the counter 149 goes negative.

The $\overline{VBORROW}$ signal from the output of the inverter 155 is supplied to CLK input of a latch 256 (see FIG. 17), which is the same as the latch 116. The latch 256 has each of its D and PRE inputs connected to +5 volts. Thus, when the $\overline{VBORROW}$ signal from the inverter 155 goes up, the latch 256 has its Q output go high.

The Q output of the latch 256 is connected to D input of the latch 186, which has its CLK input receiving the VDNCNT signal from the output of the AND gate 183. Therefore, the high at the D input of the latch 186 is transferred to Q output of the latch 186 when the VDNCNT signal goes up after the D input of the latch 186 has gone high. As previously mentioned, the VDNCNT signal initially goes high only after the comparator 91 (see FIG. 8) has produced the high GAP signal.

The Q output (SDNQ1) of the latch 186 (see FIG. 17) is connected to D input of the latch 187 and as an input to the AND gate 154. The AND gate 154 has $\overline{Q}$ output ($\overline{SDNQ2}$) of the latch 187 as its other input.

Figure 27:
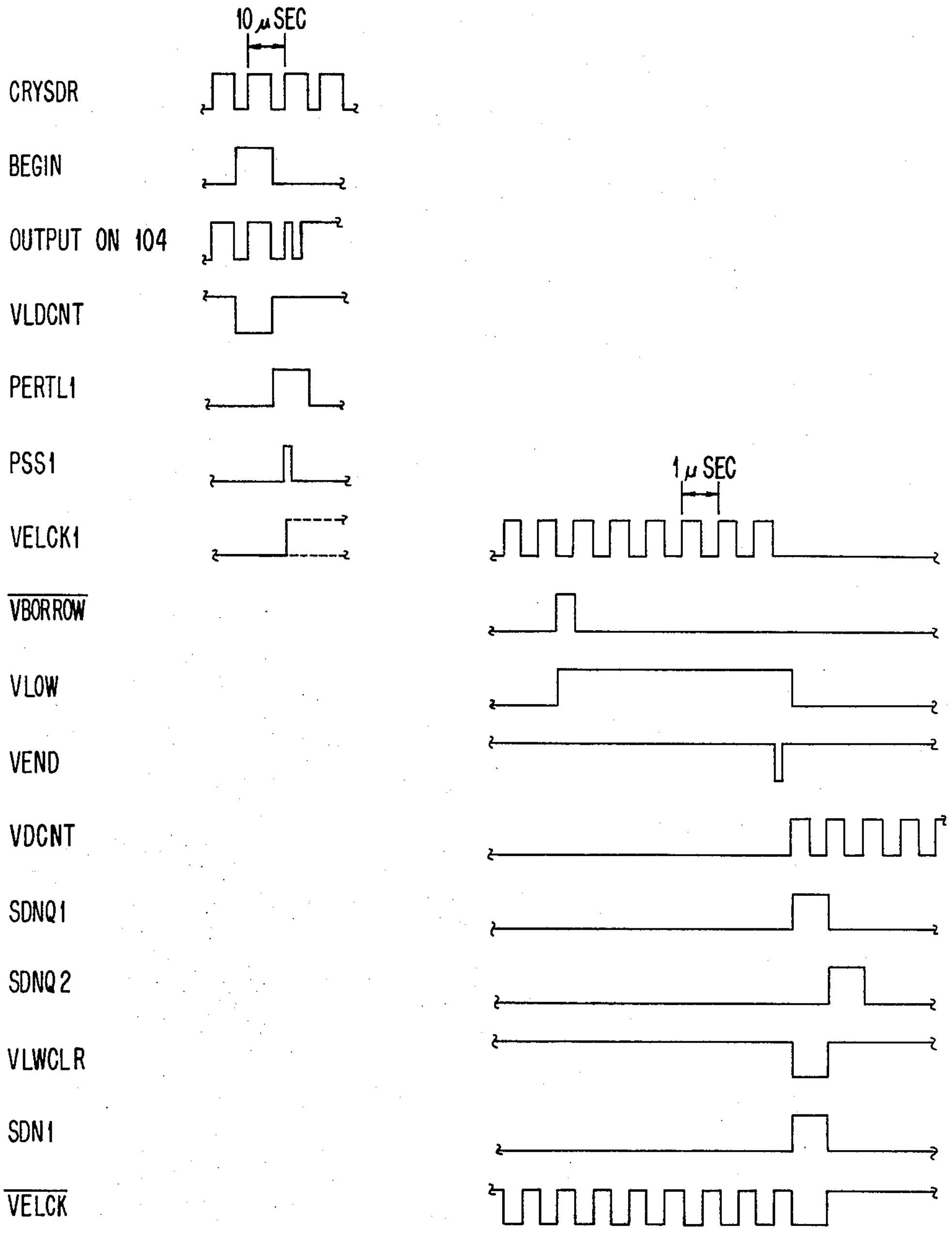
FIG. 27 is a timing diagram showing the relationship of various signals produced by the servo loop logic circuit with the left side indicating a different time interval than the right side.

Thus, when the Q output of the latch 186 goes up, both of the inputs to the AND gate 154 are up as shown in FIG. 27 (The $\overline{SDNQ2}$ signal is an inverse signal to SDNQ2.) until the next time that the VDNCNT signal goes up since it is also supplied to CLK input of the latch 187. Therefore, during this one cycle, which is the same as the frequency of the 1 MHz oscillator 57 (see FIG. 1), the AND gate 154 (see FIG. 17) produces a high SDN1 signal to the NOR gate 153. As a result, when the SDN1 signal is high, the NOR gate 153 has a low as its output so that the $\overline{VELCK}$ signal is transmitted from the NOR gate 153 to the CNT DN input of the counter 147 (see FIG. 14) to down count the counter 147 a count of one.

When the Q output of the latch 186 (see FIG. 17) goes up, the latch 186 has its $\overline{Q}$ output ($\overline{SDNQ1}$), which is connected as one input to an OR gate 257, go down. The other input to the OR gate 257 is the Q output of the latch 187, and this also is down at this time. This causes the OR gate 257 to have a low output, which is one of two inputs to an AND gate 258. The other input to the AND gate 258 is the $\overline{POR}$ signal, which is high except for a short period of time after the power is initially turned on.

Thus, when the Q output of the latch 186 goes up, the AND gate 258 provides a low output, which is identified as VLWCLR signal. The low VLWCLR signal is supplied to CLR input of the latch 256 to clear the latch 256 at this time.

When the VDNCNT signal to the CLK input of the latch 187 goes up after the D input of the latch 187 has gone high, the Q output of the latch 187 goes up whereby the OR gate 257 has its output go up. This results in the VLWCLR signal going up since both of its inputs are now high. Thus, the VLWCLR signal is low for only one cycle of the VDNCNT signal.

As a result of the VLWCLR signal going down, the Q output of the latch 256 goes low whereby the D input of the latch 186 goes low. This low is transferred to the Q output of the latch 186 with the next input of the VDNCNT signal at the CLK input of the latch 186. This causes the $\overline{Q}$ output of the latch 186 to go high so that the AND gate 258 again has a high output whereby the VLWCLR signal goes up after one cycle of the 1 MHz oscillator 57 (see FIG. 1).

When the VDNCNT signal goes up after the Q output of the latch 186 (see FIG. 17) has gone down, the low at the D input of the latch 187 is transferred to the Q output of the latch 187. This is the state in which the latches 186 and 187 remain until the next time that the CLK input of the latch 256 receives the high $\overline{VBORROW}$ signal from the inverter 155 (see FIG. 14).

It should be understood that the BOR output of the counter 149 has a negative pulse only when the velocity of the droplets 20 is less than the desired velocity. If the velocity of the droplets 20 is greater than the desired velocity, then the counter 149 will not have counted down sufficiently to produce a negative pulse at the BOR output prior to the high GAP signal being produced by the comparator 91 (see FIG. 8).

Figure 29:
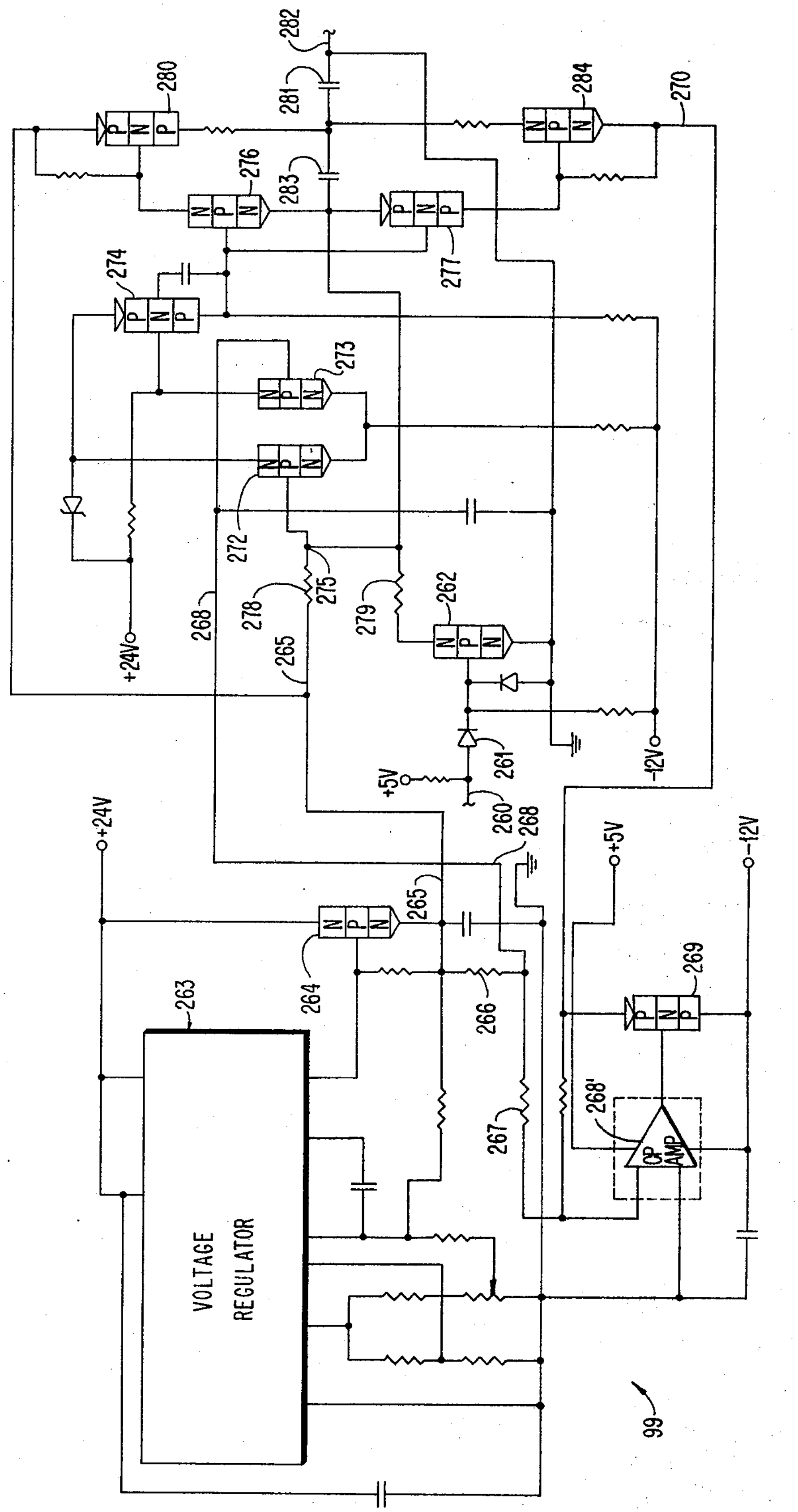
FIG. 29 is a schematic circuit diagram of the crystal driver circuit.

As previously mentioned, the crystal drive perturb logic circuit 100 (see FIG. 1) provides a signal to the crystal driver circuit 99 to cause perturbation of the frequency produced by the crystal driver circuit 99 to the transducer 16. As shown in FIG. 29, the crystal driver circuit 99 receives an input on a line 260 from the output line 104 (see FIG. 9) of the OR gate 103. The input line 260 (see FIG. 29) is connected through a diode 261 to the base of an NPN transistor 262. The transistor 262 functions as a switch in accordance with the input signal on the input line 260 with the transistor 262 being on when the input signal is high and being off when the input signal is low.

The crystal driver circuit 99 includes a voltage regulator 263, which cooperates with an NPN transistor 264 to provide a regulated B+ voltage on a line 265. One suitable example of the regulator 263 is a voltage regulator sold as model 723 by Signetics.

Resistors 266 and 267 form a divide network so that a line 268 has a B+/2 voltage thereon. The resistors 266 and 267 form a current path to inverting input of an operational amplifier 268', which cooperates with a PNP transistor 269 to form a negative voltage regulator to produce a B− voltage on a line 270. One suitable example of the operational amplifier 268' is an operational amplifier sold as model uA741 by Signetics. The negative voltage regulator, which comprises the operational amplifier 268' and the PNP transistor 269, tracks the B+ voltage on the line 265.

NPN transistors 272 and 273 and PNP transistor 274 cooperate to form a high gain, wide band differential amplifier to stabilize the voltage at the base of the transistor 272 so that a node 275 functions as a current summing node. The feedback action in the circuit through the base-emitter characteristics of an NPN transistor 276 and a PNP transistor 277 causes the voltage at the base of the transistor 272 to be B+/2.

The current summing node 275 is connected through a resistor 278 to the line 265, which has the B+ voltage thereon, and through a resistor 279 to the collector of the transistor 262. The resistor 278 has a larger resistance than the resistance of the resistor 279. Therefore, when the logic signal on the input line 260 is up so that the transistor 262 is on, current flows from the current summing node 275 through the resistor 279 and the transistor 262 to ground. When the transistor 262 is off because of a low logic signal at the input line 260, current flows into the current summing node 275.

When the transistor 262 is on to cause current to flow from the current summing node 275, the voltage at the base of the transistor 272 falls below that at the base of the transistor 273 whereby the voltage at the collector of the transistor 274 swings in a positive direction until it is clamped by the feedback action of the emitter-base of the transistor 276. This causes the current from the current summing node 275 to be steered to the base of a PNP transistor 280. This results in the transistor 280 supplying current through a capacitor 281, which functions as an output filter, and an output line 282 to the transducer 16.

The magnitudes of the resistance of the resistor 279 and the capacitance of a capacitor 283 determine the rise time when the transistor 262 is turned on. When the transistor 262 is turned off by the logic signal on the input line 260 going low, the magnitudes of the resistance of the resistor 278 and the capacitance of the capacitor 283 determine the fall time. It should be understood that the capacitor 283 discharges when the transistor 262 is turned on and it charges when the transistor 262 is turned off.

When the transistor 262 is turned off, current flows to the current summing node 275 to increase the voltage at the base of the transistor 272. This causes the voltage at the collector of the transistor 274 to swing in a negative direction until it is clamped by the action of the base-emitter diode of the transistor 277. This results in the current flowing into the current summing node 275 being steered to the base of a NPN transistor 284. This causes the signal on the output line 282 to go towards the negative supply on the line 270.

The base of the transistor 273 is connected to the line 268 so that it is at B+/2 volts. Thus, any slight swing in the voltage at the base of the transistor 272 causes the signal on the output line 282 to change.

Figure 32:
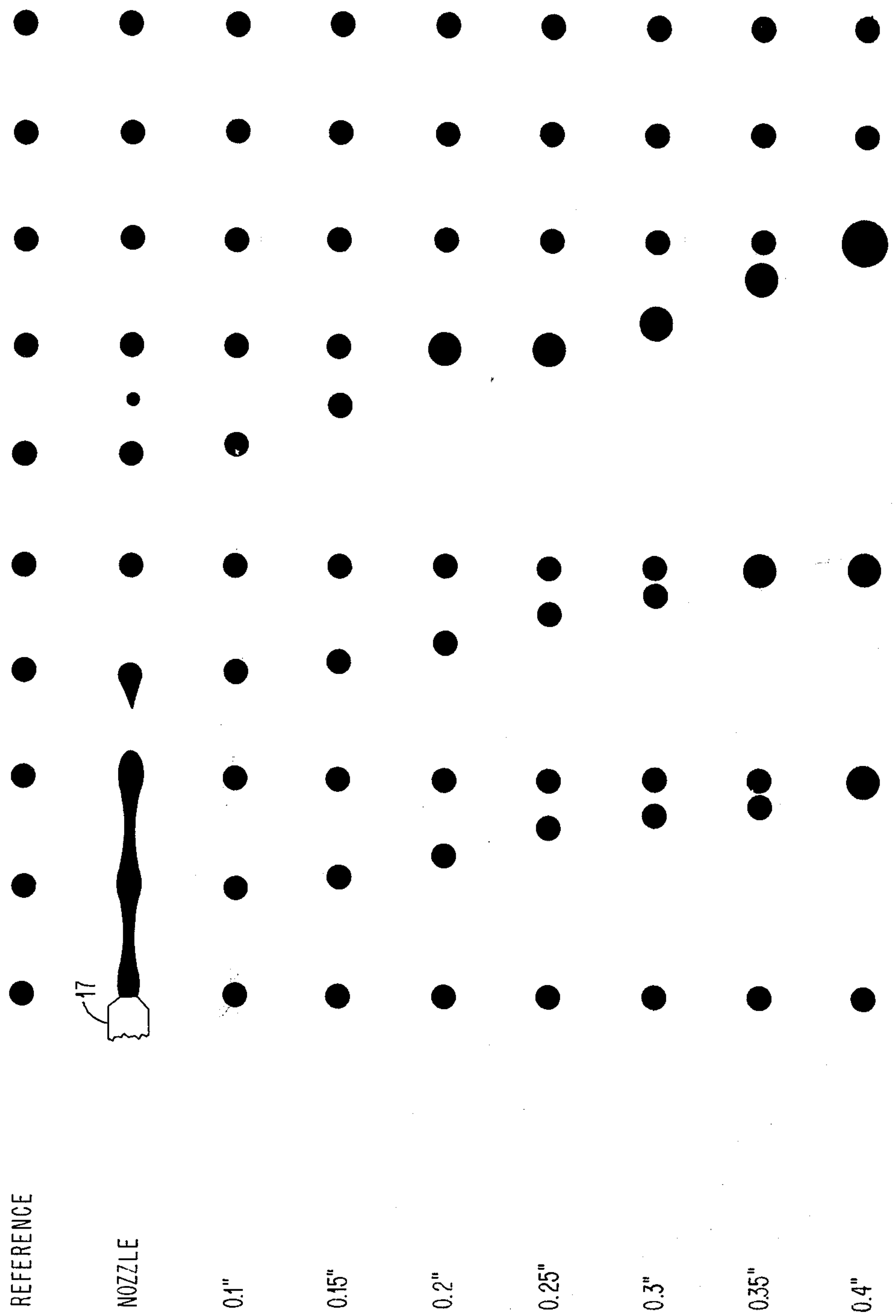
FIG. 32 is a schematic diagram showing the growth of the gap in the droplets.

Referring to FIG. 32, there is shown the growth of the gap between the droplets 20 (see FIG. 1) due to the perturbation of the frequency produced by the crystal driver circuit 99 to the transducer 16 because of the signal from the crystal drive perturb logic circuit 100. FIG. 32 shows a series of the droplets 20 which are produced by the crystal driver circuit 99 without a perturbation and identified as REFERENCE. The relation of the droplets 20 at approximately sixty microseconds from the time that the perturbation is applied to the frequency is identified by NOZZLE.

A series of the droplets 20 at a distance of 0.1" from the exit of the nozzle 17 is identified by 0.1". This is approximately 166.67 microseconds after the frequency has been perturbed.

The other distances show the relationship of the droplets 20 adjacent the formation of the gap at the various distances from the exit of the nozzle 17. For example, the 0.4" shows the relation of the droplets 20 at the time that the gap is 0.4" from the exit of the nozzle 17. This is approximately 666.67 microseconds from the time that the perturbation of the frequency occurred. At 0.4", at least two separate gaps are shown occurring.

Figure 10:
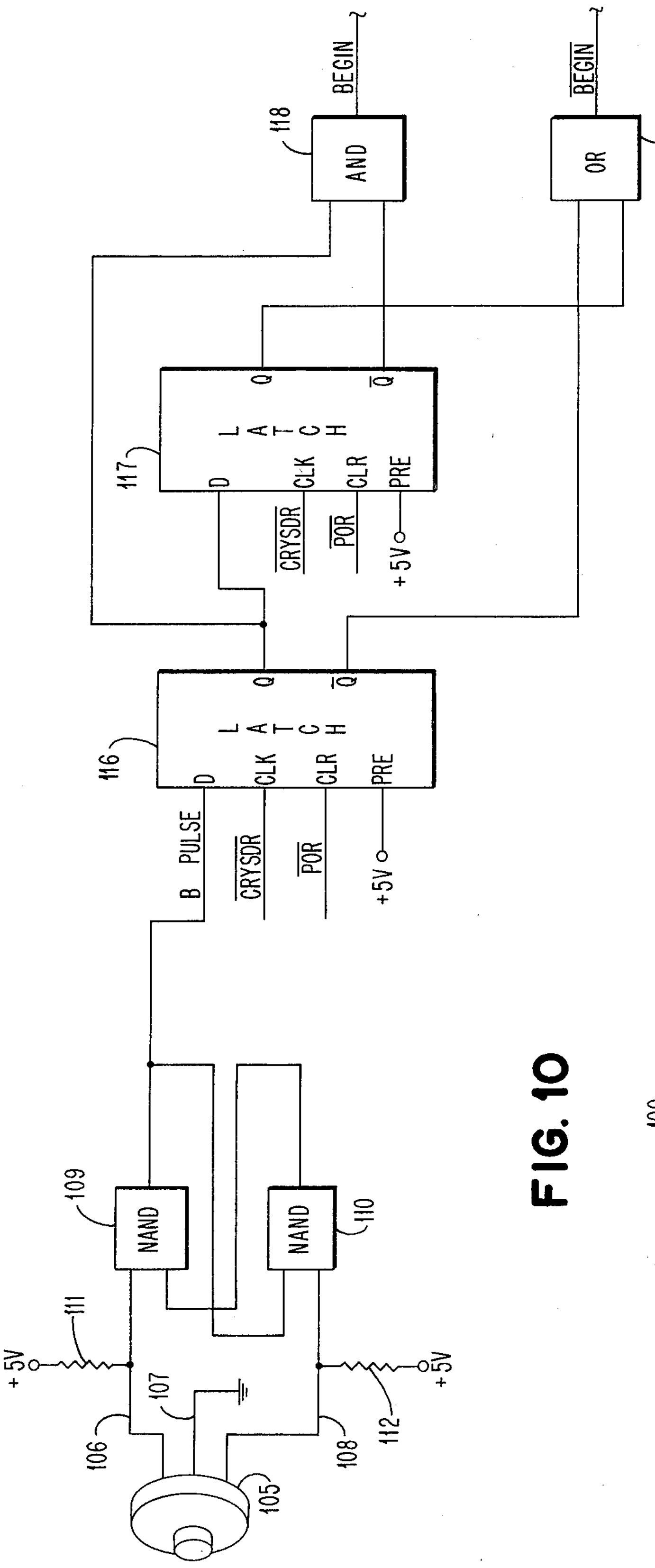
FIG. 10 is a schematic block diagram of a circuit for producing pulses to start perturbation of the crystal driver circuit by the crystal drive perturb logic circuit.

Considering the operation of the present invention, a servo cycle to ascertain if the velocity of the droplets 20 is within the acceptable velocity difference from the desired velocity is started by activating the button 105 (see FIG. 10). This produces the high BEGIN signal as the output of the AND gate 118. The production of the positive BEGIN signal (The $\overline{\text{BEGIN}}$ signal goes low.) causes the negative VLDCNT signal to be produced from the AND gate 150 (see FIG. 14) to load the counters 147–149 with the count representing the desired flight time for the droplet 20 to reach the optical drop sensor 25 (see FIG. 3) after being produced by perturbation of the crystal drive signal to the transducer 16 (see FIG. 1). The input to the counters 147–149 (see FIG. 14) is from the positions of the manual switches 145 of the switch 146.

As shown in the timing diagram of FIG. 11, the PSS1 signal, which is produced by the single shot 126 (see FIG. 12B), causes the start of the perturbation of the crystal drive signal to the crystal driver circuit 99 (see FIG. 1). At this same time as shown in the timing diagram of FIG. 15, the $\overline{\text{VELCK}}$ signal starts and is transmitted to the CNT DN input of the counter 147 (see FIG. 14) from the NOR gate 153 (see FIG. 17) to start the counters 147–149 (see FIG. 14) counting down. Thus, the down counting time starts at exactly the time that the crystal drive signal to the crystal driver circuit 99 (see FIG. 1) is perturbed.

The perturbation of the crystal driver circuit 99 ceases when the PSS3 signal from the single shot 132 (see FIG. 12B) goes down. This is controlled so that the PSS3 signal goes down at the same time that the CRYSDR signal from the generator 101 goes down as shown in FIG. 11.

Figure 19:
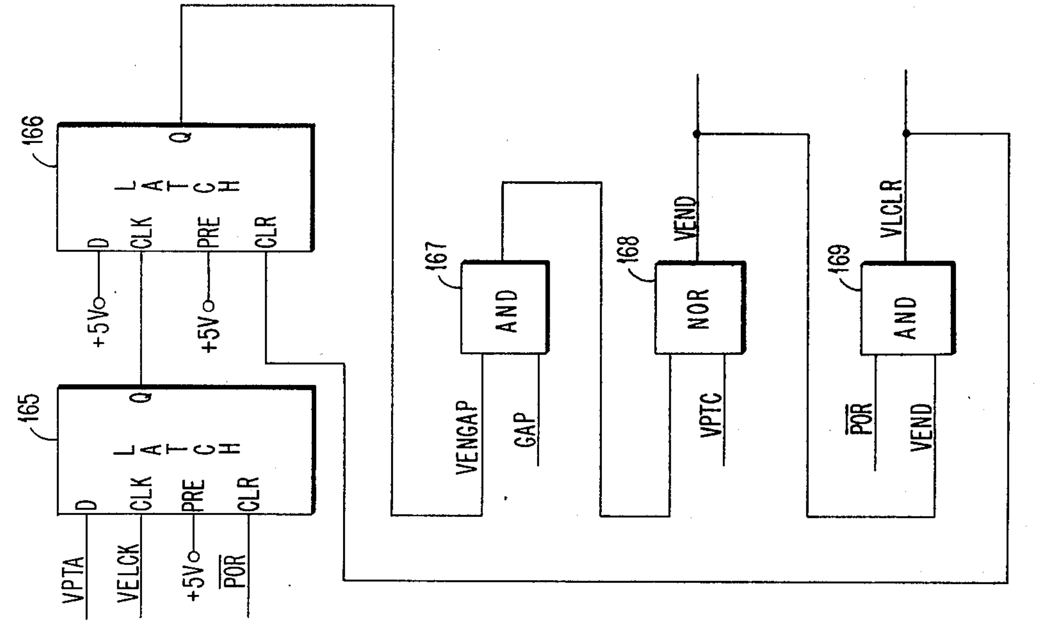
FIG. 19 is a schematic block diagram of a further portion of the flight time counting logic circuit.

After the VPTA signal from the comparator 164 (see FIG. 18) goes up because the first preset flight time, which has been selected by selectively setting the manual switches 160 of the first preset flight time switch 161, has elapsed, the VENGAP signal from the Q output of the latch 166 (see FIG. 19) goes up so that the high GAP signal from the comparator 91 (see FIG. 8) at any time thereafter can be supplied through the AND gate 167 (see FIG. 19). This provides noise protection for a selected period of time. This timing relation of the VPTA and VENGAP signals is shown in FIG. 15.

When the GAP signal from the comparator 91 (see FIG. 8) goes up, the VENGAP signal from the Q output of the latch 166 (see FIG. 19) goes down because the low VLCLR signal from the AND gate 169 goes to the CLR input of the latch 166. This timing relation is shown in FIG. 15.

The low VLCLR signal also causes the VELCK1 signal from the output of the AND gate 152 (see FIG. 16) to go low. This low VELCK1 signal is one of the inputs to the NOR gate 153 (see FIG. 17) so that the $\overline{\text{VELCK}}$ signal will not be forced low due to the action of the VELCK1 signal from the AND gate 152 (see FIG. 16).

However, if the BOR output of the counter 149 (see FIG. 14) went down prior to the high GAP signal being produced by the comparator 91 (see FIG. 8), then the SDN1 signal from the output of the AND gate 154 (see FIG. 17) goes high for one count whereby the $\overline{\text{VELCK}}$ signal goes low for one additional count because the SDN1 signal is the second input to the NOR gate 153. Therefore, this causes the counter 147 (see FIG. 14) to down count one additional count after the high GAP signal has been produced by the comparator 91 (see FIG. 8) and the counter 149 (see FIG. 14) has a negative pulse at its BOR output prior thereto. This additional down count compensates for the OA, OB, OC, and OD outputs of the counter 147 losing one count at the time that the BOR output of the counter 149 goes down.

Figure 21:
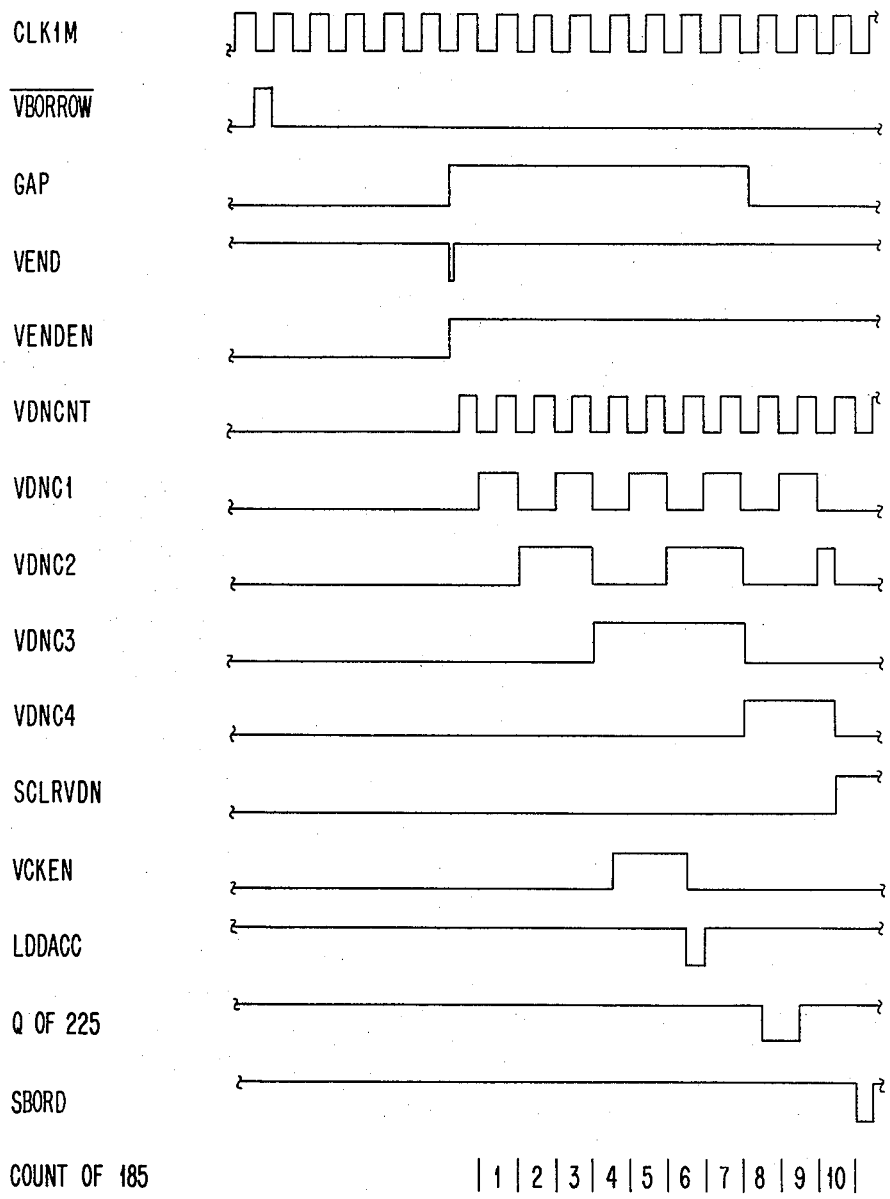
FIG. 21 is a timing diagram showing the relationship of signals produced by the servo loop logic circuit.

When the GAP signal goes up, the VEND signal from the NOR gate 168 (see FIG. 19) goes down as shown in the timing diagram of FIG. 21. When the VEND signal goes down, the VENDEN signal from the output of the AND gate 182 (see FIG. 17) goes up because of the supply of the high $\overline{\text{VEND}}$ signal through the inverter 180 to the CLK input of the latch 181.

A high VENDEN signal causes the AND gate 183 to supply the VDNCNT signal therefrom beginning with the next time that the CLK1M signal from the 1 MHz oscillator 57 (see FIG. 1) goes up as shown in the timing diagram of FIG. 21. The VDNCNT signal from the AND gate 183 (see FIG. 17) to the A input of the servo sequence counter 185 starts the counter 185 to count.

When the servo sequence counter 185 has counted to a count of four, the AND gate 207 (see FIG. 23) supplies a high as its output if the VDALEB signal from the output of the OR gate 206 (see FIG. 22) is high. The VDALEB signal from the OR gate 206 is high only when the velocity of the droplets 20 is within the acceptable velocity difference from the desired velocity as determined by the comparators 196 and 197.

If the velocity of the droplets 20 is within the acceptable velocity difference, the latch 210 (see FIG. 23) produces a low at its $\overline{\text{Q}}$ output whereby the LED 211 is illuminated. This indicates to the operator that no further servo cycles are necessary.

However, if the VDALEB signal from the OR gate 206 (see FIG. 22) is not up, the latch 210 (see FIG. 23) has the $\overline{\text{Q}}$ output high. As a result, the low LDDACC signal from the output of the OR gate 217 (see FIG. 24) is supplied to the LD inputs of the counters 218 and 219 to load them when the servo sequence counter 185 (see FIG. 17) is at the count of six. Then, when the counter 185 is at the count of eight, the $\overline{\text{CLKDIF}}$ signal from the output of the NAND gate 220 (see FIG. 24) causes the counters 218 and 219 to count down.

At the same time that the counters 218 and 219 are counting down, the counters 230 and 231 (see FIG. 25A) are being counted up or down at one-half of the rate at which the counters 218 and 219 (see FIG. 24) are counting down. The counters 230 and 231 (see FIG. 25A) count up if the velocity of the droplets 20 is less than the desired velocity, and this is indicated by the VBLCH signal from the Q output of the latch 156 (see FIG. 14) being up. This causes the output of the NAND gate 228 (see FIG. 25A) to pass the frequency of the input from the AND gate 227 (see FIG. 24) to the CNT UP input of the counter 230 (see FIG. 25A). This causes the counters 230 and 231 to count up.

If the velocity of the droplets 20 is higher than the desired velocity, then the $\overline{\text{VBLCH}}$ signal from the $\overline{\text{Q}}$ output of the latch 156 (see FIG. 14) is up. This causes the NAND gate 229 (see FIG. 25A) to pass the frequency output from the AND gate 227 (see FIG. 24) to the CNT DN input of the counter 230 (see FIG. 25A). This causes the counters 230 and 231 to count down.

The VBLCH signal from the Q output of the latch 156 (see FIG. 14) is up to indicate a lower velocity than the desired velocity when the BOR output of the counter 149 has produced a negative pulse prior to the high GAP signal being produced by the comparator 91 (see FIG. 8). If the BOR output of the counter 149 (see FIG. 14) does not appear prior to the high GAP signal being produced by the comparator 91 (see FIG. 8), then the $\overline{\text{VBLCH}}$ signal remains high to indicate that the velocity is too high with respect to the desired velocity.

The counters 230 and 231 (see FIG. 25A) are counted down or up until the counters 218 and 219 (see FIG. 24) have counted to zero. At this time, the BOR output of the counter 219 produces the negative SBORD signal. This negative SBORD signal is supplied to the AND gate 245 to cause the low SCLCLR signal to be produced to cause clearing of the latches 225 and 226 so that the $\overline{\text{CLKDIF}}$ signal and the C500DIF signal are no longer produced from the NAND gate 220 and the AND gate 227, respectively. This not only stops counting by the counters 218 and 219 but also by the counters 230 and 231 (see FIG. 25A). As a result, the pump DAC 234 (see FIG. 26) is now set at a different value to cause a different pressure to be produced by the pump 2 (see FIG. 2).

If the LED 211 (see FIG. 23) was illuminated, the operator would not activate the button 105 (see FIG. 10) again. However, if the LED 211 (see FIG. 23) is not illuminated, then the operator will activate the button 105 (see FIG. 10) again to cause another servo cycle. These servo cycles will continue until the velocity of the droplets 20 is within the acceptable velocity difference from the desired velocity. At that time, the OR gate (see FIG. 22) will produce a high VDALEB signal to cause the LED 211 (see FIG. 23) to be illuminated.

It should be understood that the production of the VPTC signal from the comparator 173 (see FIG. 20) to indicate that the second preset flight time, which has been selected by selectively setting the manual switches 174 of the second preflight time switch 175, has been exceeded without the high GAP signal being produced by the comparator 91 (see FIG. 8) results in the entire servo cycle being completed. This is because the NOR gate 168 (see FIG. 19) produces the negative VEND signal. In this situation, the counters 230 and 231 (see FIG. 25A) will be counted up to increase the velocity of the droplets 20 since the VPTC signal indicates that the velocity is very low. This is because the counters 147–149 (see FIG. 14) continue to count for a period of time after the counter 149 has a negative pulse at its BOR output.

Figure 28:
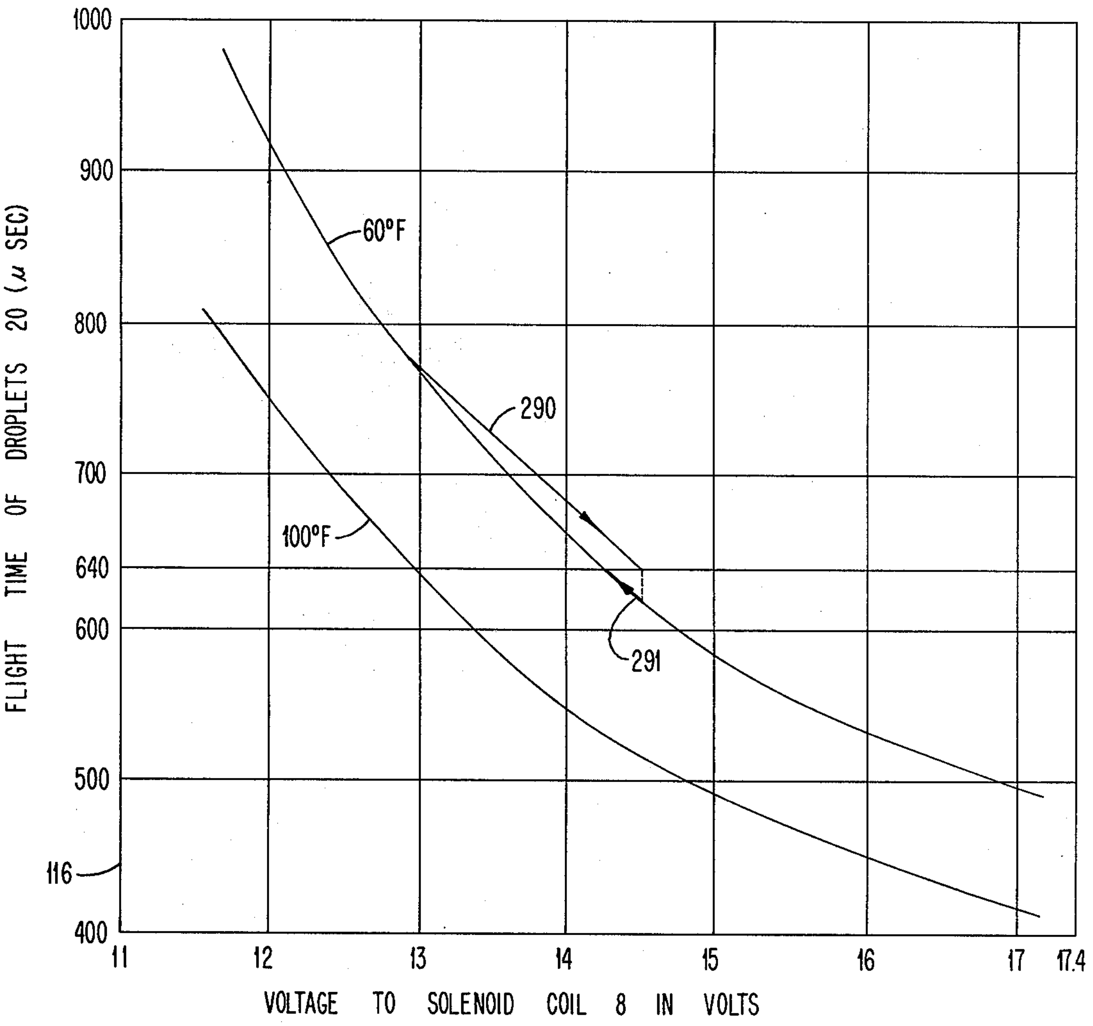
FIG. 28 is a graph showing the relationship of the droplet flight time to the voltage of the solenoid coil for the pump.

Referring to FIG. 28, there is shown the relationship of the flight time of the droplets 20 to the voltage to the solenoid coil 8. FIG. 28 has a first curve for the ink in the cavity 4 of the pump 2 having a temperature of 60° F. and a second curve for the ink having a temperature of 100° F. These two curves are not parallel to each other and define the operating range required of the ink.

A pedestal voltage is set by the potentiometer 237 (see FIG. 26) so that the pedestal portion of the total voltage at the output of the voltage regulator 238 is 11.6 volts. The voltage from the DAC 234 varies in accordance with the count received from the counters 230 and 231 (see FIG. 25A). The voltage from the voltage regulator 238 (see FIG. 26) due to the input from the output of the DAC 234 varies from 0 to 5.4 volts with the maximum voltage from the voltage regulator 238 being when the DAC 234 receives a count of two hundred and fifty-five from the counters 230 and 231 (see FIG. 25A). Accordingly, when the counters 230 and 231 are producing the count of two hundred and fifty-five, the maximum voltage is supplied from the voltage regulator 238, and it is 17 (11.6+5.4) volts.

With each of the bits being supplied to the DAC 234 at the same rate as the frequency of the 500K Hz oscillator 227' (see FIG. 24), each bit is supplied to the DAC 234 (see FIG. 26) at the rate of 2 microseconds of flight time per bit. Therefore, the slope of any servo cycle correction to the pump 2 is:

$$\text{slope} = \frac{256 \text{ bits}}{5.4 \text{ volts}} \times \frac{2 \text{ microseconds}}{\text{bit}} = \frac{94 \text{ microseconds}}{\text{volt of coil 8}}.$$

Accordingly, if the desired flight time of the droplet 20 from the time that it is produced until it passes the optical drop sensor 25 (see FIG. 3) is 640 microseconds, the solenoid coil 8 of the pump 2 requires a voltage of 12.95 volts when the temperature of the ink is 100° F. to produce this desired flight time. If the temperature of the ink should fall to 60° F., for example, it is necessary to change the voltage to the solenoid coil 8 to obtain the desired flight time of the droplet 20 from the time that the transducer 16 (see FIG. 1) is disturbed until the droplet passes the optical drop sensor 25 (see FIG. 3). Therefore, with the ink having a temperature of 60° F. and the voltage to the solenoid coil 8 being 12.95 volts because the ink was previously at a temperature of 100° F., a first servo cycle occurs along a line 290 (see FIG. 28). The line 290 has the slope of 94 microseconds per volt of the solenoid coil 8.

Therefore, the slope of the line 290 intersects the desired flight time of 640 microseconds at 14.5 volts. However, as shown in FIG. 28, this is not on the 60° F. curve but is above it. Accordingly, a second servo cycle, which is indicated by a line 291, is required.

The line 291 will have the same slope as the line 290. It will be necessary to decrease the voltage this time because the 14.5 volts, which are supplied to the solenoid coil 8 after the first servo cycle, causes a droplet flight time of approximately 620 microseconds with the temperature of the ink at 60° F. Thus, the end of the first servo cycle, as indicated by the line 290, causes the voltage to the solenoid coil 8 to be slightly higher than desired.

During the second servo cycle, as indicated by the line 291, the desired flight time of 640 microseconds is again reached. In this cycle, the line 291 approximates the curve for 60° F. so that the voltage of approximately 14.3 volts to the solenoid coil 8 produces the desired flight time of the droplet 20 of 640 microseconds at 60° F.

While the voltage of approximately 14.3 volts to the solenoid coil 8 is produced at the end of the second servo cycle, it should be understood that a third servo cycle is necessary before the LED 211 (see FIG. 23) will be illuminated. This is because the third servo cycle is the first time that the voltage of 14.3 volts is supplied to the solenoid coil 8 so that there will not be a variance from the velocity of the droplet 20 in comparison with the desired velocity.

As the temperature of the ink increases, it will be necessary to lower the voltage to the solenoid coil 8. This will be accomplished by servo cycles in which the slope of the flight time to the voltage to the solenoid coil 8 is the same as that indicated for the lines 290 and 291 in FIG. 28.

Figure 30:
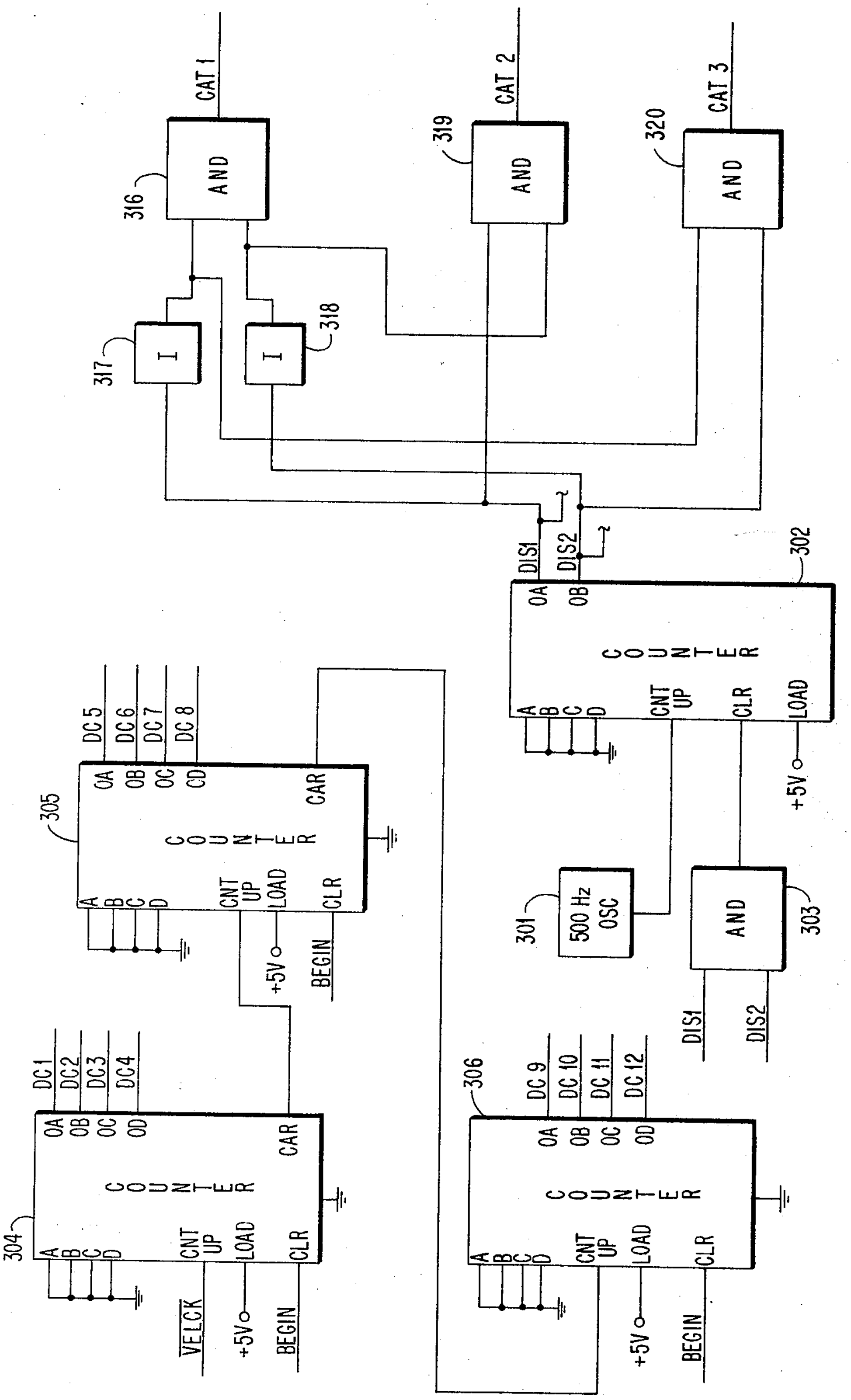
FIG. 30 is a schematic block diagram of a portion of a flight time display circuit.

Referring to FIG. 30, there is shown a portion of a flight time display circuit 300, which indicates the time period for the droplet 20 to travel from its formation to the optical drop sensor 25. The flight time display circuit 300 includes a 500 Hz oscillator 301 supplying its clock pulses to CNT UP input of a counter 302, which is preferably the same as the counter 75.

The counter 302 has its OA and OB outputs supplying DIS1 and DIS2 signals, respectively. The DIS1 and the DIS2 signals are supplied as inputs to an AND gate 303, which has its output connected to CLR input of the counter 302. Thus, the counter 302 is cleared each time that it counts to three since both the DIS1 and DIS2 signals are up at this time whereby the output of the AND gate 303 is high.

The flight time display circuit 300 also includes counters 304, 305, and 306. Each of the counters 304-306 is preferably a synchronous 4-bit up/down counter sold as model SN74192 by Texas Instruments. The counters 304–306 are decade counters in which the counter 304 counts from zero to ten, the counter 305 counts from ten to one hundred, and the counter 306 counts from one hundred to one thousand. The counters 304–306 are capable of being decade counters through the counter 304 having its CAR output connected to CNT UP input of the counter 305, and the counter 305 having its CAR output connected to CNT UP input of the counter 306.

Figure 17:
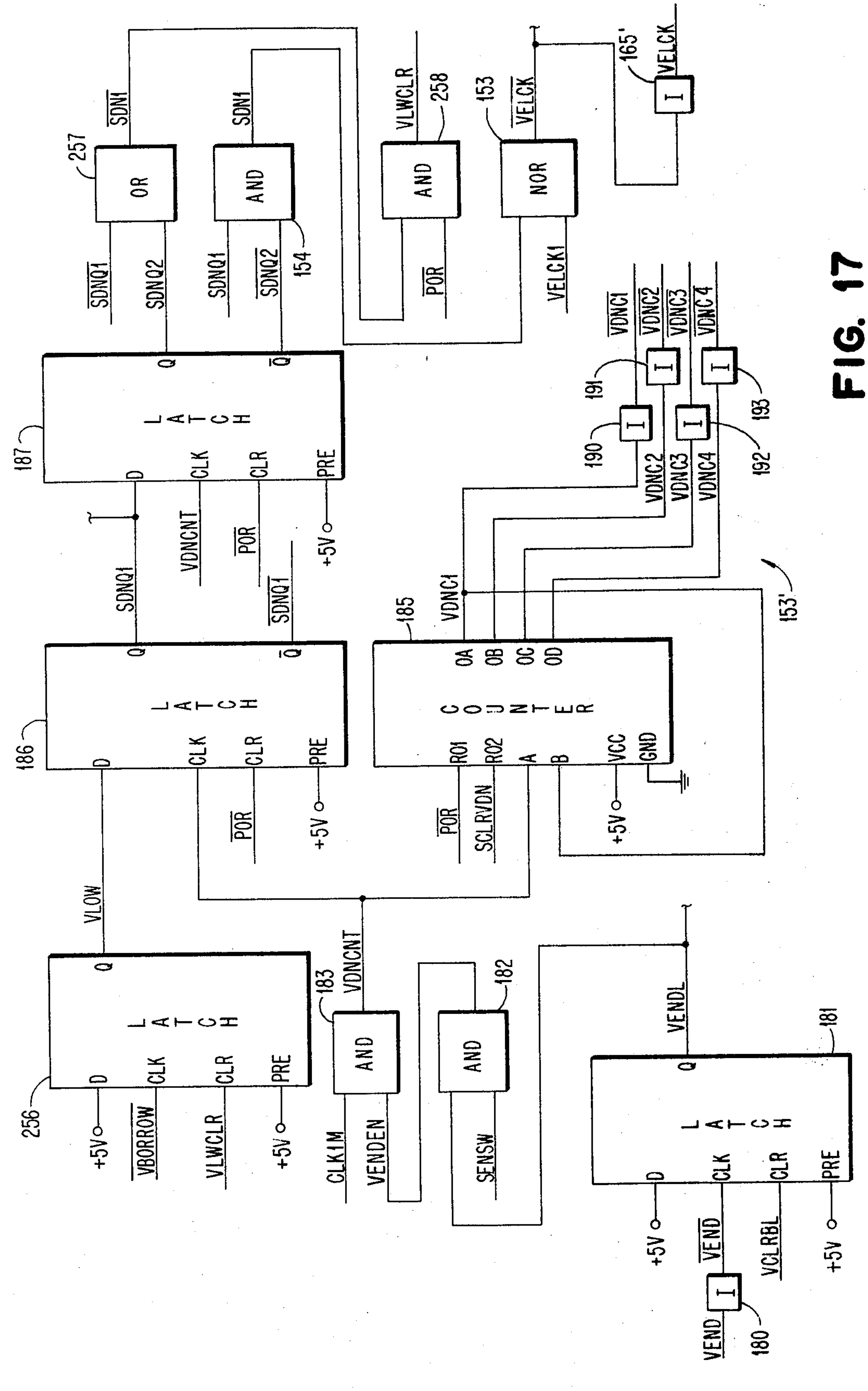
FIG. 17 is a schematic block diagram of a portion of a servo loop logic circuit.

The counter 304 has its CNT UP input receive the $\overline{\text{VELCK}}$ signal from the NOR gate 153 (see FIG. 17). As previously mentioned, the $\overline{\text{VELCK}}$ signal from the NOR gate 153 counts from the time that the perturbed crystal drive signal from the crystal drive perturb logic 100 is produced until the GAP signal from the comparator 91 (see FIG. 8) goes up. Furthermore, there is an additional count when the BOR output of the counter 149 (see FIG. 14) goes negative prior to the GAP signal going high. Therefore, the counters 304–306 (see FIG. 30), which comprise a twelve bit flight time counter, count the entire time period of the movement of the droplet 20 from the time that it is produced until it is sensed by the optical drop sensor 25 (see FIG. 3). The flight time counted by the counters 304–306 (see FIG. 30) is displayed on a display 307 (see FIG. 31), which is preferably a three digit display sold by Hewlett Packard as model 5082–7433.

Figure 31:
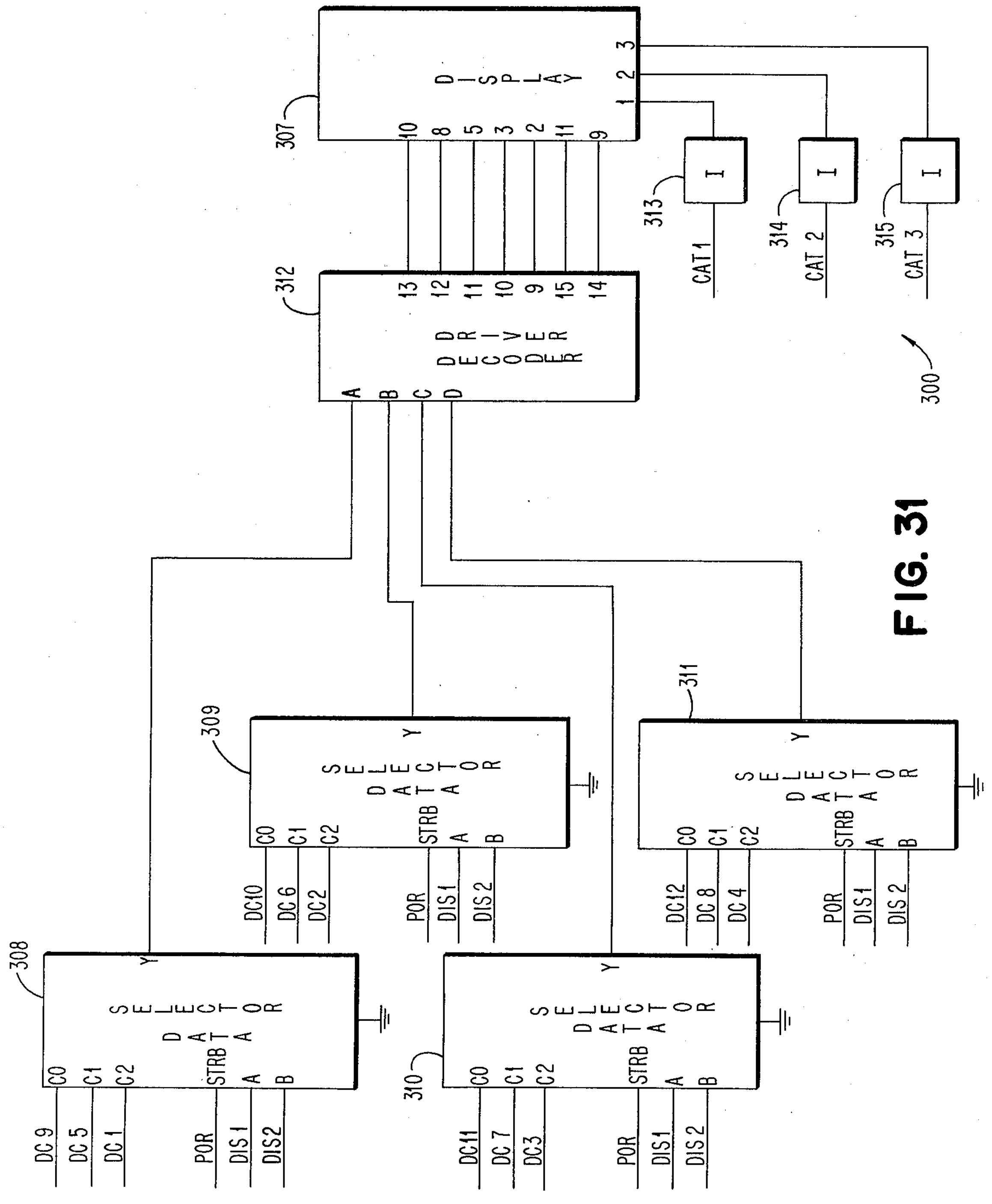
FIG. 31 is a schematic block diagram of another portion of a flight time display circuit.

The flight time display circuit 300 has an OA output of each of the counters 304 (see FIG. 30), 305, and 306 connected to C2, C1, and C0 inputs, respectively, of a data selector 308 (see FIG. 31). Data selector 309 has its C2, C1, and C0 inputs connected to OB outputs of each of the counters 304 (see FIG. 30), 305, 306, respectively. Each of the counters 304, 305, and 306 has its OC output connected to C2, C1, and C0 inputs, respectively, of a data selector 310 (see FIG. 31). A data selector 311 has its C2, C1, and C0 inputs connected to OD outputs of each of the counters 304 (see FIG. 30), 305, and 306, respectively. One suitable example of the data selectors 308–311 (see FIG. 31) is a dual 4-line-to-line data selector sold as model SN54153 by Texas Instruments.

Each of the data selectors 308–311 has its C0 input supplied to its Y output when each of its A and B inputs is at logical zero. When its A input is a logical one and its B input is a logical zero, each of the data selectors 308-311 has its C1 input at its Y output. When each of the data selectors 308–311 has a logical one at its B input and a logical zero at its A input, the Y output of the data selector has its C2 input thereon.

Accordingly, by connecting the A and B inputs of each of the selectors 308 to receive the DIS1 and DIS2 outputs, respectively, of the counter 302 (see FIG. 30), the Y outputs of the data selectors 308–311 (see FIG. 31) have the four outputs of the counter 304 (see FIG. 30) thereon at the same time, the four outputs of the counter 305 thereon at the same time, and the four outputs of the counter 306 thereon at the same time.

The Y outputs of the data selectors 308-311 (see FIG. 31) are connected to A, B, C, and D inputs of a decoder driver 312. One suitable example of the decoder driver is a BCD-segment decoder/driver sold as model N7448 by Signetics.

The output of the decoder driver 312 causes a number to appear on the display 307 as one of three digits in accordance with which of three cathode pins 1, 2, and 3 of the display 307 is energized. An inverter 313 is connected to the cathode pin 1 of the display 307, an inverter 314 is connected to the cathode pin 2 of the display 307, and an inverter 315 is connected to the cathode pin 3 of the display 307.

The inverter 313 receives a high as its input when the counter 302 (see FIG. 30) is at a zero count. At this time, the decoder driver 312 (see FIG. 31) is receiving the C0 inputs of the data selectors 308–311; these represent the outputs of the counter 306 (see FIG. 30), which is counting in the hundreds. Thus, with the low being supplied by the inverter 313 (see FIG. 31) to the cathode pin 1 of the display 307, the display 307 will receive the output of the decoder driver 312 so that the hundreds digit of the display 307 will be illuminated in accordance with the output of the counter 306 (see FIG. 30).

The inverter 313 (see FIG. 31) receives a high as its input when the counter 302 (see FIG. 30) is at a zero count through the inverter 313 (see FIG. 31) having its input connected to the output of an AND gate 316 (see FIG. 30). The AND gate 316 has one of its two inputs connected to the output of an inverter 317, which has the DIS1 signal from the counter 302 as its input, and its other input connected to the output of an inverter 318, which has the DIS2 signal from the counter 302 as its input. Thus, when both the DIS1 and DIS2 signals are low to indicate a zero count at the counter 302, the two inputs to the AND gate 316 are high whereby the input to the inverter 313 is high.

The inverter 314 (see FIG. 31) has its input connected to the output of an AND gate 319 (see FIG. 30). The inputs to the AND gate 319 are the DIS1 signal from the counter 302 and the output of the inverter 318. Thus, when the DIS1 signal is high and the DIS2 signal is low, both of the inputs to the AND gate 319 are high whereby the output of the inverter 314 (see FIG. 31) is low. This causes the display 307 to have the cathode, which is representing the tens digit, to be illuminated in accordance with the output from the counter 305 (see FIG. 30).

When the counter 302 is at the count of one, the data selectors 308–311 (see FIG. 31) transfer the C1 inputs to the decoder driver 312. These are the outputs of the counter 305 (see FIG. 30) whereby they represent the tens digit.

The input of the inverter 315 (see FIG. 31) is connected to the output of an AND gate 320 (see FIG. 30). The AND gate 320 receives a DIS2 signal from the counter 302 as one of its inputs and the output of the inverter 317 as its other input. Thus, when the DIS1 signal is low and the DIS2 signal is up, the AND gate 320 has a high output. This is at the count of two of the counter 302.

When this occurs, the inverter 315 (see FIG. 31) has a low as its output so that the cathode for the single digit of the display 307 is illuminated. At this time, the decoder driver 312 is receiving the C2 outputs from the selectors 308–311. The inputs to the data selectors 308-311 at this time are from the counter 304 (see FIG. 30). Thus, the single digit count from the counter 304 is being received by the display 307 (see FIG. 31) and illuminated.

Accordingly, the flight time display circuit 300 always indicates the flight time of the droplet 20. Therefore, when the $\overline{\text{VELCK}}$ signal ceases to be produced from the NOR gate 153 (see FIG. 17), the display 307 (see FIG. 31) will display the number of microseconds that has been required for the droplet 20 to travel from its production until the droplet 20 is sensed at the optical drop sensor 25 (see FIG. 3).

Thus, the display 307 (see FIG. 31) indicates the time period for the droplet 20 to travel the selected distance from its creation until being sensed at the optical drop sensor 25 (see FIG. 3). By knowing the selected distance, the velocity can be ascertained from the flight time on the display 307 (see FIG. 31).

An advantage of this invention is that it maintains a substantially constant velocity of an ink stream irrespective of the temperature of the ink. Another advantage of this invention is that there is no requirement for any deflection voltage during correction of the velocity of the ink droplets.

While the invention has been particularly shown and described with reference to a preferred embodiment thereof, it will be understood by those skilled in the art that various changes in form and details may be made therein without departing from the spirit and scope of the invention.

What is claimed is:

1. An apparatus for determining the velocity of a pressurized liquid stream of droplets including:

means to supply a pressurized liquid stream;

means to cause breakup of the stream into droplets spaced substantially uniform distances;

means acting on the stream to cause a gap greater than the substantially uniform distance between adjacent droplets to be present in the stream of droplets at a selected distance from the point at which said acting means acts on the stream;

sensing means to sense the presence of the gap in the stream of droplets at the selected distance from the point at which said acting means acts on the stream;

and means to determine the velocity of the stream in accordance with the time that it takes for said sensing means to sense the gap after said acting means has acted on the stream to produce the gap.

2. The apparatus according to claim 1 in which said sensing means includes optically sensing means.

3. The apparatus according to claim 1 in which said acting means includes means to create a disturbance in the stream.

4. The apparatus according to claim 1 in which said acting means includes means to create a disturbance in the stream prior to breakup of the stream.

5. The apparatus according to claim 1 in which:

said causing means includes means to apply a predetermined frequency to the stream;

and said acting means includes means to place a perturbation in the predetermined frequency applied by said applying means.

6. The apparatus according to claim 1 in which:

said sensing means includes presence means to sense the presence of each of the droplets at the selected distance;

and said determining means includes:

first means to determine the time period between adjacent droplets being sensed by said presence means of said sensing means;

and second means to determine the time period from when said acting means acts on the stream until said presence means of said sensing means senses the presence at the selected distance of the droplet produced by said acting means, the time period determined by said second means being indicative of the velocity.

7. The apparatus according to claim 6 in which said determining means includes:

third means to determine whenever the time period between adjacent droplets being sensed by said presence means of said sensing means exceeds a predetermined time period to signify the presence of the gap;

and said second means includes timing means responsive to said acting means to start the time period indicative of the velocity and responsive to said third means determining that the predetermined period of time has been exceeded to stop the time period indicative of the velocity.

8. The apparatus according to claim 7 including means to ascertain the predetermined period of time between adjacent droplets prior to the gap occurring at the selected distance by averaging a plurality of the time periods determined by said first means of said determining means.

9. The apparatus according to claim 8 in which said sensing means includes optically sensing means.

10. The apparatus according to claim 9 in which:

said causing means includes means to apply a predetermined frequency to the stream;

and said acting means includes means to place a frequency perturbation in the predetermined frequency applied by said applying means.

11. An apparatus for creating a gap in a pressurized liquid stream of droplets spaced substantially uniform distances and optically sensing the presence of the gap including:

means to supply a pressurized liquid stream;

means to cause breakup of the stream into droplets spaced substantially uniform distances;

means acting on the stream to cause a gap greater than the substantially uniform distance between adjacent droplets to be present in the stream of droplets at a selected distance from the point at which said acting means acts on the stream;

and sensing means to optically sense the presence of the gap in the stream of droplets at the selected distance from the point at which said acting means acts on the stream.

12. The apparatus according to claim 11 in which said acting means includes means to create a disturbance in the stream prior to breakup of the stream.

13. The apparatus according to claim 11 in which:

said causing means includes means to apply a predetermined frequency to the stream;

and said acting means includes means to place a perturbation in the predetermined frequency applied by said applying means.

14. The apparatus according to claim 11 in which:

said causing means includes means to apply a predetermined frequency to the stream;

and said acting means includes means to place a frequency perturbation in the predetermined frequency applied by said applying means.

15. An apparatus for controlling the velocity of a pressurized liquid stream of droplets to obtain a desired velocity including:

means to supply a pressurized liquid stream;

means to cause breakup of the stream into droplets spaced substantially uniform distances;

means acting on the stream to cause a gap greater than the substantially uniform distance between adjacent droplets to be present in the stream of droplets at a selected distance from the point at which said acting means acts on the stream;

sensing means to sense the presence of the gap in the stream of droplets at the selected distance from the point at which said acting means acts on the stream;

means to determine the velocity of the stream in accordance with the time that it takes for said sensing means to sense the gap after said acting means has acted on the stream to produce the gap;

and means to change the velocity of the stream in accordance with the relation of the determined velocity to the desired velocity.

16. The apparatus according to claim 15 in which said changing means includes:

means to compare the determined velocity with the desired velocity to determine if the determined velocity is larger or smaller than the desired velocity and the magnitude of the difference;

and means to produce a change in the pressure of the stream in accordance with the determinations made by said comparing means.

17. The apparatus according to claim 16 in which said comparing means includes:

means to determine if the determined velocity is within a predetermined range of the desired velocity;

and means to indicate when the determined velocity is within the predetermined range of the desired velocity so that no further change of the pressure of the stream is necessary.

18. The apparatus according to claim 17 in which:

said sensing means includes optically sensing means;

said causing means includes means to apply a predetermined frequency to the stream;

and said acting means includes means to place a frequency perturbation in the predetermined frequency applied by said applying means.

19. A method for determining the velocity of a pressurized liquid stream of droplets including:

supplying a pressurized liquid stream;

breaking up the stream into droplets at a predetermined break-off point with the droplets being spaced substantially uniform distances;

acting on the stream to cause a gap greater than the substantially uniform distance between adjacent droplets to be present in the stream of droplets at a selected distance from the point at which the stream is acted on;

sensing the presence of the gap in the stream of droplets at the selected distance from the point at which the stream is acted on;

and determining the velocity of the stream in accordance with the time that it takes for the gap to be sensed from the time that the stream was acted upon to produce the gap.

20. A method for creating a gap in a pressurized stream of droplets spaced substantially uniform distances and optically sensing the presence of the gap including:

supplying a pressurized liquid stream;

breaking up the stream into droplets at a predetermined break-off point with the droplets being spaced substantially uniform distances;

acting on the stream to cause a gap greater than the substantially uniform distance between adjacent droplets to be present in the stream of droplets at a selected distance from the point at which the stream is acted on;

and optically sensing the presence of the gap in the stream of droplets at the selected distance from the point at which the stream is acted on.

21. A method for controlling the velocity of a pressurized stream of droplets to obtain a desired velocity including:

supplying a pressurized liquid stream;

breaking up the stream into droplets at a predetermined break-off point with the droplets being spaced substantially uniform distances;

acting on the stream to cause a gap greater than the substantially uniform distance between adjacent droplets to be present in the stream of droplets at a selected distance from the point at which the stream is acted on;

sensing the presence of the gap in the stream of droplets at the selected distance from the point at which the stream is acted on;

determining the velocity of the stream in accordance with the time that it takes for the gap to be sensed at the selected distance from the time that the stream was acted upon to produce the gap;

and changing the velocity of the stream in accordance with the relation of the determined velocity to the desired velocity.

* * * * *